United States Patent
Nakamura et al.

(10) Patent No.: US 11,966,658 B2
(45) Date of Patent: Apr. 23, 2024

(54) SYSTEM AND METHOD FOR DISPLAYING IMAGE, IMAGE-CAPTURING DEVICE, AND RECORDING MEDIUM

(71) Applicants: Daiki Nakamura, Kanagawa (JP); Takahiro Kamekura, Tokyo (JP); Shigeyuki Ishii, Ibaraki (JP)

(72) Inventors: Daiki Nakamura, Kanagawa (JP); Takahiro Kamekura, Tokyo (JP); Shigeyuki Ishii, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/110,894

(22) Filed: Feb. 17, 2023

(65) Prior Publication Data
US 2023/0289123 A1    Sep. 14, 2023

(30) Foreign Application Priority Data

Mar. 9, 2022   (JP) ................... 2022-036510

(51) Int. Cl.
*G06F 3/14* (2006.01)
*G06F 3/041* (2006.01)

(52) U.S. Cl.
CPC .............. *G06F 3/14* (2013.01); *G06F 3/0412* (2013.01)

(58) Field of Classification Search
CPC ...... G06F 3/041–047; G06F 2203/041–04114; G06F 3/04883; G06F 40/169; H04N 7/15; H04N 7/147; H04N 1/00204; H04N 7/155; H04N 21/854; G09G 2354/00; G09B 5/065; G09B 5/10; G09B 7/00; G09B 5/06; G09B 5/14; G09B 5/08; G09B 7/02
See application file for complete search history.

(56) References Cited

U.S. PATENT DOCUMENTS

| | | | |
|---|---|---|---|
| 2012/0208167 A1 | 8/2012 | Stowe et al. | |
| 2015/0106746 A1 | 4/2015 | Vojak | |
| 2021/0133055 A1 | 5/2021 | Nakamura et al. | |
| 2021/0390823 A1* | 12/2021 | Dalmia | G07F 17/3223 |
| 2022/0046186 A1* | 2/2022 | Fayad | H04N 5/272 |
| 2022/0070525 A1* | 3/2022 | Wang | H04N 21/4318 |
| 2022/0086204 A1 | 3/2022 | Nakamura | |
| 2022/0300239 A1 | 9/2022 | Nakamura | |
| 2022/0321831 A1* | 10/2022 | Li | G06K 7/1417 |
| 2022/0335620 A1* | 10/2022 | Ostap | G06T 5/50 |

FOREIGN PATENT DOCUMENTS

| | | |
|---|---|---|
| JP | 2016-178355 | 10/2016 |
| JP | 2018-032098 | 3/2018 |

OTHER PUBLICATIONS

Extended European Search Report dated Jul. 12, 2023, in corresponding European Patent Application No. 23158353.5, 8pp.

* cited by examiner

*Primary Examiner* — Sanjiv D. Patel

(74) *Attorney, Agent, or Firm* — XSENSUS LLP

(57) ABSTRACT

A system for displaying an image, includes circuitry that: receives a detection of use of a display device by a user; specifies the display device, based on information related to the display device; and displays, on a display, a display device image representing a specific area in an image captured by an image-capturing device, the specific area including at least a part of the display device that is specified.

15 Claims, 38 Drawing Sheets

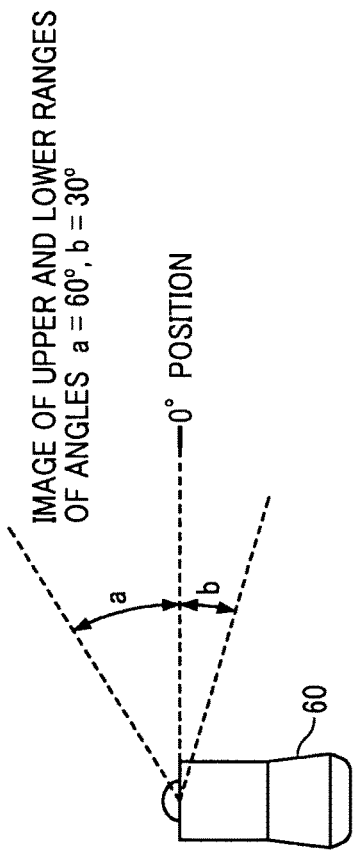
FIG. 6A
FIG. 6B
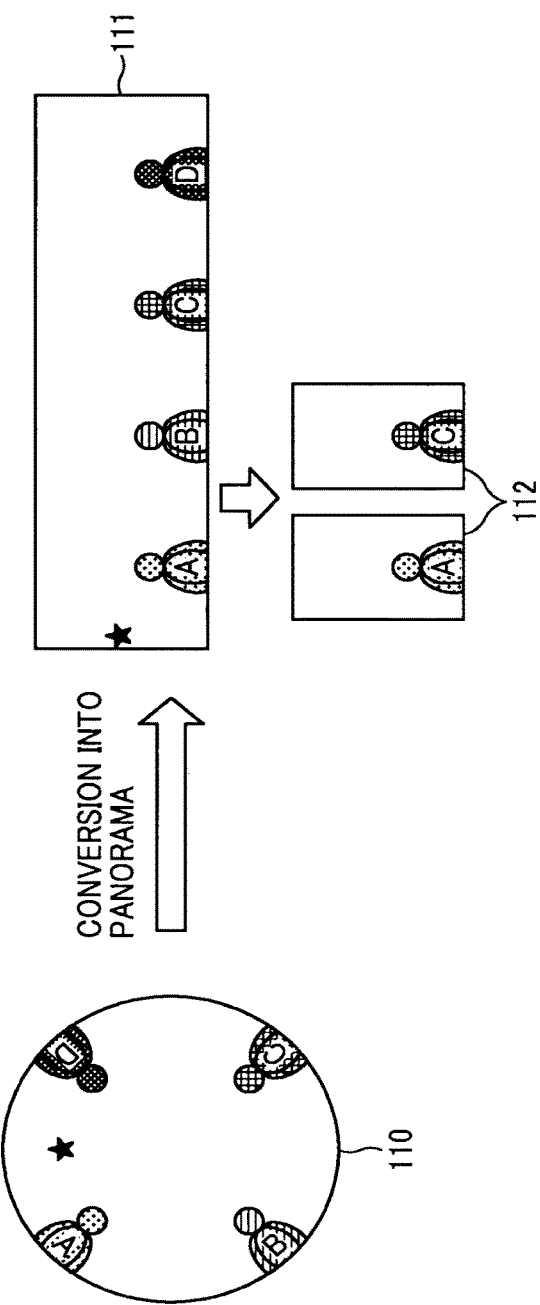
FIG. 7

FIG. 10

| CONFERENCE ID | RECORDED VIDEO ID | UPDATE DATE AND TIME | TITLE | UPLOAD | STORAGE DESTINATION |
|---|---|---|---|---|---|
| 091 | 151 | 20XX/1/25 10:30 | DESIGN CONFERENCE | – | |
| 091 | 152 | 20XX/1/25 10:50 | DESIGN CONFERENCE | – | |
| 109 | 198 | 20XX/1/27 14:30 | DEVELOPMENT CONFERENCE | DONE | http://sample.com/file/ ... |
| 123 | 250 | 20XX/1/28 15:00 | PATENT CONFERENCE | DONE | http://sample.com/file/ ... |
| ... | ... | ... | ... | ... | ... |

FIG. 11

| CONFERENCE ID | HOST ID | TITLE | START DATE AND TIME | END DATE AND TIME | ELECTRONIC WHITEBOARD | MEETING DEVICE |
|---|---|---|---|---|---|---|
| 0000 | 0000 | REVIEW | 2021-12-03 10:00 | 2021-12-03 11:00 | NULL | NULL |
| 0001 | 0000 | REGULAR CONFERENCE | 2021-12-03 14:00 | 2021-12-03 14:30 | WB001 | DEV001 |

FIG. 12

| CONFERENCE ID | DEVICE IDENTIFICATION INFORMATION |
|---|---|
| 001 | WB001<br>DEV001 |

FIG. 13

| USER ID | TYPE | NAME | EMAIL ADDRESS |
|---|---|---|---|
| 0000 | USER | USER A | user1@mail.com |
| 0001 | USER | USER B | user2@mail.com |
| 0002 | ELECTRONIC WHITEBOARD | ELECTRONIC WHITEBOARD (CONFERENCE ROOM A) | wb1@mail.com |
| 0003 | ELECTRONIC WHITEBOARD | ELECTRONIC WHITEBOARD (CONFERENCE ROOM B) | wb2@mail.com |
| 0004 | MEETING DEVICE | MEETING DEVICE (CONFERENCE ROOM A) | device1@mail.com |
| 0005 | MEETING DEVICE | MEETING DEVICE (CONFERENCE ROOM B) | device2@mail.com |

FIG. 15

| DEVICE IDENTIFICATION INFORMATION | WB001 |
|---|---|
| IP ADDRESS | 1.1.1.1 |
| PASSWORD | **** |

FIG. 16

| CONFERENCE ID | OBJECT ID | TYPE | PAGE | COOR-DINATES | SIZE | ... |
|---|---|---|---|---|---|---|
| 001 | 1 | HANDWRITING | 1 | x1,y1 | W1,H1 | ... |
| | 2 | CHARACTER | 1 | x2,y2 | W2,H2 | ... |
| | 3 | FIGURE | 1 | x3,y3 | W3,H3 | ... |
| | 4 | IMAGE | 2 | x4,y4 | W4,H4 | ... |
| | 5 | FIGURE | 3 | x5,y5 | W5,H5 | ... |
| | 6 | CHARACTER | 4 | x6,y6 | W6,H6 | ... |
| | 7 | IMAGE | 4 | x7,y7 | W7,H7 | ... |
| ... | ... | ... | ... | ... | ... | ... |

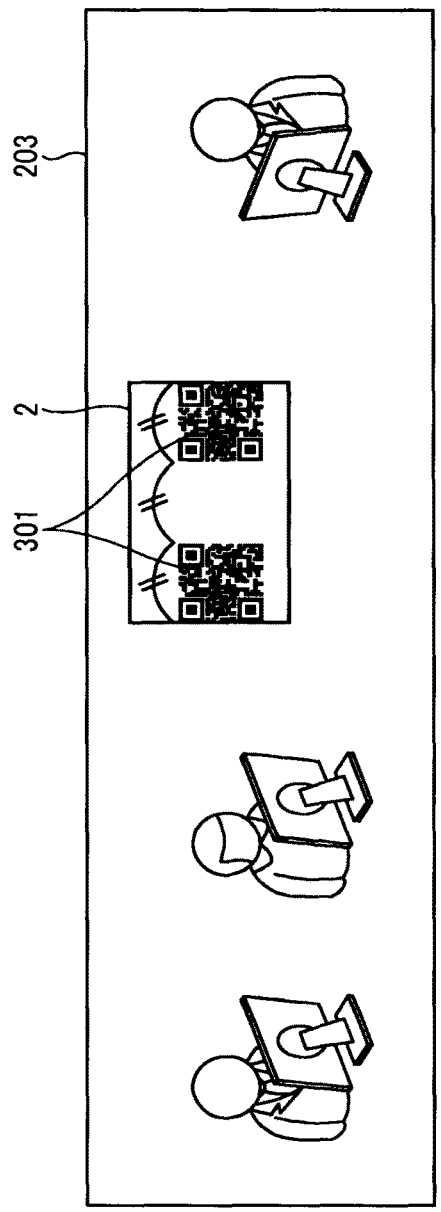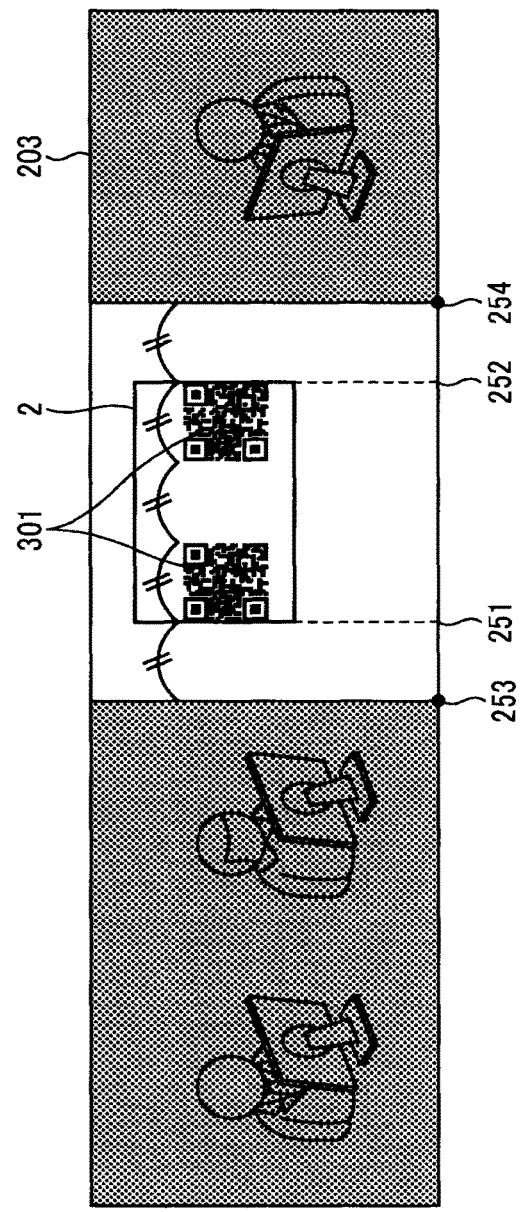

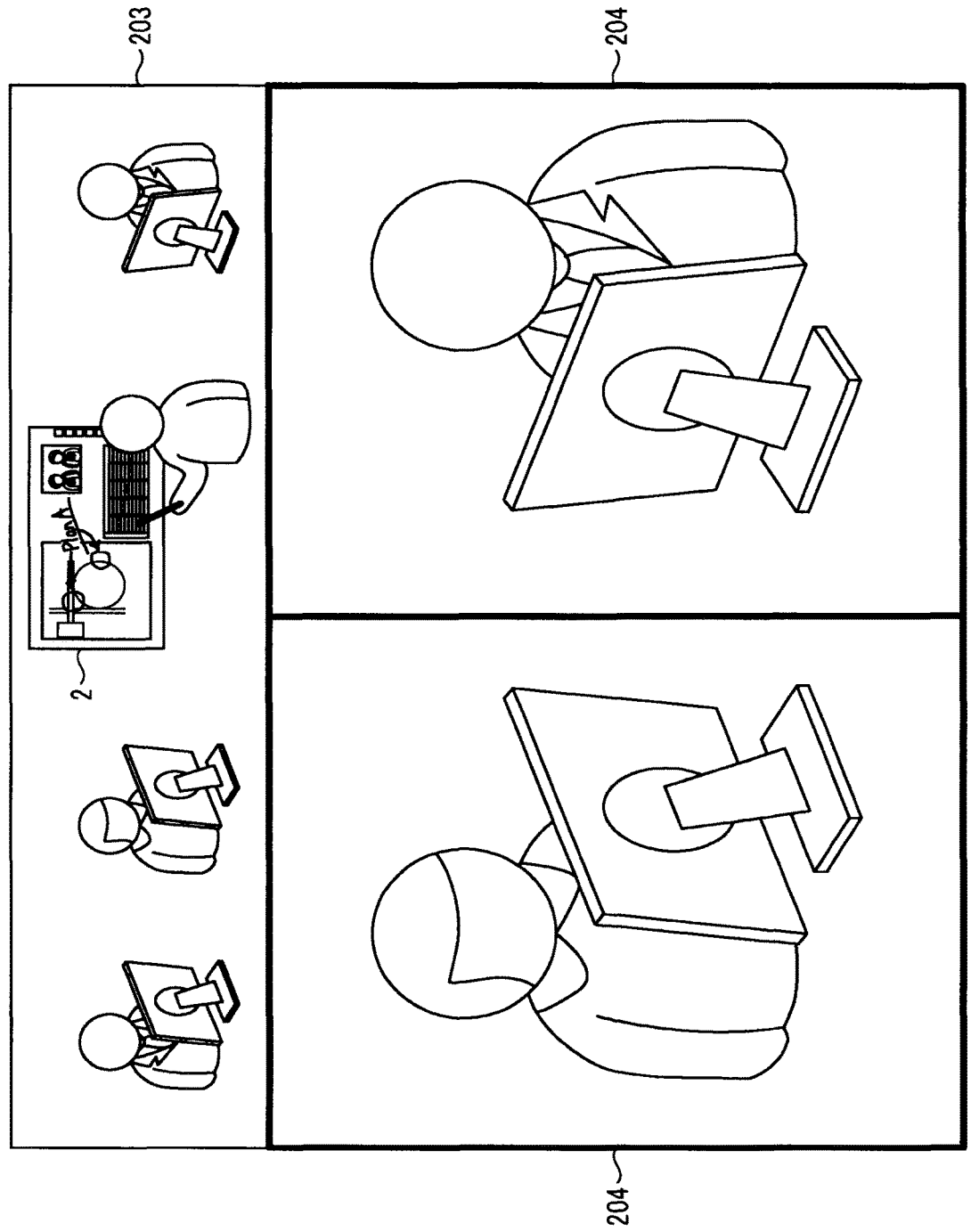

SYSTEM AND METHOD FOR DISPLAYING IMAGE, IMAGE-CAPTURING DEVICE, AND RECORDING MEDIUM

CROSS-REFERENCE TO RELATED APPLICATIONS

This patent application is based on and claims priority pursuant to 35 U.S.C. § 119(a) to Japanese Patent Application No. 2022-036510, filed on Mar. 9, 2022, in the Japan Patent Office, the entire disclosure of which is hereby incorporated by reference herein.

BACKGROUND

Technical Field

The present disclosure relates to a system and method for displaying an image, an image-capturing device, and a recording medium.

Related Art

In the telecommunication system, an image and audio are transmitted in real time from one site to one or more other sites, so that users at the remote places can hold a conference using the image and the audio. In such telecommunication, a device such as an electronic whiteboard is sometimes used.

A technique of recording a change of a topic of a conference has been developed. For example, there is a technique of holding semantic information such as a change of a topic of a conference at a specific time in the conference in association with an elapsed time since the start of the conference.

SUMMARY

Example embodiments include a system for displaying an image, including circuitry that receives a detection of use of a display device by a user; specifies the display device, based on information related to the display device; and displays, on a display, a display device image representing a specific area in an image captured by an image-capturing device, the specific area including at least a part of the display device that is specified.

Example embodiments include a method for displaying an image, including: receiving a detection of use of a display device by a user; specifying the display device based on information related to the display device; and displaying a display device image representing a specific area in an image captured by an image-capturing device, the specific area including at least a part of the display device.

Example embodiments include an image-capturing device for communicating with a terminal apparatus, the image-capturing device including circuitry that: specifies a display device, based on information related to the display device; generates, in response to receiving information indicating that the display device is in use by a user from the terminal apparatus, a display device image representing a specific area in an image captured by the image-capturing device, the specific area including at least a part of the display device; and transmits the display device image to the terminal apparatus.

Example embodiments include a non-transitory recording medium which, when executed by one or more processors, cause the processors to perform a method including: receiving information indicating identification of a display device based on information related to the display device and information indicating detection of the display device being in use by a user; and displaying a display device image representing a specific area in an image captured by an image-capturing device, the specific area including at least a part of the display device

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 6A and 6B are diagrams for describing an image-capturing range of the meeting device according to the embodiment of the present disclosure;

FIG. 7 is a diagram for describing a panoramic image and clipping of speaker images in accordance with the embodiment of the present disclosure;

FIG. 10 is a diagram illustrating an example of moving image recording information stored in an information storage unit in accordance with the embodiment of the present disclosure;

FIG. 11 is a diagram illustrating an example of conference information managed by a communication management unit in accordance with the embodiment of the present disclosure;

FIG. 12 is a diagram illustrating an example of association information, associating a conference identifier (ID) and device identification information with each other, stored in an association information storage unit in accordance with the embodiment of the present disclosure;

FIG. 13 is a diagram illustrating an example of account information stored in an account information storage unit in accordance with the embodiment of the present disclosure;

FIG. 15 is a diagram illustrating an example of information such as the device identification information stored in the device information storage unit in accordance with the embodiment of the present disclosure;

FIG. 16 is a diagram for describing object information stored in an object information storage unit in accordance with the embodiment of the present disclosure;

FIG. 29 is a diagram illustrating an example of a two-dimensional code displayed as the specific image by the electronic whiteboard in accordance with the embodiment of the present disclosure;

FIG. 30 is a diagram for describing a method of determining the direction of the electronic whiteboard based on the two-dimensional codes in accordance with the embodiment of the present disclosure;

FIG. 43 is a diagram illustrating an example of speaker images displayed by a display control unit of the information recording app in accordance with the embodiment of the present disclosure;

Figure 1:
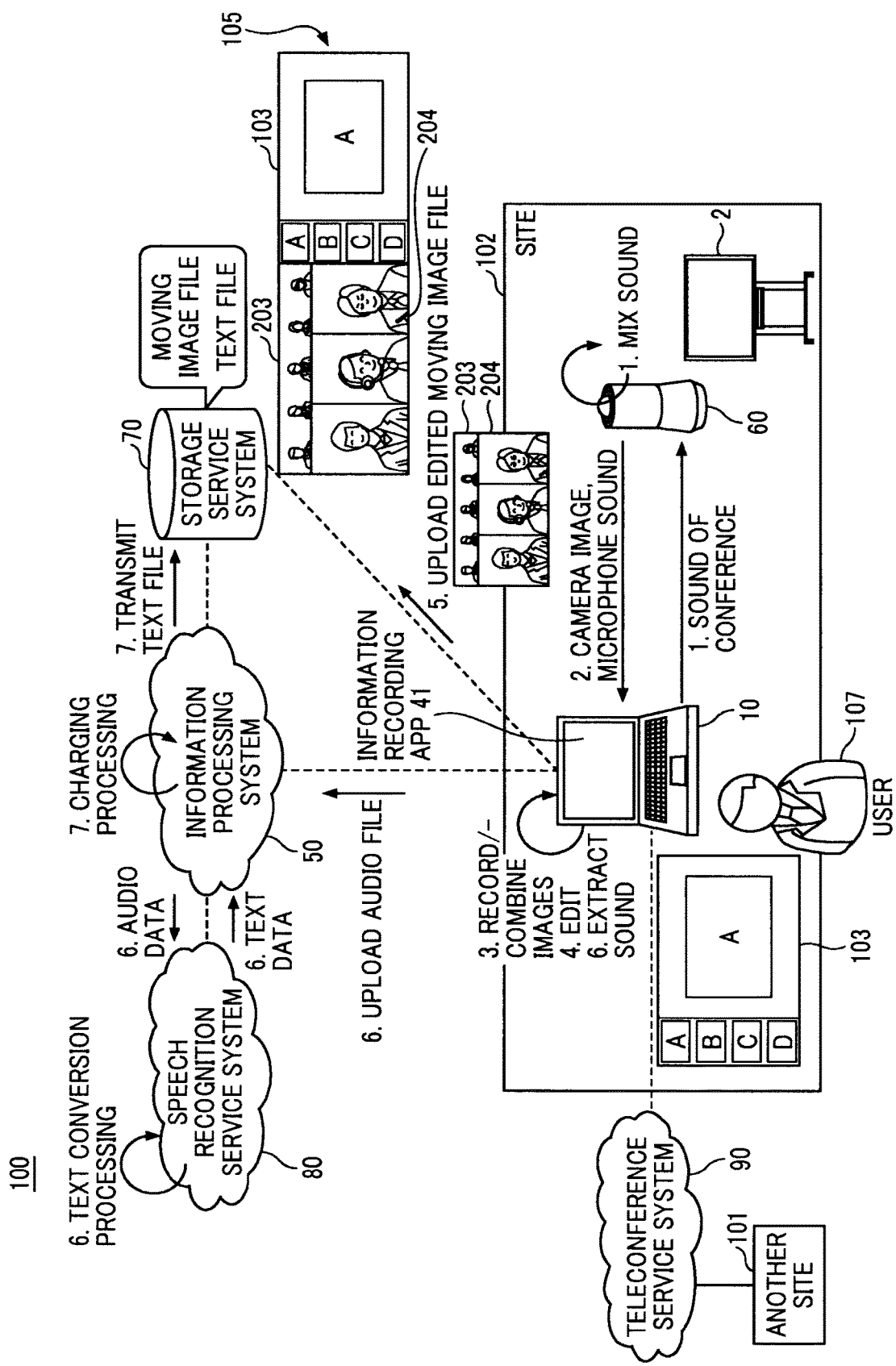
FIG. 1 is a diagram for describing an overview of creation of recording information for storing a screen of an application (hereinafter, referred to as an app) executed during a teleconference together with a panoramic image of surroundings in accordance with an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display system and a display method carried out by the display system will be described below as an example of embodiments of the present disclosure.

Example Operation of Creating Minutes of Teleconference

An overview of a method of creating minutes using a panoramic image and a screen of an application (app) will be described with reference to FIG. 1. FIG. 1 is a diagram for describing an overview of creation of recording information that includes a screen of an app executed during a teleconference, and a panoramic image of surroundings. As illustrated in FIG. 1, a user 107 at one site 102 uses a teleconference service system 90 to have a teleconference with a user at another site 101.

A recording information creation system 100 according to the present embodiment includes a meeting device 60 and a terminal apparatus 10. The meeting device 60 includes an image-capturing means (for example, camera) that captures an image of a 360-degree surrounding space, a microphone, and a loudspeaker. The meeting device 60 processes information of the captured image of the surrounding area to obtain a horizontal panoramic image (hereinafter, referred to as a panoramic image). The recording information creation system 100 uses the panoramic image and a screen created by an app executed by the terminal apparatus 10 to create recording information such as minutes. The recording information creation system 100 combines audio data received by a teleconference app 42 (FIG. 3) and audio data obtained by the meeting device 60 together and includes the resultant audio data in the recording information. The overview will be described below.

(1) An information recording app 41 (described below) and the teleconference app 42 are operating on the terminal apparatus 10. Another app such as a document display app may also be operating. The information recording app 41 transmits, to the meeting device 60, audio data to be output by the terminal apparatus 10. The audio data is an example of first audio data, and includes audio data received under control of the teleconference app 42 from the other site 101. The meeting device 60 mixes (combines) audio data (which is an example of second audio data) obtained by the meeting device 60 and the audio data received by the teleconference app 42 together.

(2) The meeting device 60 includes the microphone. Based on a direction from which the microphone obtains sound, the meeting device 60 performs processing of clipping speaker-including portions from the panoramic image to create speaker images. The meeting device 60 transmits both the panoramic image and the speaker images to the terminal apparatus 10.

(3) The information recording app 41 operating on the terminal apparatus 10 displays a panoramic image 203 and speaker images 204. The information recording app 41 combines the panoramic image 203 and the speaker images 204 with a screen of any app (for example, a screen 103 of the teleconference app 42) selected by the user 107. For example, the information recording app 41 combines the panoramic image 203 and the speaker images 204 with the screen 103 of the teleconference app 42 to create a combined image 105 such that the panoramic image 203 and the speaker image 204 are arranged on the left side and the screen 103 of the teleconference app 42 is arranged on the right side. The screen of the app is an example of screen information (described below) displayed by each application such as the teleconference app 42. Since the processing (3) is repeatedly performed, the resultant combined images 105 form a moving image (hereinafter, referred to as a combined moving image). The information recording app 41 attaches the combined audio data to the combined moving image to create a moving image with sound.

In the present embodiment, an example of combining the panoramic image 203, the speaker images 204, and the screen 103 of the teleconference app 42 together is described. Alternatively, the panoramic image 203, the speaker images 204, and the screen 103 of the teleconference app 42 may be stored separately and arranged on a screen at the time of playback by the information recording app 41.

(4) The information recording app 41 receives an editing operation (performed by the user 107 to cut off a portion not to be used), and completes the combined moving image. The combined moving image is part of the recording information.

(5) The information recording app 41 transmits the created combined moving image (with sound) to a storage service system 70 for storage.

(6) The information recording app 41 extracts the audio data from the combined moving image (or may keep the original audio data to be attached) and transmits the extracted audio data to an information processing system 50. The information processing system 50 receives the audio data and transmits the audio data to a speech recognition service system 80 that converts the audio data into text data. The speech recognition service system 80 converts the audio data into text data. The text data includes data indicating a time, from the start of recording, when a speaker made an utterance.

In the case of real-time conversion into text data, the meeting device 60 transmits the audio data directly to the information processing system 50. The meeting device 60 then transmits the resultant text data to the information recording app 41 in real time.

(7) The information processing system 50 additionally stores the text data in the storage service system 70 storing the combined moving image. The text data is part of the recording information.

The information processing system 50 performs a charging process for a user according to a service that is used. For example, the charge is calculated based on an amount of the text data, a file size of the combined moving image, a processing time, or the like.

As described above, the combined moving image displays the panoramic image 203 of the surroundings including the user 107 and the speaker images 204 as well as the screen of the app such as the teleconference app 42 displayed during the teleconference. When a participant or non-participant of the teleconference views the combined moving image as the minutes, the teleconference is reproduced with the realism.

Overview of Process

Figure 2:
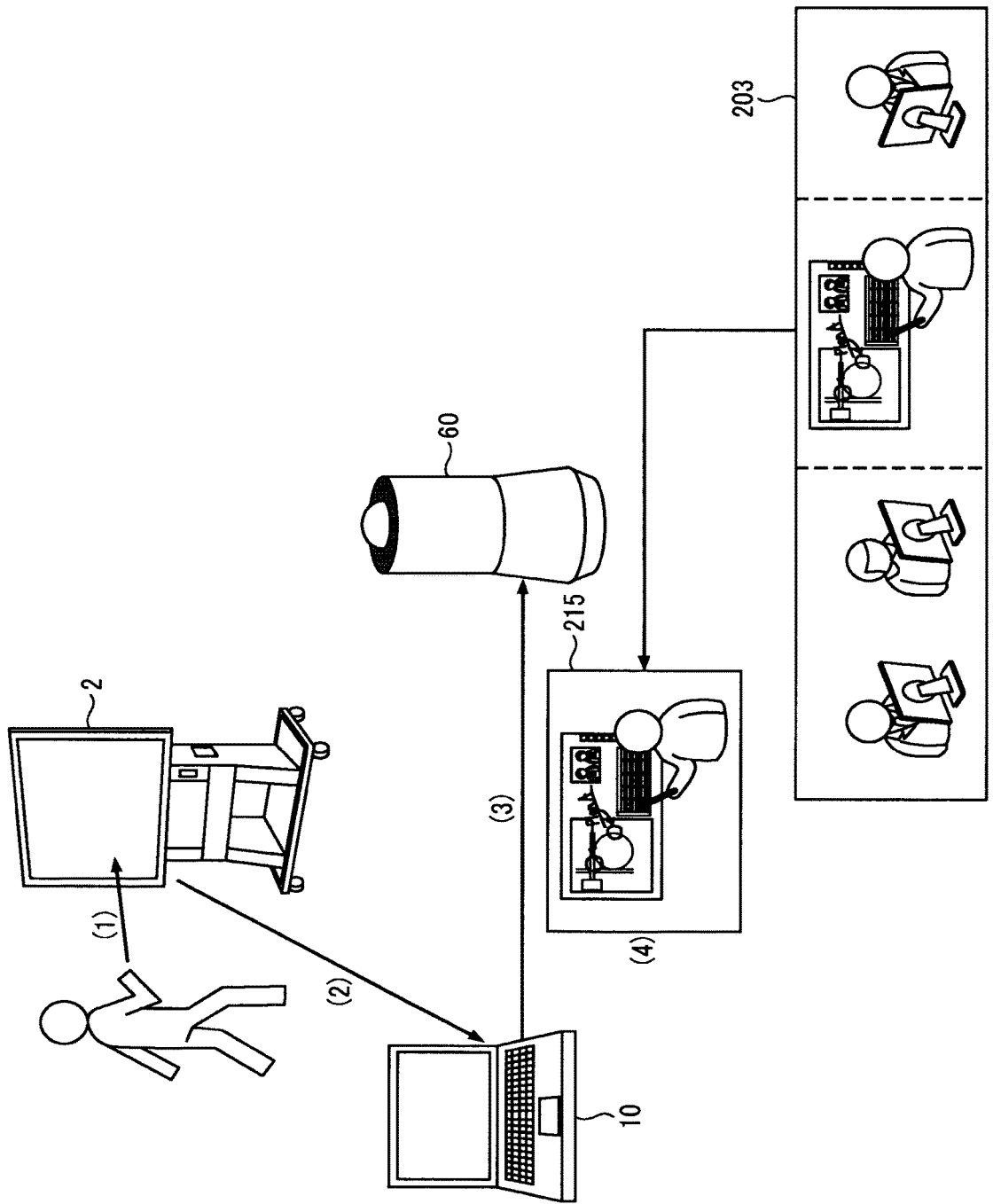
FIG. 2 is a diagram for describing a process in which a meeting device clips a display device image including an electronic whiteboard in accordance with the embodiment of the present disclosure.

A process in which the meeting device 60 clips a display device image including an image of an electronic whiteboard 2 will be described with reference to FIG. 2. FIG. 2 is a diagram for describing the process in which the meeting device 60 clips a display device image including the image of the electronic whiteboard 2.

(1) A user performs an operation such as handwriting on the electronic whiteboard 2.

(2) In response to detecting the operation by the user, the electronic whiteboard 2 transmits an operation start notification to the terminal apparatus 10. As described below, the electronic whiteboard 2 and the terminal apparatus 10 are set in advance to communicate with each other.

(3) In response to receiving the operation start notification, the terminal apparatus 10 transmits an electronic whiteboard recording start request to the meeting device 60. The electronic whiteboard recording start request is for requesting the meeting device 60 to clip a display device image 215 including the image of the electronic whiteboard 2.

(4) In response to receiving the electronic whiteboard recording start request, the meeting device 60 clips the display device image 215 including the image of the electronic whiteboard 2 from the panoramic image 203 of the surroundings. The meeting device 60 transmits the display device image 215 together with the speaker images 204 and the panoramic image 203 to the terminal apparatus 10. The terminal apparatus 10 displays the display device image 215, so that another user can view the handwritten data displayed by the electronic whiteboard 2.

In a substantially similar manner, in response to detecting the end of the operation by the user on the electronic whiteboard 2, the electronic whiteboard 2 transmits an operation end notification to the terminal apparatus 10. In response to receiving the operation end notification, the terminal apparatus 10 transmits an electronic whiteboard recording end request to the meeting device 60. In response to receiving the electronic whiteboard recording end request, the meeting device 60 ends the process of clipping the display device image 215 from the panoramic image 203.

The recording information creation system 100 according to the present embodiment clips the display device image 215 in response to an operation on the electronic whiteboard 2. Thus, in response to a handwriting operation on the electronic whiteboard 2, the recording information creation system 100 can display handwritten data. In response to the end of the handwriting operation, the recording information creation system 100 ends displaying the display device image 215.

Examples of a method with which the meeting device 60 specifies a direction of the electronic whiteboard 2 include following methods. The direction corresponds to a specific area of the panoramic image being captured, which includes the electronic whiteboard 2. Such direction may be specified with, for example, an angle of view, such as a range of angle of views (such as A degrees to B degrees, out of 360 degrees).

In one method, the user designates a range (or an area) in the panoramic image 203, which includes the image of the electronic whiteboard 2, at the start of (or during) a conference.

In another method, the electronic whiteboard 2 displays a specific image (such as a two-dimensional code), and the meeting device 60 recognizes, based on the specific image, an area including the electronic whiteboard 2 in the panoramic image captured by an image-capturer of the meeting device 60. The two-dimensional code may be, for example, a quick response (QR®) code.

In still another method, the electronic whiteboard 2 outputs a specific sound, and the meeting device 60 recognizes, based on the specific sound, an area of the panoramic image including the electronic whiteboard 2 with the microphone.

In still another method, the meeting device 60 or the terminal apparatus 10 learns the shape of the electronic whiteboard 2 through machine learning and recognizes the electronic whiteboard 2 in the panoramic image 203.

Terminology in this Disclosure

The term "application (app)" refers to software developed or used for a specific function or purpose. Types of such applications include a native app and a web app. A web app (a cloud app that provides a cloud service) may operate in cooperation with a native app or a web browser.

The expression "app being executed" refers to an app in a state from the start of app to the end of the app. An app is not necessarily active (an app in the foreground) and may operate in the background.

Image information of surroundings of a meeting device, which is obtained by the meeting device, is image information obtained by the meeting device capturing an image of a surrounding space (for example, 180-degree to 360-degree space in the horizontal direction) around the meeting device, and refers to an image obtained through predetermined processing on image information of a curved-surface image captured by the meeting device. The predetermined processing may be various kinds of processing for creating the image information of the surroundings from information of a captured image, such as flattening processing to be performed on a curved-surface captured image. The predetermined processing may include processing of creating an image of the surroundings, processing of clipping a speaker image, and processing of combining the image of the surroundings and the speaker image together. In the present embodiment, the image of the surroundings is described with the term "panoramic image". The panoramic image is an image having an angle of view of from 180 degrees to 360 degrees in substantially the horizontal direction. The panoramic image is not necessarily captured by a single meeting device, and may be captured by a combination of a plurality of image-capturing devices having an ordinary angle of view. The meeting device is installed at a place such as on a table for use in a conference held at a site or to grasp a surrounding circumstance. The meeting device may also be a device used for monitoring (for security, crime prevention, or the like), watching (in child rearing, nursing case, or the like), or field circumstance analysis (for solution, marketing, or the like).

The "recording information" refers to information that is recorded by the information recording app 41. The recording information is stored/saved to be viewed as information associated with identification information of a certain conference (meeting). The recording information includes, for example, information as follows:

moving image information created based on screen information displayed by a selected app (such as a teleconference app) and a panoramic image of the surroundings of a device obtained by the device;

combined audio information obtained by the teleconference app (terminal apparatus) and the meeting device at a site during the conference (meeting);

text information converted from the obtained audio information; and other data and images that are related information related to the conference (meeting). The other data and images include, for example, a file of presentation material used during the conference, an added memo, translated data of the text data, images and stroke data created by a cloud electronic whiteboard service during the conference.

When the information recording app 41 records the screen of the teleconference app 42 and the conference at the site, the recording information may serve as the minutes of the held conference. The minutes are an example of the recording information. The way the recording information is called changes according to an activity performed in the teleconference or at the site, and the recording information may be called, for example, a communication record, a site circumstance record, or the like. The recording information includes, for example, files of a plurality of formats such as a moving image file (such as a combined moving image), an audio file, a text data file (text data obtained through speech recognition on audio), a document file, an image file, and a spreadsheet file. The files are mutually associated with identification information of the conference. Thus, when the files are viewed, the files are collectively or selectively viewable in time series.

The term "tenant" refers to a group of users (such as a company, a local government, or an organization that is part of such a company or local government) that has a contract to receive a service from a service provider. In the present embodiment, creation of the recording information and conversion into text data are performed since the tenant has a contract with the service provider.

The term "telecommunication" refers to audio-and-video-based communication using software and terminal apparatuses with a counterpart at a physically remote site. A teleconference is an example of telecommunication. A conference may also be referred to as an assembly, a meeting, an arrangement, a consultation, an application for a contract or the like, a gathering, a meet, a meet-up, a seminar, a workshop, a study meeting, a study session, a training session, or the like.

The term "site" refers to a place where an activity is performed. A conference room is an example of the site. The conference room is a room installed for use in a conference. The term "site" may also refer to various places such as a home, a reception, a store, a warehouse, and an outdoor site, and may refer to any place or space where a terminal apparatus, a device, or the like is installable.

The term "sound" refers to an utterance made by a person, a surrounding sound, or the like. The term "audio data" refers to data to which the sound is converted. However, in the present embodiment, the sound and the audio data will be described without being strictly distinguished from each other.

A display device may be any device that displays information and is operated by the user or used for explanation by the user located nearby. In the present embodiment, the display device is described with the term "electronic whiteboard 2". The electronic whiteboard may also be referred to as an electronic information board or the like. A projector is known as an equivalent device of the electronic whiteboard 2. If the electronic whiteboard 2 is a projector, a target to be clipped is not a portion of an image including the main body of the projector but is an image projected by the projector. In this case, it becomes more difficult to detect a direction of the projected image based on a specific sound but the direction is successfully identified with another method. The display device may also be a digital signage, a television, a display, a multifunction peripheral, a teleconference terminal, or the like.

The expression "a user is using a display device" (or "a display device is in use by the user") includes not only a circumstance in which the user is using the display device but also a circumstance in which the user is highly likely to use the display device. The circumstance in which the user is highly likely to use the display device refers to a state in which the user approaches the display device or has a pen in their hand.

Example of System Configuration

Figure 3:
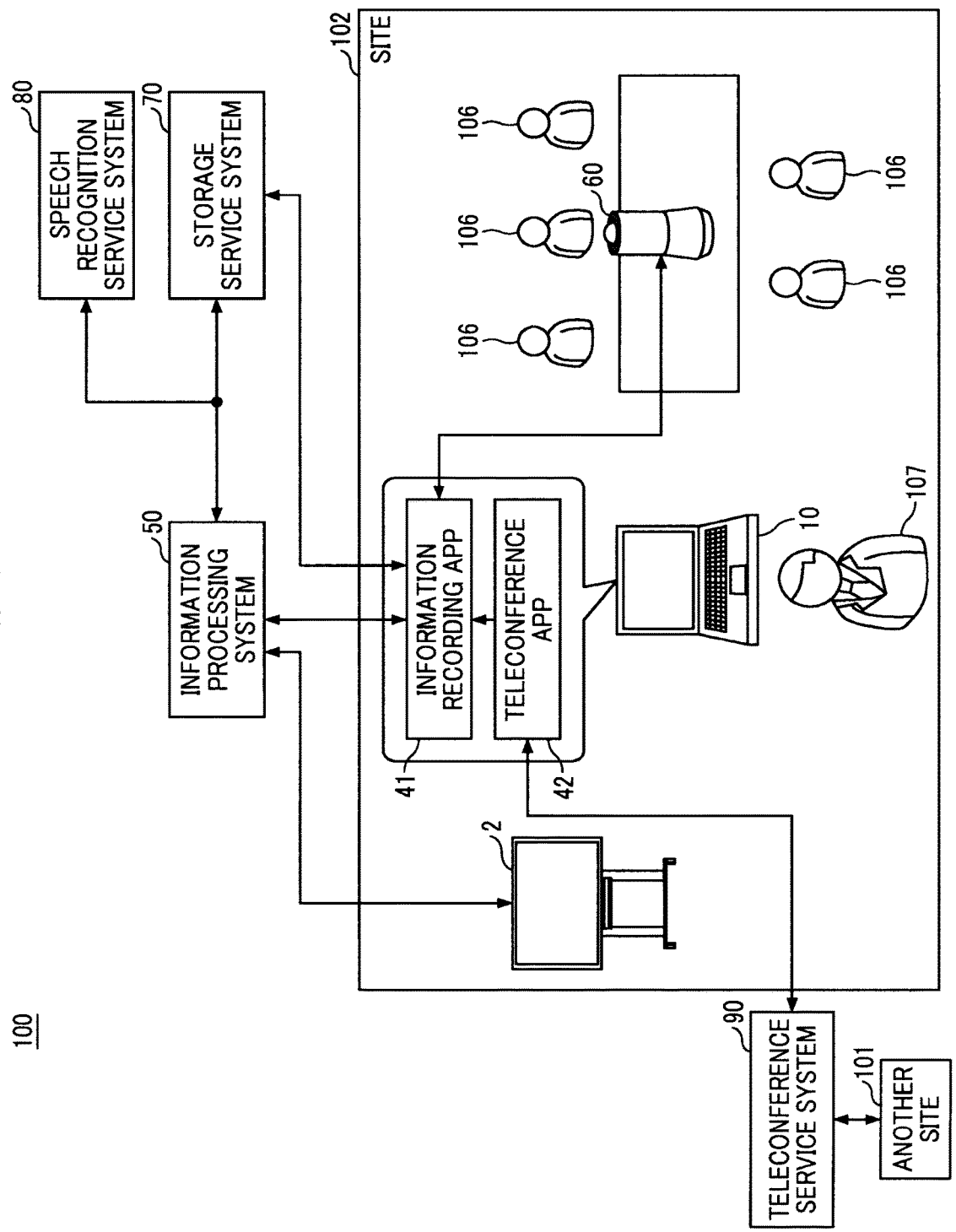
FIG. 3 is a diagram illustrating an example of a configuration of a recording information creation system according to the embodiment of the present disclosure.

The system configuration of the recording information creation system 100 will be described with reference to FIG. 3. FIG. 3 illustrates an example of the configuration of the recording information creation system 100. FIG. 3 illustrates one site (the site 102) among a plurality of sites between which a teleconference is held. The terminal apparatus 10 at the site 102 communicates with the information processing system 50, the storage service system 70, and the teleconference service system 90 via a network. The meeting device 60 and the electronic whiteboard 2 are disposed at the site 102. The terminal apparatus 10 is communicably connected to the meeting device 60 via a Universal Serial Bus (USB) cable or the like.

At least the information recording app 41 and the teleconference app 42 operate on the terminal apparatus 10. The teleconference app 42 can communicate with the terminal apparatus 10 at the other site 101 via the teleconference service system 90 over the network to allow users at the sites to have a conference from the remote places. The information recording app 41 uses functions of the information processing system 50 and the meeting device 60 to create recording information in the teleconference held by the teleconference app 42.

In the present embodiment, an example of creating recording information during a teleconference will be described. However, the conference is not necessarily a conference that involves communication to a remote site. That is, the conference may be a conference in which participants at one site participate. In this case, sound collected by the meeting device 60 is stored without being combined. The rest of the process performed by the information recording app 41 is the same.

The terminal apparatus 10 includes a camera having an ordinary angle of view built therein (or may include a camera externally attached thereto). The camera captures an image of a front space including the user 107 who operates the terminal apparatus 10. With the ordinary angle of view, a non-panoramic image is obtained. In the present embodiment, a flat image that is not a curved-surface image such as a spherical image is obtained. The terminal apparatus 10 includes a microphone built therein (or may include a microphone externally attached thereto). The microphone collects sound around the user 107 or the like who operates the terminal apparatus 10. Thus, the user 107 can have a common teleconference using the teleconference app 42 without being conscious of the information recording app 41. The information recording app 41 and the meeting device 60 do not affect the teleconference app 42 except for an increase in the processing load of the terminal apparatus 10.

The information recording app 41 is an app that communicates with the meeting device 60, and creates and records recording information. The meeting device 60 is a device used during a meeting, and includes an image-capturing device (such as a camera) that captures a panoramic image, a microphone, and a loudspeaker. The camera included in the terminal apparatus 10 can capture an image of only a limited range of the front space. In contrast, the camera included in the meeting device 60 can capture an image of the entire space around the meeting device 60 (the space subjected to image-capturing is not necessarily the entire space). The meeting device 60 can keep a plurality of participants 106 illustrated in FIG. 3 within the angle of view at all times.

The meeting device 60 also clips a speaker image from a panoramic image and combines audio data obtained by the meeting device 60 and audio data output by the terminal apparatus 10 (including audio data received by the teleconference app 42). The place where the meeting device 60 is installed is not limited to on a desk or a table, and the meeting device 60 may be disposed at any place at the site 102. Since the meeting device 60 can capture a spherical image, for example, with a spherical camera, the meeting device 60 may be disposed on a ceiling, for example. Alternatively, the meeting device 60 may capture a hemispherical image. The meeting device 60 may be installed at another site or at any site.

The information recording app 41 displays a list of apps being executed on the terminal apparatus 10, combines images for the above-described recording information (creates the combined moving image), plays the combined moving image, receives editing, etc. The information recording app 41 also displays a list of teleconferences that have been held or are to be held. The list of teleconferences is used in information related to recording information to allow the user to link a teleconference with the recording information.

The teleconference app 42 is an application that establishes a connection to and communicates with another terminal apparatus at the other site 101, transmits and receives an image and sound, displays the image and outputs the sound to allow the terminal apparatus 10 to perform telecommunication with the other terminal apparatus. The teleconference app 42 may be referred to as a telecommunication app, a remote information sharing application, or the like.

The information recording app 41 and the teleconference app 42 each may be a web app or a native app. A web app is an app in which a program on a web server and a program on a web browser or a native app cooperate with each other to perform processing, and is not to be installed on the terminal apparatus 10. A native app is an app that is installed and used on the terminal apparatus 10. In the present embodiment, both the information recording app 41 and the teleconference app 42 are described as native apps.

The terminal apparatus 10 may be a general-purpose information processing apparatus having a communication function, such as a personal computer (PC), a smartphone, or a tablet terminal, for example. The terminal apparatus 10 may also be the electronic whiteboard 2, a game machine, a personal digital assistant (PDA), a wearable PC, a car navigation system, an industrial machine, a medical device, a smart home appliance, or the like. The terminal apparatus 10 may be any apparatus on which at least the information recording app 41 and the teleconference app 42 operate.

The electronic whiteboard 2 displays, on a display, data handwritten on a touch panel with an input means such as a pen or a finger. The electronic whiteboard 2 can communicate with the terminal apparatus 10 or the like in a wired or wireless manner, and capture a screen displayed by the terminal apparatus 10 and display the screen on the display. The electronic whiteboard 2 can convert handwritten data into text data, and share information displayed on the display with the electronic whiteboard 2 at another site. The electronic whiteboard 2 may be a whiteboard, not including a touch panel, onto which a projector projects an image. The electronic whiteboard 2 may be a tablet terminal, a notebook PC, a PDA, a game machine, or the like including a touch panel.

The electronic whiteboard 2 can communicate with the information processing system 50. For example, after being powered on, the electronic whiteboard 2 performs polling on the information processing system 50 to receive information from the information processing system 50. In this disclosure, the electronic whiteboard 2 and the meeting device 60 (or at least the image-capturing device of the meeting device 60) that captures an image of the electronic whiteboard 2 operate as a display system.

The information processing system 50 includes one or more information processing apparatuses deployed over a network. The information processing system 50 includes one or more server apps that perform processing in cooperation with the information recording app 41, and an infrastructure service. The server apps manage a list of teleconferences, recording information recorded during a teleconference, various settings and storage paths, etc. The infrastructure service performs user authentication, makes a contract, performs charging processing, etc.

All or some of the functions of the information processing system 50 may exist in a cloud environment or in an on-premise environment. The information processing system 50 may include a plurality of server apparatuses or may include a single information processing apparatus. For example, the server apps and the infrastructure service may be provided by separate information processing apparatuses, and information processing apparatuses may exist for respective functions of the server apps. The information processing system 50 may be integrated with the storage service system 70 and the speech recognition service system 80 described below.

The storage service system 70 operates as a storage means on a network, and provides a storage service for accepting storage of files. Examples of the storage service system 70 include OneDrive®, Google Workspace®, and Dropbox®. The storage service system 70 may be on-premise network-attached storage (NAS) or the like.

The speech recognition service system 80 provides a service of performing speech recognition on audio data and converting the audio data into text data. The speech recognition service system 80 may be a general-purpose commercial service or part of the functions of the information processing system 50. As the speech recognition service system 80, different service systems may be set and used for different users or tenants or different conferences.

Example of Hardware Configuration

A hardware configuration of the information processing system 50 and the terminal apparatus 10 according to the present embodiment will be described with reference to FIG. 4.

Information Processing System and Terminal Apparatus

Figure 4:
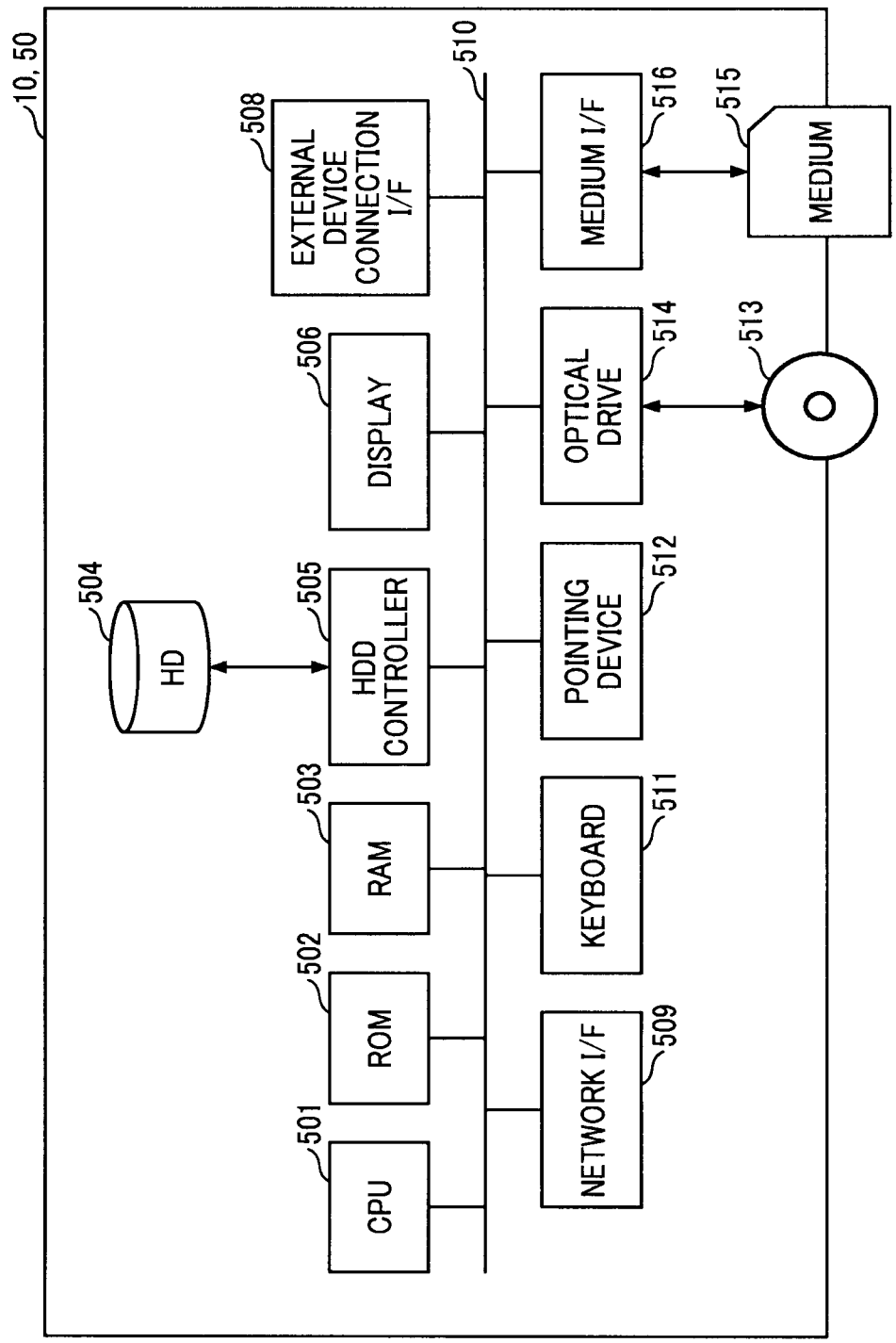
FIG. 4 is a diagram illustrating an example of a hardware configuration of an information processing system and a terminal apparatus according to the embodiment of the present disclosure.

FIG. 4 is a diagram illustrating an example of a hardware configuration of the information processing system 50 and the terminal apparatus 10 according to the present embodiment. As illustrated in FIG. 4, the information processing system 50 and the terminal apparatus 10 each are implemented by a computer and each include a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514, and a medium I/F 516.

The CPU 501 controls operations of the entire information processing system 50 and the entire terminal apparatus 10. The ROM 502 stores programs such as an initial program loader (IPL) to boot the CPU 501. The RAM 503 is used as a work area for the CPU 501. The HD 504 stores various kinds of data such as a program. The HDD controller 505 controls reading or writing of various kinds of data from or to the HD 504 under control of the CPU 501. The display 506 displays various kinds of information such as a cursor, a menu, a window, characters, or an image. The external device connection I/F 508 is an interface for connecting various external devices. Examples of the external devices in this case include, but are not limited to, a USB memory and a printer. The network I/F 509 is an interface for performing data communication via a network. The bus line 510 is, for example, an address bus or a data bus for electrically connecting the components such as the CPU 501 illustrated in FIG. 4 to one another.

The keyboard 511 is an example of an input means including a plurality of keys used for inputting characters, numerical values, various instructions, or the like. The pointing device 512 is an example of an input means used to select or execute various instructions, select a target for processing, or move a cursor. The optical drive 514 controls reading or writing of various kinds data from or to an optical storage medium 513 that is an example of a removable recording medium. The optical storage medium 513 may be a compact disc (CD), a digital versatile disc (DVD), a Blu-ray® disc, or the like. The medium I/F 516 controls reading or writing (storing) of data from or to a recording medium 515 such as a flash memory.

Meeting Device

Figure 5:
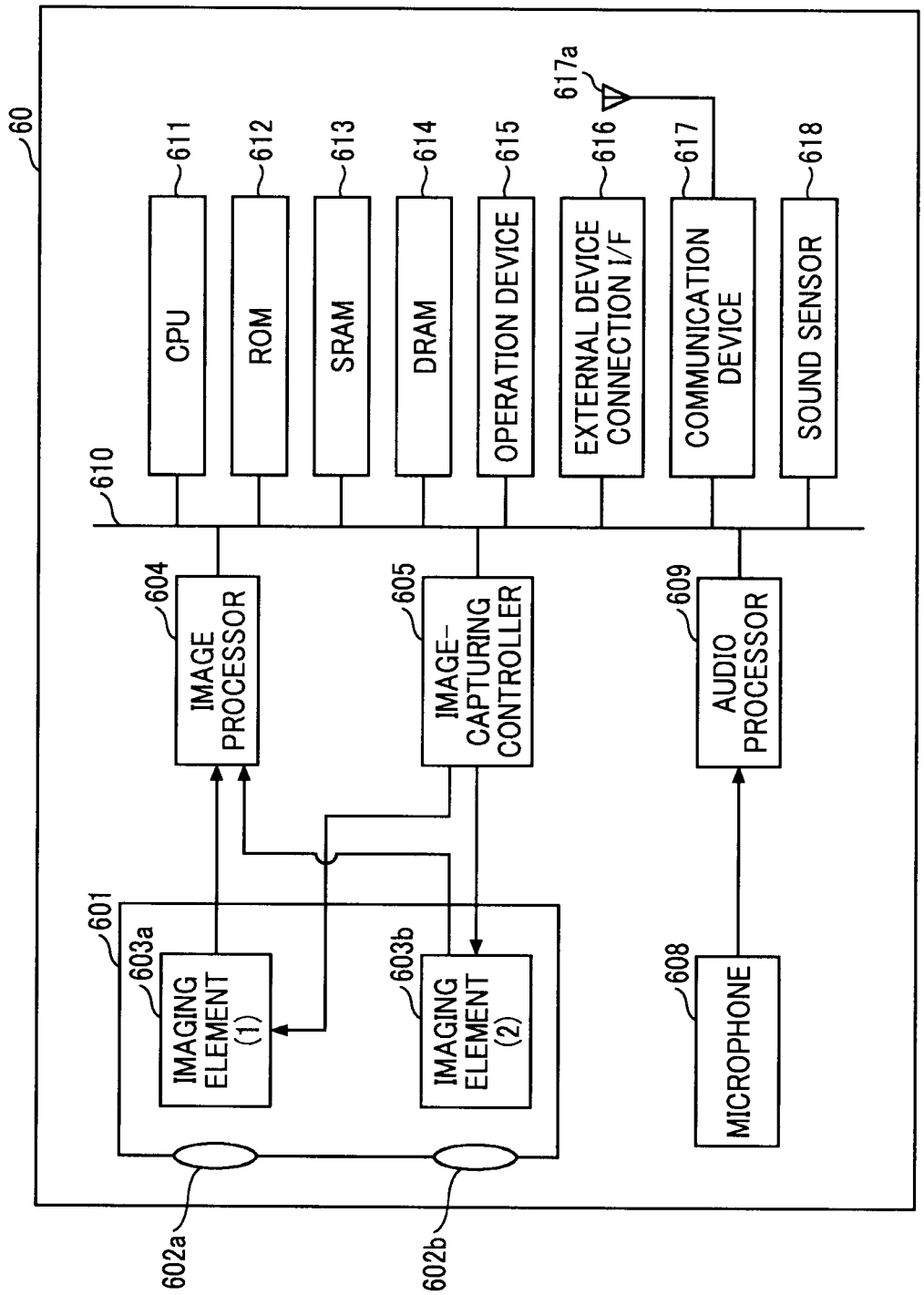
FIG. 5 is a diagram illustrating an example of a hardware configuration of the meeting device according to the embodiment of the present disclosure.

A hardware configuration of the meeting device 60 will be described with reference to FIG. 5. FIG. 5 is an example of a hardware configuration diagram of the meeting device 60 that captures a 360-degree moving image. In the description below, the meeting apparatus 60 captures a moving image of a 360-degree space around the meeting device 60 at a predetermined height, with imaging elements, the number of which may be one or two or more. The meeting device 60 is not necessarily a dedicated device, and may be a PC, a digital camera, a smartphone, or the like to which an image-capturer for a 360-degree moving image is externally attached so that the PC, the digital camera, the smartphone, or the like has substantially the same functions as the meeting device 60.

As illustrated in FIG. 5, the meeting device 60 includes an image-capturer 601, an image processor 604, an image-capturing controller 605, a microphone 608, an audio processor 609, a CPU 611, a ROM 612, a static random access memory (SRAM) 613, a dynamic random access memory (DRAM) 614, an operation device 615, an external device connection I/F 616, a communication device 617, an antenna 617a, and a sound sensor 618.

The image-capturer 601 includes wide-angle lenses (so-called fish-eye lenses) 602a and 602b having an angle of view of 360 degrees to form a hemispherical image, and imaging elements (image sensors) 603a and 603b provided for the wide-angle lens 602a and 602b, respectively. Each of the imaging elements 603a and 603b includes an image sensor such as a complementary metal oxide semiconductor (CMOS) sensor or a charge coupled device (CCD) sensor, a timing generation circuit, and a group of registers. The image sensor converts an optical image formed by the corresponding fisheye lens 602a or 602b into an electric signal to output image data. The timing generation circuit generates horizontal or vertical synchronization signals, and pixel clocks for the image sensor. Various data such as commands and parameters for operations of the corresponding imaging element are set in the group of registers. The image-capturer 601 may be a 360-degree camera (may be called a spherical camera) and is an example of an image-capturing means that captures an image of a 360-degree space around the meeting device 60.

Each of the imaging elements 603a and 603b (image sensors) of the image-capturer 601 is connected to the image processor 604 via a parallel I/F bus. On the other hand, each of the imaging elements 603a and 603b of the image-capturer 601 is connected to the image-capturing controller 605 via a serial I/F bus (such as an I2C bus). Each of the image processor 604, the image-capturing controller 605, and the audio processor 609 is connected to the CPU 611 via a bus 610. The ROM 612, the SRAM 613, the DRAM 614, the operation device 615, the external device connection I/F 616, the communication device 617, and the sound sensor 618 are also connected to the bus 610.

The image processor 604, which may be implemented by circuitry, obtains image data (such as fisheye image) output from each of the imaging elements 603a and 603b through the parallel I/F bus and performs predetermined processing on the image data to create data of a panoramic image and data of a speaker image. The image processor 604 combines the panoramic image and the speaker image or the like together to output a combined moving image.

The image-capturing controller 605, which may be implemented by circuitry, usually serves as a master device, whereas the imaging elements 603a and 603b usually serve as a slave device. The image-capturing controller 605 sets commands in the groups of registers of the respective imaging elements 603a and 603b through the I2C bus. The image-capturing controller 605 receives the commands from the CPU 611. The image-capturing controller 605 obtains status data in the groups of registers of the respective imaging elements 603a and 603b through the I2C bus. The image-capturing controller 605 then sends the obtained status data to the CPU 611.

The image-capturing controller 605 instructs the imaging elements 603a and 603b to output image data at a time when an image-capturing start button of the operation device 615 is pressed or a time when the image-capturing controller 605 receives an image-capturing start instruction from the CPU 611. The meeting device 60 may have functions corresponding to a preview display function and a moving image display function implemented by a display (for example, a display of a PC or a smartphone). In this case, the image data is continuously output from the imaging elements 603a and 603b at a predetermined frame rate (frames/minute).

As described later, the image-capturing controller 605 operates in cooperation with the CPU 611 to function as a synchronization control means that makes output timings of the pieces of image data from the respective imaging elements 603a 603b synchronous. In the present embodiment, the meeting device 60 does not include a display. However, in some embodiments, the meeting device 60 may include a display.

The microphone 608 converts sound into audio (signal) data. The audio processor 609, which may be implemented by circuitry, obtains the audio data output from the microphone 608 through an I/F bus and performs predetermined processing on the audio data.

The CPU 611 controls operations of the entire meeting device 60 and performs desirable processing. The ROM 612 stores various programs to be executed by the CPU 611. Each of the SRAM 613 and the DRAM 614 is a work memory, and store programs being executed by the CPU 611 or data being processed. In particular, in one example, the DRAM 614 stores image data being processed by the image processor 604 and processed data of an equirectangular projection image.

The operation device 615 collectively refers to various operation buttons such as an image-capturing start button. The user operates the operation device 615 to start image-capturing or recording, power on or off the meeting device 60, establish a connection, perform communication, and input settings such as various image-capturing modes and image-capturing conditions.

The external device connection I/F 616 is an interface for connecting various external devices. Examples of the external devices in this case include, but not limited to, a PC, a display, a projector, and an electronic whiteboard. Examples of the external device connection I/F 616 may include a USB terminal and a High-Definition Multimedia Interface (HDMI®) terminal. For example, the USB terminal may be a socket terminal for Micro-USB. The moving image data or image data stored in the DRAM 614 is transmitted to an external terminal or recorded in an external medium via the external device connection I/F 616. A plurality of external device connection I/Fs 616 may be used to, for example, while transmitting the panoramic image captured and obtained by the meeting device 60 to a PC via a USB to record the panoramic image in the PC, acquire a video (for example, screen information to be displayed by the teleconference app) from the PC to the meeting device 60 and transmit the video from the meeting device 60 to another external device (such as a display, a projector, or an electronic whiteboard) via HDMI® and display the video. The communication device 617, which may be implemented by a network I/F, may communicate with a cloud server via the Internet by a wireless communication technology such as Wi-Fi via the antenna 617a provided in the meeting device 60, and transmit the stored moving image data or image data to the cloud server. The communication device 617 may communicate with a device located nearby by using a short-range wireless communication technology such as Bluetooth Low Energy (BLE®) or Near Field Communication (NFC).

The sound sensor 618 is a sensor that acquires 360-degree audio information in order to specify the direction from which a loud sound is input within a 360-degree space around the meeting device 60 (on a horizontal plane). The audio processor 609 determines the direction in which the volume of the sound is highest, based on the input 360-degree audio parameter, and outputs the direction from which the sound is input within the 360-degree space.

In this example, another sensor (such as an azimuth/acceleration sensor or a Global Positioning System (GPS)) may calculate an azimuth, a position, an angle, an acceleration, etc. and use the calculated azimuth, position, angle, acceleration, etc. in image correction or position information to be added.

The image processor 604 also performs processing described below.

The CPU 611 creates a panoramic image according to a method below. The CPU 611 performs predetermined camera image processing such as Bayer conversion (RGB interpolation processing) on raw data input from the image sensor that input a spherical video, and creates a fisheye image (a video including curved-surface images). The CPU 611 performs flattening processing such as dewarping processing (distortion correction processing) on the created fisheye video (curved-surface video) to create a panoramic image (video including flat-surface images) of a 360-degree space around the meeting device 60.

The CPU 611 creates a speaker image according to a method below. The CPU 611 clips a portion including a speaker from the panoramic image (video including flat-surface images) of the 360-degree surrounding space to create a speaker image. The CPU 611 determines, as the direction of the speaker, the sound input direction identified from the 360-degree space output by using the sound sensor 618 and the audio processor 609, and clips the speaker image from the panoramic image. At this time, in the method of clipping an image of a person based on the sound input direction, the CPU 611 clips a 30-degree portion around the sound input direction identified from the 360-degree space, and performs face detection on the 30-degree portion to clip the speaker image. The CPU 611 further specifies speaker images of a specific number of persons (three persons, for example) who have made an utterance most recently among the clipped speaker images.

The panoramic image and the one or more speaker images may be individually transmitted to the information recording app 41. Alternatively, the meeting device 60 may create one image from the panoramic image and the one or more speaker images and transmit the one image to the information recording app 41. In the present embodiment, the panoramic image and the one or more speaker images are individually transmitted from the meeting device 60 to the information recording app 41.

FIGS. 6A and 6B are diagrams for describing an image-capturing range of the meeting device 60. As illustrated in FIG. 6A, the meeting device 60 captures an image of a 360-degree range in the horizontal direction, around the meeting device 60. As illustrated in FIG. 6B, the meeting device 60 has an image-capturing range that extends upward and downward by predetermined angles with respect to the direction horizontal to the height of the meeting device 60 which is defined as 0 degree. For example, the meeting device 60 captures an image of upper and lower ranges of predetermined angles from 0 degree, horizontal to the meeting device. The predetermined angles include an upper-range angle "a" of 60 degrees, and a lower-range angle "b" of 30 degrees, for example.

FIG. 7 is a diagram for describing a panoramic image and clipping of speaker images. As illustrated in FIG. 7, an image captured by the meeting device 60 forms a portion 110 of a sphere, and thus has a three-dimensional shape. As illustrated in FIG. 6B, the meeting device 60 sections the angle of view into predetermined angles of the upward and downward ranges and predetermined angles of the leftward and rightward ranges, and performs perspective projection transformation on the resulting sections. The meeting device 60 thoroughly performs perspective projection transformation on the entire 360-degree range in the horizontal direction to obtain a predetermined number of flat images. The meeting device 60 laterally links the predetermined number of flat images together to obtain a panoramic image 111. The meeting device 60 performs face detection on a predetermined range around the sound direction in the panoramic image 111, and clips 15-degree leftward and rightward ranges from the center of the face (i.e., a 30-degree range in total) to create a speaker image 112.

Electronic Whiteboard

Figure 8:
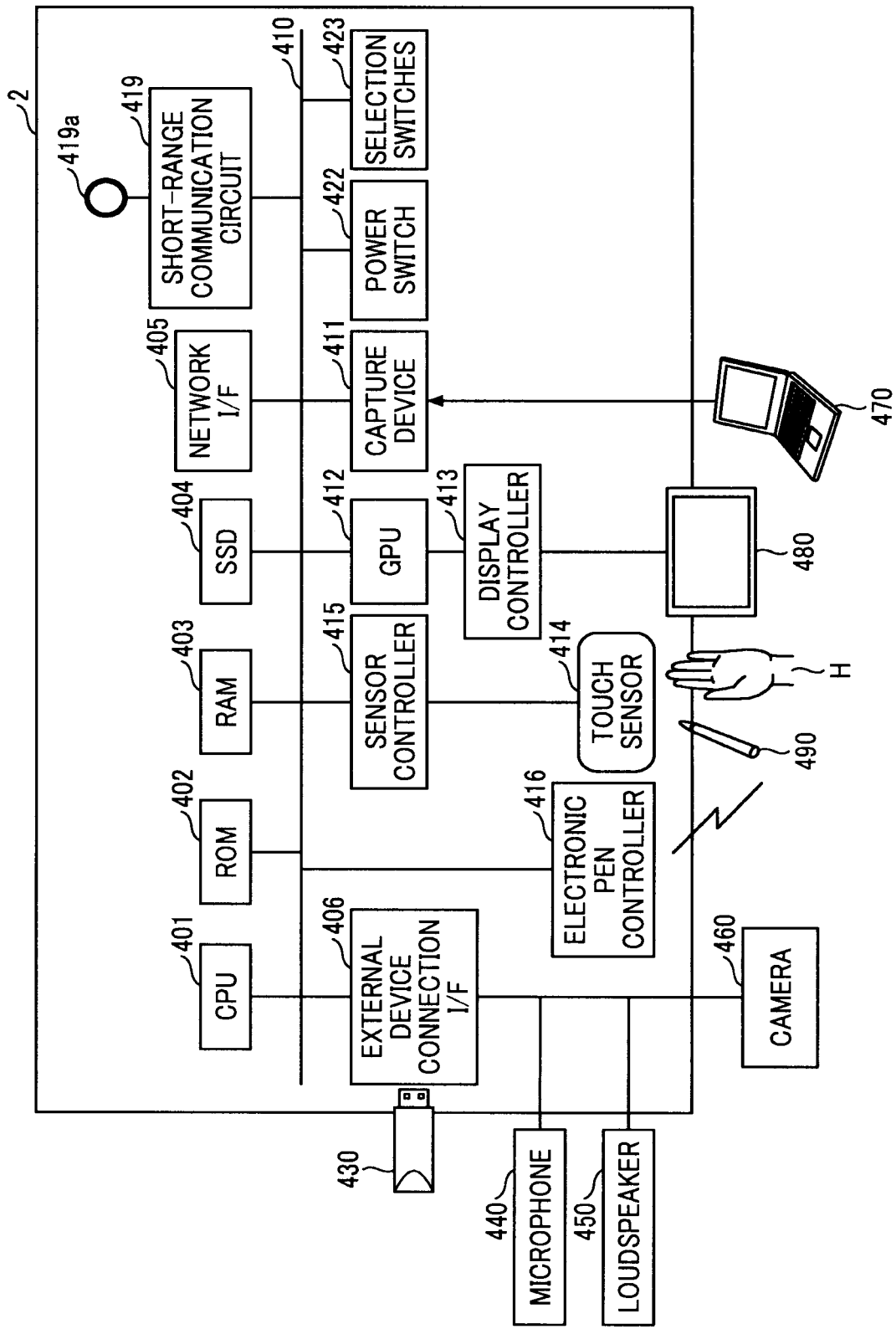
FIG. 8 is a diagram illustrating an example of a hardware configuration of the electronic whiteboard according to the embodiment of the present disclosure.

FIG. 8 is a diagram illustrating an example of a hardware configuration of the electronic whiteboard 2. As illustrated in FIG. 8, the electronic whiteboard 2 includes a CPU 401, a ROM 402, a RAM 403, a solid state drive (SSD) 404, a network I/F 405, and an external device connection I/F 406.

The CPU 401 controls operations of the entire electronic whiteboard 2. The ROM 402 stores programs such as an IPL to boot the CPU 401. The RAM 403 is used as a work area for the CPU 401. The SSD 404 stores various kinds of data such as a program for the electronic whiteboard 2. The network I/F 405 controls communication with other devices via a communication network. The external device connection I/F 406 is an interface for connecting various external devices. Examples of the external devices in this case include, but not limited to, a USB memory 430 and externally-connected devices such as a microphone 440, a loudspeaker 450, and a camera 460.

The electronic whiteboard 2 further includes a capture device 411, a graphics processing unit (GPU) 412, a display controller 413, a touch sensor 414, a sensor controller 415, an electronic pen controller 416, a short-range communication circuit 419, an antenna 419a of the short-range communication circuit 419, a power switch 422, and selection switches 423.

The capture device 411 causes a display of an external-connected PC 470 to display video (image) information as a still image or a moving image. The GPU 412 is a semiconductor chip that exclusively handles graphics. The display controller 413 controls and manages displaying of a screen to display an image output from the GPU 412 on a display 480. The touch sensor 414 detects a touch of an electronic pen 490, a user's hand H, or the like onto the display 480. The sensor controller 415 controls processing of the touch sensor 414. The touch sensor 414 receives a touch input and detects coordinates of the touch input according to the infrared blocking system. In this method of receiving a touch input and detecting the coordinates of the touch input, the display 480 is provided with two light emitting/receiving devices disposed on respective upper side ends of the display 480 and with a reflector member surrounding the display 480. The light emitting/receiving devices emit a plurality of infrared rays in parallel to a surface of the display 480. The plurality of infrared rays are reflected by the reflector member. Light receiving elements of the light emitting/receiving devices receive light returning along the same optical path as the optical path of the emitted light. The touch sensor 414 outputs identifiers (IDs) of infrared rays that are emitted from the two light emitting/receiving devices and are blocked by an object, to the sensor controller 415. Based on the IDs of the infrared rays, the sensor controller 415 detects coordinates of a position touched by the object. The electronic pen controller 416 communicates with the electronic pen 490 to detect a touch of the tip or bottom of the electronic pen 490 onto the display 480. The short-range communication circuit 419 is a communication circuit that is compliant with Near Field Communication (NFC), Bluetooth®, or the like. The power switch 422 is used for powering on and off the electronic whiteboard 2. The selection switches 423 are a group of switches used for adjusting brightness, hue, etc. of images displayed on the display 480, for example.

The electronic whiteboard 2 further includes a bus line 410. The bus line 410 is, for example, an address bus or a data bus for electrically connecting the components such as the CPU 401 illustrated in FIG. 8 to one another.

Note that the touch sensor 414 is not limited to a touch sensor of the infrared blocking system, and may be a capacitive touch panel that detects a change in capacitance to specify the touched position. The touch sensor 414 may be a resistive-film touch panel that specifies the touched position based on a change in voltage across two opposing resistive films. The touch sensor 414 may be an electromagnetic inductive touch panel that detects electromagnetic induction generated by a touch of an object onto a display to specify the touched position. The touch sensor 414 may use any other various detection means. The electronic pen controller 416 may determine whether there is a touch of another part of the electronic pen 490 such as a part of the electronic pen 490 held by the user as well as the tip and the bottom of the electronic pen 490.

Functions

Figure 9:
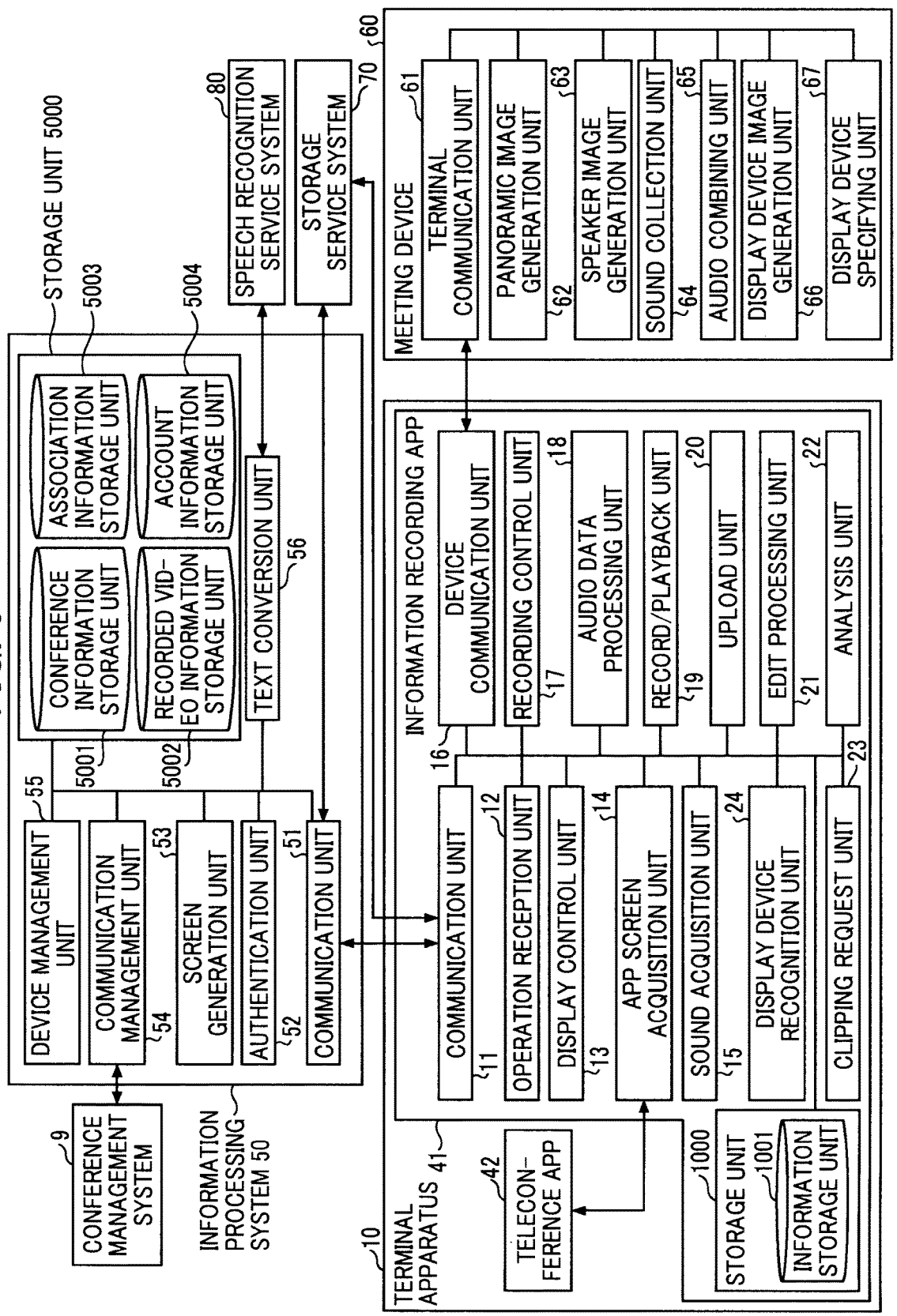
FIG. 9 is an example of a functional block diagram for describing, as individual blocks, functions of the terminal apparatus, the meeting device, and the information processing system of the recording information creation system according to the embodiment of the present disclosure.

A functional configuration of the recording information creation system 100 will be described with reference to FIG. 9. FIG. 9 is an example of a functional block diagram for describing, as individual blocks, functions of the terminal apparatus 10, the meeting device 60, and the information processing system 50 of the recording information creation system 100.

Terminal Apparatus

The information recording app 41 operating on the terminal apparatus 10 provides a plurality of functional units including a communication unit 11, an operation reception unit 12, a display control unit 13, an app screen acquisition unit 14, a sound acquisition unit 15, a device communication unit 16, a recording control unit 17, an audio data processing unit 18, a record/playback unit 19, an upload unit 20, an edit processing unit 21, an analysis unit 22, a clipping request unit 23, and a display device recognition unit 24. These units of the terminal apparatus 10 are functions that are implemented by or means that are caused to function by any of the components illustrated in FIG. 4 operating in accordance with instructions of the CPU 501 based on the information recording app 41 loaded to the RAM 503 from the HD 504. The terminal apparatus 10 also includes a storage unit 1000 implemented by the HD 504 or any desired memory illustrated in FIG. 4. The storage unit 1000 includes an information storage unit 1001, which is implemented by a database.

The communication unit 11 communicates various kinds of information with the information processing system 50 via a network.

For example, the communication unit 11 receives a list of teleconferences from the information processing system 50, and transmits an audio data recognition request to the information processing system 50. The communication unit 11 receives an operation start notification and an operation end notification from the electronic whiteboard 2.

The display control unit 13 displays various screens serving as a user interface in the information recording app 41, in accordance with screen transitions set in the information recording app 41. The operation reception unit 12 receives various operations performed on the information recording app 41.

The app screen acquisition unit 14 acquires screen information to be displayed by an app selected by a user, screen information of a desktop screen, or the like from such as an operating system (OS). When the app selected by the user is the teleconference app 42, the app screen acquisition unit 14 acquires a screen generated by the teleconference app 42 (an image including a captured image of a user of the terminal apparatus 10 captured by a camera of the terminal apparatus 10 at each site, a display image of a shared material, and participant icons, participant names, etc.). The screen information (app screen) displayed by the app is information that is displayed in the form of a window by the app being executed and is acquired as an image by the information recording app 41. The window of the application is displayed on a monitor or the like such that the area of the window is rendered as an area in the entire desktop image. The screen information displayed by the app is acquirable by another app (such as the information recording app 41) as an image file or a moving image file including a plurality of consecutive images via an application programming interface (API) of the OS, an API of the app that displays the screen information, or the like. The screen information of the desktop screen is information including an image of the desktop screen generated by the OS, and is similarly acquirable as an image file or a moving image file via an API of the OS. The format of these image files may be bitmap, PNG, or any other format. The format of the moving image file may be MP4 or any other format.

The sound acquisition unit 15 acquires sound (including audio data received from the teleconference app 42 during the teleconference) output from a microphone or an earphone of the terminal apparatus 10. Even when the output sound is muted, the sound acquisition unit 15 can acquire the sound. A user operation such as selection of the teleconference app 42 is not to be performed for audio data, and the sound acquisition unit 15 can acquire sound to be output by the terminal apparatus 10 via an API of the OS or an API of the app. Thus, the audio data received by the teleconference app 42 from the other site 101 is also acquired. When the teleconference app 42 is not being executed or a teleconference is not being held, the information recording app 41 may fail to acquire the audio data. In this example, the sound acquired by the sound acquisition unit 15 may be the audio data to be output, excluding the sound collected by the terminal apparatus 10. This is because the meeting device 60 separately collects the sound at the site.

The device communication unit 16 communicates with the meeting device 60 via a USB cable, for example. The device communication unit 16 may communicate with the meeting device 60 via a wireless local area network (LAN), Bluetooth®, or the like. The device communication unit 16 receives the panoramic image and the speaker image from the meeting device 60, and transmits the audio data acquired by the sound acquisition unit 15 to the meeting device 60. The device communication unit 16 receives the combined audio data obtained by the meeting device 60.

The recording control unit 17 combines the panoramic image and the speaker image received by the device communication unit 16 and the screen of the app acquired by the app screen acquisition unit 14 together to create a combined image. Note that the meeting device 60 may combine the panoramic image and the speaker image. A panoramic moving image including the panoramic images, a speaker moving image including the speaker images, an app screen moving image including the app screen, and a combined moving image including the panoramic images and the speaker images may be stored in the storage service system 70 as individual moving image files. In this case, the panoramic moving image, the speaker moving image, the app screen moving image, or the combined moving image of the panoramic images and the speaker images may be called and displayed on one display screen when being viewed.

The audio data processing unit 18 extracts audio data combined with the combined moving image, or requests the information processing system 50 to convert the combined audio data received from the meeting device 60 into text data.

The record/playback unit 19 plays the combined moving image. The combined moving image is stored in the terminal apparatus 10 during recording, and then uploaded to the information processing system 50.

After the teleconference ends, the upload unit 20 transmits the combined moving image to the information processing system 50.

The edit processing unit 21 edits (partially deletes, links, or the like) the combined moving image in accordance with a user operation.

The analysis unit 22 detects a two-dimensional code included in a panoramic image and analyzes the two-dimensional code to acquire information such as device identification information included in the two-dimensional code.

In response to receipt of an operation start notification from the electronic whiteboard 2, the clipping request unit 23 transmits an electronic whiteboard recording start request (clipping request) for the display device image 215 to the meeting device 60. In response to receipt of an operation end notification from the electronic whiteboard 2, the clipping request unit 23 transmits an electronic whiteboard recording end request (clipping end request) for the display device image 215 to the meeting device 60.

The display device recognition unit 24 learns the shape (circumscribed rectangle) of the electronic whiteboard 2 through machine learning in advance to detect the electronic whiteboard 2 from the panoramic image. The display device recognition unit 24 may simply recognize the electronic whiteboard 2 through pattern matching without using machine learning.

FIG. 10 illustrates moving image recording information stored in the information storage unit 1001. The moving image recording information includes items such as "conference ID", "recorded video ID", "update date and time", "title", "uploaded", and "storage destination". When a user logs into the information processing system 50, the information recording app 41 downloads conference information from a conference information storage unit 5001 of the information processing system 50. Data such as the conference ID included in the conference information is reflected in the moving image recording information. The moving image recording information in FIG. 10 is held by the terminal apparatus 10 operated by a certain user.

The item "conference ID" is identification information for identifying a teleconference being held. The conference ID is assigned when a schedule of the teleconference is registered to a conference management system 9, or is assigned by the information processing system 50 in response to a request from the information recording app 41. The conference management system 9 is a system that allows a user to register various information such as a schedule of a conference and a teleconference, a Uniform Resource Locator (URL) (conference link) for starting the teleconference, reservation information of a device to be used in the conference, and may be implemented by a scheduler connectable from the terminal apparatus 10 via a network. The conference management system 9 can transmit the registered schedule to the information processing system 50.

The item "recorded video ID" is identification information for identifying a combined moving image recorded during the teleconference. The recorded video ID is assigned by the meeting device 60, but may be assigned by the information recording app 41 or the information processing system 50. Different recorded video IDs are assigned for the same conference ID when the recording is ended in the middle of the teleconference but is started again for some reason.

The item "update date and time" is a date and time when the combined moving image is updated (recording is ended). When the combined moving image is edited, the update date and time is the date and time of editing.

The item "title" is a name of the conference. The title may be set when the conference is registered to the conference management system 9, or may be set by the user in any manner.

The item "uploaded" indicates whether the combined moving image has been uploaded to the information processing system 50.

The item "storage destination" indicates a location (URI: or file path) where the combined moving image and the text data are stored in the storage service system 70. The item "storage destination" allows the user to view the uploaded combined moving image as desired. Note that the combined moving image and the text data are stored with different file names following the URL, for example.

Meeting Device

Referring back to FIG. 9, the description is continued. The meeting device 60 includes a terminal communication unit 61, a panoramic image generation unit 62, a speaker image generation fruit 63, a sound collection unit 64, an audio combining unit 65, a display device image generation unit 66, and a display device specifying unit 67. These units of the meeting device 60 are functions that are implemented by or means that are caused to function by any of the components illustrated in FIG. 5 operating in accordance with instructions of the CPU 611 based on the program loaded to the DRAM 614 from the ROM 612.

The terminal communication unit 61 communicates with the terminal apparatus 10 via a USB cable. The terminal communication unit 61 may be connected to the terminal apparatus 10 by a cable. In some embodiments, the terminal communication unit 61 may be communicate with the terminal apparatus 10 via a wireless LAN, Bluetooth®, or the like.

The panoramic image generation unit 62 generates a panoramic image. The speaker image generation unit 63 generates a speaker image. The method of generating a panoramic image and a speaker image has been described with reference to FIGS. 6A to 7.

The sound collection unit 64 converts an audio signal acquired by the microphone 608 included in the meeting device 60 into (digital) audio data. Thus, the content of utterances made by the user and the participant at the site where the terminal apparatus 10 is installed is collected.

The audio combining unit 65 combines the audio transmitted from the terminal apparatus 10 and the audio collected by the sound collection unit 64. Thus, the audio of utterances made at the other site 101 and the audio of utterances made at the local site 102 are combined together.

The display device image generation unit 66 starts clipping the display device image 215 from the panoramic image in response to the electronic whiteboard recording start request (clipping request) from the terminal apparatus 10, and ends clipping the display device image 215 in response to the electronic whiteboard recording end request (clipping end request).

The display device specifying unit 67 specifies a display device. Specifically, the display device specifying unit 67 specifies the direction of the electronic whiteboard 2 in the panoramic image (that is, a specific area of the panoramic image including the electronic whiteboard 2), based on information related to the display device 2. Such information related to the display device 2 is information indicating the direction of the electronic whiteboard 2 set in advance, detection of a two-dimensional code or the like, detection of a sound of a specific frequency, or information on the display device such as the shape of the electronic whiteboard 2. The display device specifying unit 67 may perform speech recognition to acquire display device identification information. Either the terminal apparatus 10 or the meeting device 60 may specify the display device. When the terminal apparatus 10 specifies the display device, the display device specifying unit 67 keeps information on the direction of the electronic whiteboard 2 transmitted from the terminal apparatus 10.

Information Processing System

The information processing system 50 includes a communication unit 51, an authentication unit 52, a screen generation unit 53, a communication management unit 54, a device management unit 55, and a text conversion unit 56. These units of the information processing system 50 are functions that are implemented by or means that are caused to function by any of the components illustrated in FIG. 4 operating in accordance with instructions of the CPU 501 based on the program loaded to the RAM 503 from the HD 504. The information processing system 50 also includes a storage unit 5000 implemented by the HD 504 or any desired memory illustrated in FIG. 4. The storage unit 5000 includes the conference information storage unit 5001, a recorded video information storage unit 5002, an association information storage unit 5003, and an account information storage unit 5004, each of which may be implemented by a database.

The communication unit 51 transmits and receives various kinds of information to and from the terminal apparatus 10. For example, the communication unit 51 transmits a list of teleconferences to the terminal apparatus 10, and receives an audio data recognition request from the terminal apparatus 10.

The authentication unit 52 authenticates a user who operates the terminal apparatus 10. For example, the authentication unit 52 authenticates a user based on whether authentication information (a user ID and a password) included in an authentication request received by the communication unit 51 matches authentication information stored in advance. The authentication information may be a card number of an integrated circuit (IC) card, biometric information of a face, a fingerprint, or the like. The authentication unit 52 may use an external authentication system or an authentication method such as Open Authorization (OAuth) to perform authentication.

The screen generation unit 53 generates screen information to be displayed by the terminal apparatus 10. When the terminal apparatus 10 executes a native app, the terminal apparatus 10 holds the screen information and transmits the information to be displayed in a form of Extensible Markup Language (XML), for example. When the terminal apparatus 10 executes a web app, the screen information is created by HyperText Markup Language (HTML), XML, Cascade Style Sheet (CSS), JavaScript®, etc.

The communication management unit 54 acquires information related to a teleconference from the conference management system 9 by using an account of each user or a system account assigned to the information processing system 50. The communication management unit 54 stores conference information of a scheduled conference in association with a conference ID in the conference information storage unit 5001. The communication management unit 54 acquires conference information for which a user belonging to the tenant has a right to view. Since the conference ID is set for a conference, the teleconference and the recording information are associated with each other by the conference ID.

In response to receipt of device identification information from the terminal apparatus 10, the device management unit 55 stores the device identification information in association with the conference ID and the electronic whiteboard 2 and the meeting device 60 that are used in the conference in the association information storage unit 5003. Since a combined moving image is also associated with the conference ID, handwritten data and the combined moving image are also associated with each other. In response to the end of recording (the end of the conference), the device management unit 55 deletes the association from the association information storage unit 5003.

The text conversion unit 56 uses an external speech recognition service (for example, speech recognition service system 80) to convert audio data requested to be converted into text data by the terminal apparatus 10, into text data. In some embodiments, the text conversion unit 56 may perform this conversion.

FIG. 11 illustrates an example of conference information stored in the conference information storage unit 5001 and managed by the communication management unit 54. The communication management unit 54 uses the aforementioned account to acquire a list of teleconferences for which a user belonging to a tenant has a right to view. The right to view may be directly given from the information recording app 41 of the terminal apparatus 10 for conference information managed by the communication management unit 54. The list of teleconferences for which the user belonging to the tenant has the right to view includes conference information created by the user and conference information for which the user is given the right to view by another user. In the present embodiment, teleconferences are used as an example. However, the list of teleconferences also includes a conference held in a single conference room, without communication with a remote location.

The conference information is managed based on the conference ID, which is associated with items "host ID", "title" (conference name), "start date and time", "end date and time", "electronic whiteboard", and "meeting device", for example. These items are an example of the conference information, and the conference information may include other information.

The item "host ID" identifies a host of (a person who holds) the conference.

The item "title" indicates the details of the conference such as a name of the conference or a subject of the conference.

The item "start date and time" indicates a date and time at which the conference is scheduled to be started.

The item "end date and time" indicates a date and time at which the conference is scheduled to end.

The item "electronic whiteboard" indicates identification information of the electronic whiteboard 2 associated with the conference.

The item "meeting device" indicates identification information of a meeting device used in the conference.

As illustrated in FIGS. 10 and 11, a combined moving image recorded at a conference is identified by the conference ID.

The recorded video information stored in the recorded video information storage unit 5002 may be the same as the information illustrated in FIG. 10. However, the information processing system 50 has a list of combined moving images recorded by all users belonging to the tenant. The user may input desired storage destination information in a user setting screen or the like of the information recording app 41 of the terminal apparatus 10, so that the storage destination (path information such as a URL of a cloud storage system) may be stored in the recorded video information storage unit 5002

FIG. 12 illustrates association information stored in the association information storage unit 5003. The association information associates the conference ID and the device identification information (of the electronic whiteboard 2 and the meeting device 60) with each other. The association information is kept stored from the time when the information recording app 41 transmits the device identification information to the information processing system 50 to the time when the recording ends.

FIG. 13 illustrates an example of the account information stored in the account information storage unit 5004. The account information includes information for not only persons but also for the electronic whiteboard 2 and the meeting device 60 as users other than persons (that is, devices).

The item "user ID" is identification information of a user who may participate in a conference, the electronic whiteboard 2, the meeting device 60, and the like.

The item "type" is a type of each account, i.e., the user, the electronic whiteboard 2, or the meeting device 60.

The item "name" is a name of the user or a name of the electronic whiteboard 2 or the meeting device 60.

The item "email address" is an email address of the user, the electronic whiteboard 2, the meeting device, or the like.

Electronic Whiteboard

Figure 14:
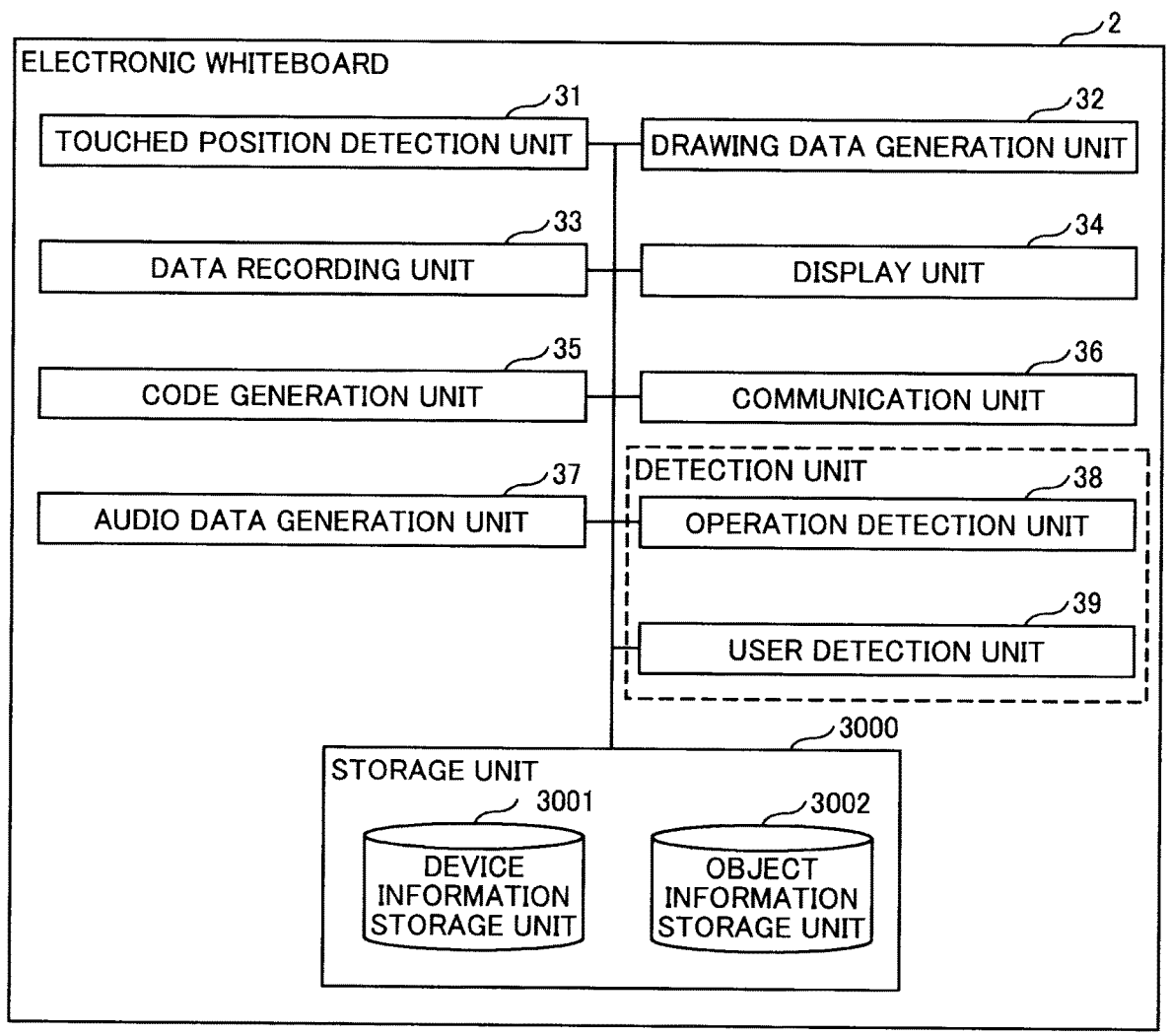
FIG. 14 is an example of a functional block diagram for describing, as individual blocks, functions of the electronic whiteboard according to the embodiment of the present disclosure.

FIG. 14 is an example of a functional block diagram for describing, as individual blocks, functions of the electronic whiteboard 2. The electronic whiteboard 2 includes a touched position detection unit 31, a drawing data generation unit 32, a data recording unit 33, a display unit 34, a code generation unit 35, a communication unit 36, an audio data generation unit 27, an operation detection unit 38, and a user detection unit 39. The respective functions of the electronic whiteboard 2 are functions or means that are implemented by any of the respective components illustrated in FIG. 8 operating in response to instructions from the SSD 404 based on a program loaded to the RAM 403 from the CPU 401.

The touched position detection unit 31 detects coordinates of a position where the electronic pen 490 has touched the touch sensor 414. The drawing data generation unit 32 acquires the coordinates of the position touched by the tip of the electronic pen 490 from the touched position detection unit 31. The drawing data generation unit 32 interpolates a sequence of coordinate points and links the resulting coordinate points to generate stroke data.

The display unit 34 displays handwritten data, a character string converted from the handwritten data, a menu to be operated by the user, on the display 480.

The data recording unit 33 stores, in an object information storage unit 3002 as a database, handwritten data handwritten on the electronic whiteboard 2, a figure such as a circle or triangle into which the handwritten data is converted, a stamp of "DONE", a PC screen, a file, or the like. Handwritten data, a character string (including a figure), images such as the PC screen, and a file, are handled as objects. As for handwritten data, a set of stroke data is handled as one object in accordance with a temporal separation due to an interruption of handwriting and a distance separation due to a difference in handwriting location.

The communication unit 36 is connected to Wi-Fi or a LAN and communicates with the information processing system 50. The communication unit 36 transmits object information to the information processing system 50, receives object information stored in the information processing system 50 from the information processing system 50, and displays object based on the object information on the display 480. The communication unit 36 transmits an operation start notification or an operation end notification to the terminal apparatus 10.

The code generation unit 35 encodes the device identification information of the electronic whiteboard 2 stored in the device information storage unit 3001 and information indicating that the electronic whiteboard 2 is a device usable in the conference into a two-dimensional pattern to generate a two-dimensional code. The code generation unit 35 may encode the device identification information of the electronic whiteboard 2 and the information indicating that the electronic whiteboard 2 is a device usable in the conference into a barcode. The device identification information may be a serial number, a Universally Unique Identifier (UUID), or the like. The device identification information may be set by the user.

The audio data generation unit 37 generates audio data according to a method of sampling a signal of a preset frequency at a certain interval as in pulse code modulation (PCM) conversion. The audio data is converted into an analog signal by a digital-to-analog (D/A) converter included in the loudspeaker 450, and the analog signal is output from the loudspeaker 450. The audio data generation unit 37 may output the device identification information by sound.

The operation detection unit 38 detects a user operation on the electronic whiteboard 2. For example, the operation detection unit 38 detects the start of an operation or the end of the operation in accordance with detection of a touch (or approach) of the electronic pen 490, the hand H of the user, or the like onto (to) the display 480 (touch panel) by the touched position detection unit 31.

The user detection unit 39 uses an infrared sensor, an ultrasonic sensor, a camera, or the like to detect an approach of a user to the electronic whiteboard 2 and moving of the user away from (leaving of the user from) the electronic whiteboard 2.

Both the operation detection unit 38 and the user detection unit 39 function as a detection unit that detects a state in which the user uses the electronic whiteboard 2.

The electronic whiteboard 2 also includes a storage unit 3000 implemented by the SSD 404 or any desired memory illustrated in FIG. 8. The storage unit 3000 includes the device information storage unit 3001 and the object information storage unit 3002, each may be implemented by a database.

FIG. 15 illustrates information such as device identification information stored in the device information storage unit 3001.

Device identification information is identification information of the electronic whiteboard 2.

An Internet Protocol (IP) address is used by another apparatus to connect to the electronic whiteboard 2 via a network.

A password is used for authentication performed when another apparatus connects to the electronic whiteboard 2.

FIG. 16 is a diagram for describing object information stored in the object information storage unit 3002. The object information is information for managing an object displayed by the electronic whiteboard 2, and includes various data items as illustrated in FIG. 16. The object information is transmitted to the information processing system 50 and is used as minutes.

The item "conference ID" is identification information of a conference notified from the information processing system 50.

The item "object ID" is identification information for identifying an object.

The item "type" indicates a type of the object. Examples of the type include handwriting, character, figure, and image. The type "handwriting" indicates stroke data (sequence of coordinate points). The type "character" indicates a character string (character code) converted from handwritten data. The character string may also be referred to as text data. The type "figure" indicates a geometric shape converted from handwritten data, such as a triangle or a square. The type "image" may indicate a format such as Joint Photographic Experts Group (JPEG), Portable Network Graphics (PNG), or Tag Image File Format (TIFF) captured from a PC, the Internet, or the like, but the format of the image may be any format and is not limited.

A single screen of the electronic whiteboard 2 is referred to as a page. The item "page" indicates the page number of the page (screen) on which the object is to be displayed.

The item "coordinates" indicate a position of the object relative to a predetermined origin of the electronic whiteboard 2. The position of the object is, for example, the upper left vertex of a circumscribed rectangle of the object. The coordinates are expressed, for example, in units of pixels of the display.

The item "size" indicates a width and a height of the circumscribed rectangle of the object.

Screen Transition

Figure 17:
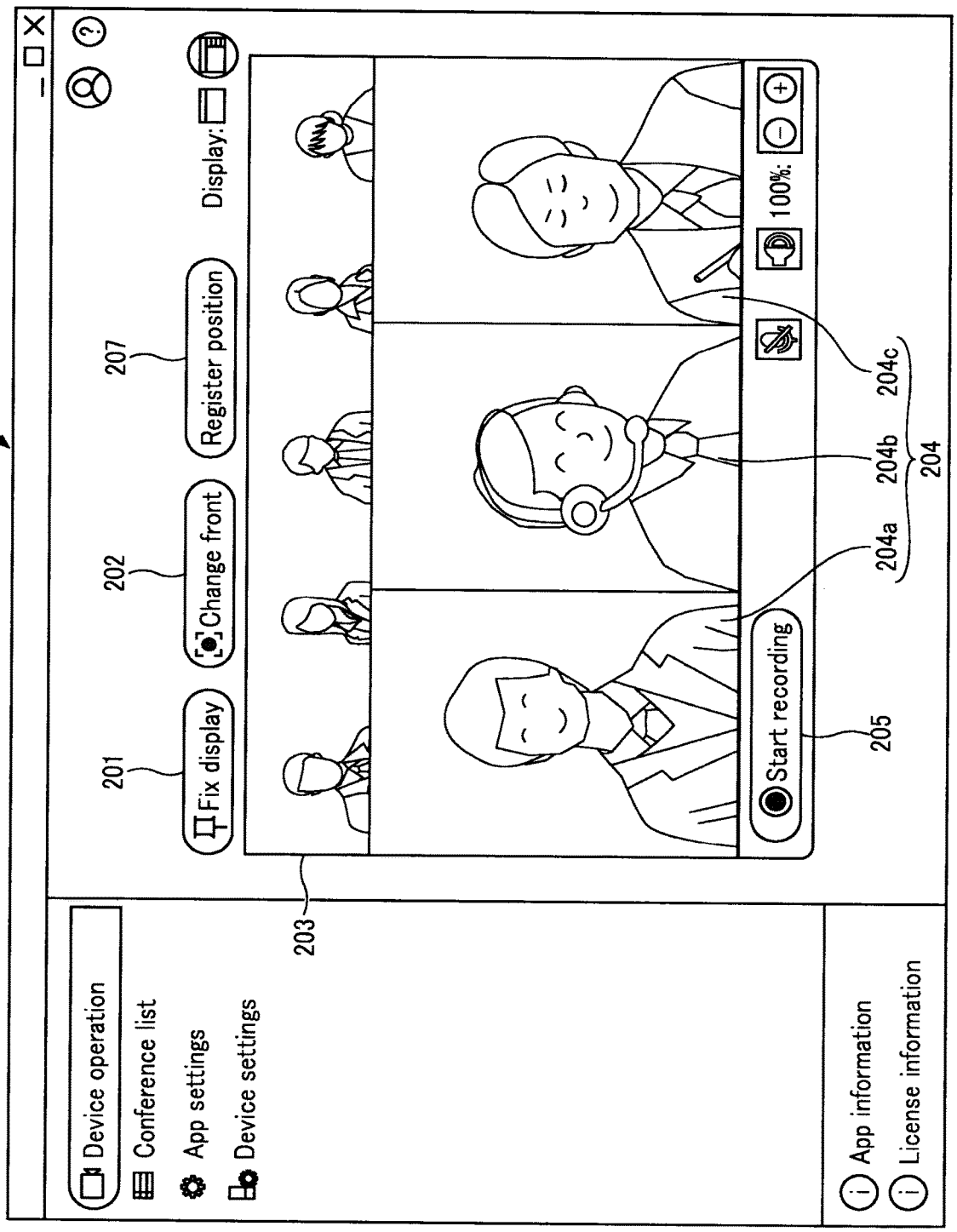
FIG. 17 is a diagram illustrating an example of an initial screen displayed by an information recording app operating on the terminal apparatus after login in accordance with the embodiment of the present disclosure.

Several screens displayed by the terminal apparatus 10 during a teleconference will be described with reference to FIGS. 17 to 20. FIG. 17 illustrates an initial screen 200 displayed by the information recording app 41 operating on the terminal apparatus 10 after login. The user of the terminal apparatus 10 instructs the information recording app 41 to establish a connection with the information processing system 50. The user inputs authentication information, and if the login is successful, the initial screen 200 of FIG. 17 is displayed.

The initial screen 200 includes a fixed display button 201, a front change button 202, a panoramic image 203, one or more speaker images 204a to 204c (hereinafter referred to as speaker images 204 when the speaker images 204a to 204c are not distinguished from one another), a recording start button 205, and a position registration button 207. If the meeting device 60 has already been started and is capturing an image of the surroundings at the time of the login, the panoramic image 203 and the speaker images 204 created by the meeting device 60 are displayed in the initial screen 200. This thus allows the user to decide whether to start recording while viewing the panoramic image 203 and the speaker images 204. If the meeting device 60 is not started (is not capturing any image), the panoramic image 203 and the speaker images 204 are not displayed.

The information recording app 41 may display the speaker images 204 of all participants based on all faces detected from the panoramic image 203, or may display the speaker images 204 of N persons who have made an utterance most recently. FIG. 17 illustrates an example in which the speaker images 204 of up to three persons are displayed. Display of the speaker image 204 of a participant may be omitted until the participant makes an utterance (in this case, the number of the speaker images 204 increases by one in response to an utterance), or the speaker images 204 of three participants in a predetermined direction may be displayed (the speaker images 204 are switched in response to an utterance).

When no participants have made an utterance such as immediately after the meeting device 60 is started, an image of a predetermined direction (such as 0 degrees, 120 degrees, or 240 degrees) of 360 degrees in the horizontal direction is created as the speaker image 204. When fixed display (described later) is set, the setting of the fixed display is prioritized.

The fixed display button 201 is a button which, when selected by the user, executes processing of closing up a certain region of the panoramic image 203 as the speaker image 204, while keeping such certain region.

The front change button 202 is a button which, when selected by the user, executes processing of changing a front of the panoramic image 203 according to user operation (since the panoramic image includes the 360-degree space in the horizontal direction, the direction indicated by the right end matches the direction indicated by the left end). The user slides the panoramic image 203 leftward or rightward with a pointing device to determine a participant who appears in front. The user's operation is transmitted to the meeting device 60. The meeting apparatus 60 changes the angle set as the front among 360 degrees in the horizontal direction, creates the panoramic image 203, and transmits the panoramic image 203 to the terminal apparatus 10.

The position registration button 207 is a button which, when selected by the user, executes processing of designating a position (direction) of a device such as the electronic whiteboard 2 according to user operation.

Figure 18:
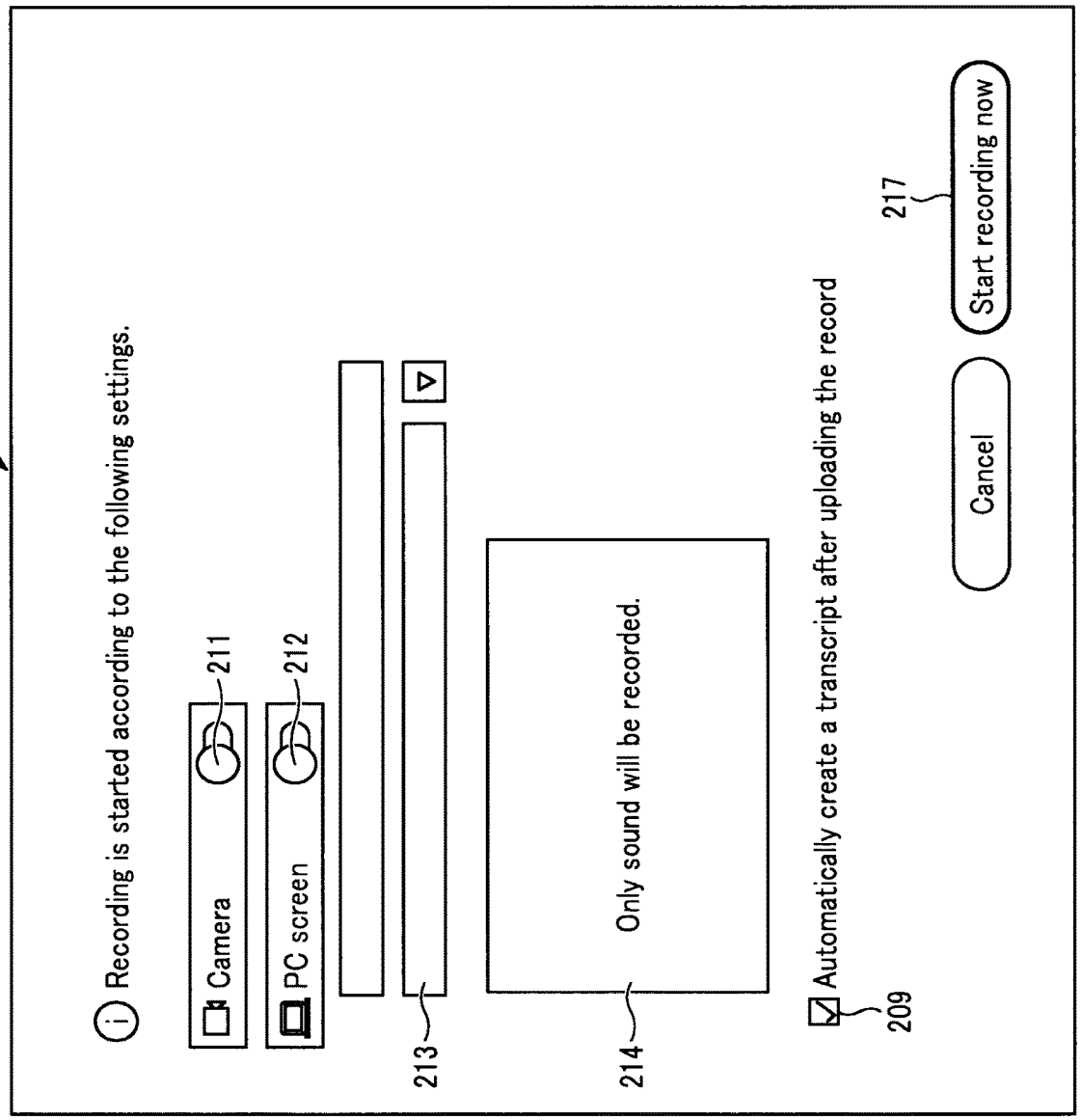
FIG. 18 is a diagram illustrating an example of a recording selling screen displayed by the information recording app in accordance with the embodiment of the present disclosure.

In response to the user pressing the recording start button 205, the information recording app 41 displays a recording setting screen 210 of FIG. 18.

FIG. 18 is an example of the recording setting screen 210 displayed by the information recording app 41. The recording setting screen 210 allows the user to set whether to record the panoramic image 203 and the speaker images 204 created by the meeting device 60 and a desktop screen of the terminal apparatus 10 or a screen of an app operating on the terminal apparatus 10 (whether to include the images and screen in a recorded video). If the setting is made to record none of the panoramic image, the speaker images, and the desktop screen or the screen of the operating app, the information recording app 41 records sound (sound output by the terminal apparatus 10 and sound collected by the meeting device 60).

A camera toggle button 211 is a button for switching on and off recording of the panoramic image 203 and the speaker images 204 created by the meeting device 60. The camera toggle button 211 may allow settings for recording a panoramic image and a speaker image to be made separately.

A PC screen toggle button 212 is a button for switching on and off recording of the desktop screen of the terminal apparatus 10 or the screen of the app operating on the terminal apparatus 10. When the PC screen toggle button 212 is on, the desktop screen is recorded.

When the user desires to record a screen of an app, the user further selects the app in an app selection field 213. The app selection field 213 displays names of apps being executed by the terminal apparatus 10 in a pull-down format. Thus, the app selection field 213 allows the user to select an app whose screen is to be recorded. The information recording app 41 acquires the names of the apps from the OS. The information recording app 41 can display names of apps that have a user interface (UI) (screen) among apps being executed. The apps to be selected may include the teleconference app 42. Thus, the information recording app 41 can record a material displayed by the teleconference app 42, the participant at each site, and the like as a moving image. The apps whose names are displayed in the pull-down format may include various apps being executed on the terminal apparatus 10 such as a presentation app, a word processor app, a spreadsheet app, a material creating and editing app for documents or the like, a cloud electronic whiteboard app, and a web browser app. This thus allows the user to flexibly select the screen of the app to be included in the combined moving image.

When recording is performed in units of apps, the user is allowed to select a plurality of apps. The information recording app 41 can record the screens of all the selected apps.

When both the camera toggle button 211 and the PC screen toggle button 212 are set off, "Only sound will be recorded" is displayed in a recording content confirmation window 214. The sound includes sound output from the terminal apparatus 10 (sound received from the other site 101 under control of the teleconference app 42) and sound collected by the meeting device 60. That is, when a teleconference is being held, the sound from the teleconference app 42 and the sound from the meeting device 60 are stored regardless of whether the images are recorded. Note that the user may make a setting to selectively stop storing the sound from the teleconference app 42 and the sound from the meeting device 60 according to user settings.

In accordance with a combination of on and off of the camera toggle button 211 and the PC screen toggle button 212, a combined moving image is recorded in the following manner. The combined moving image is displayed in real time in the recording content confirmation window 214.

If the camera toggle button 211 is on and the PC screen toggle button 212 is off, the panoramic image and the speaker images captured by the meeting device 60 are displayed in the recording content confirmation window 214.

If the camera toggle button 211 is off and the PC screen toggle button 212 is on (and the screen has also been selected), the desktop screen or the screen of the selected app is displayed in the recording content confirmation window 214.

If the camera toggle button 211 is on and the PC screen toggle button 212 is on, the panoramic image and the speaker images captured by the meeting device 60 and the desktop screen or the screen of the selected app are displayed side by side in the recording content confirmation window 214.

Thus, an image created by the information recording app 41 is referred to as a combined moving image for convenience in the present embodiment although there is a case where the panoramic image and the speaker images or the screen of the app is not recorded or a case Where none of the panoramic image, the speaker image, and the screen of the app are recorded.

The recording setting screen 210 further includes a check box 209 with a message "Automatically create a transcript after uploading the record". The recording setting screen 210 also includes a start recording now button 217. If the user checks the check box 209, text data converted from utterances made during the teleconference is attached to the recorded moving image. In this case, after the end of recording, the information recording app 41 uploads audio data to the information processing system 50 together with a text data conversion request. In response to the user pressing the start recording now button 217, a recording-in-progress screen 220 in FIG. 19 is displayed.

Figure 19:
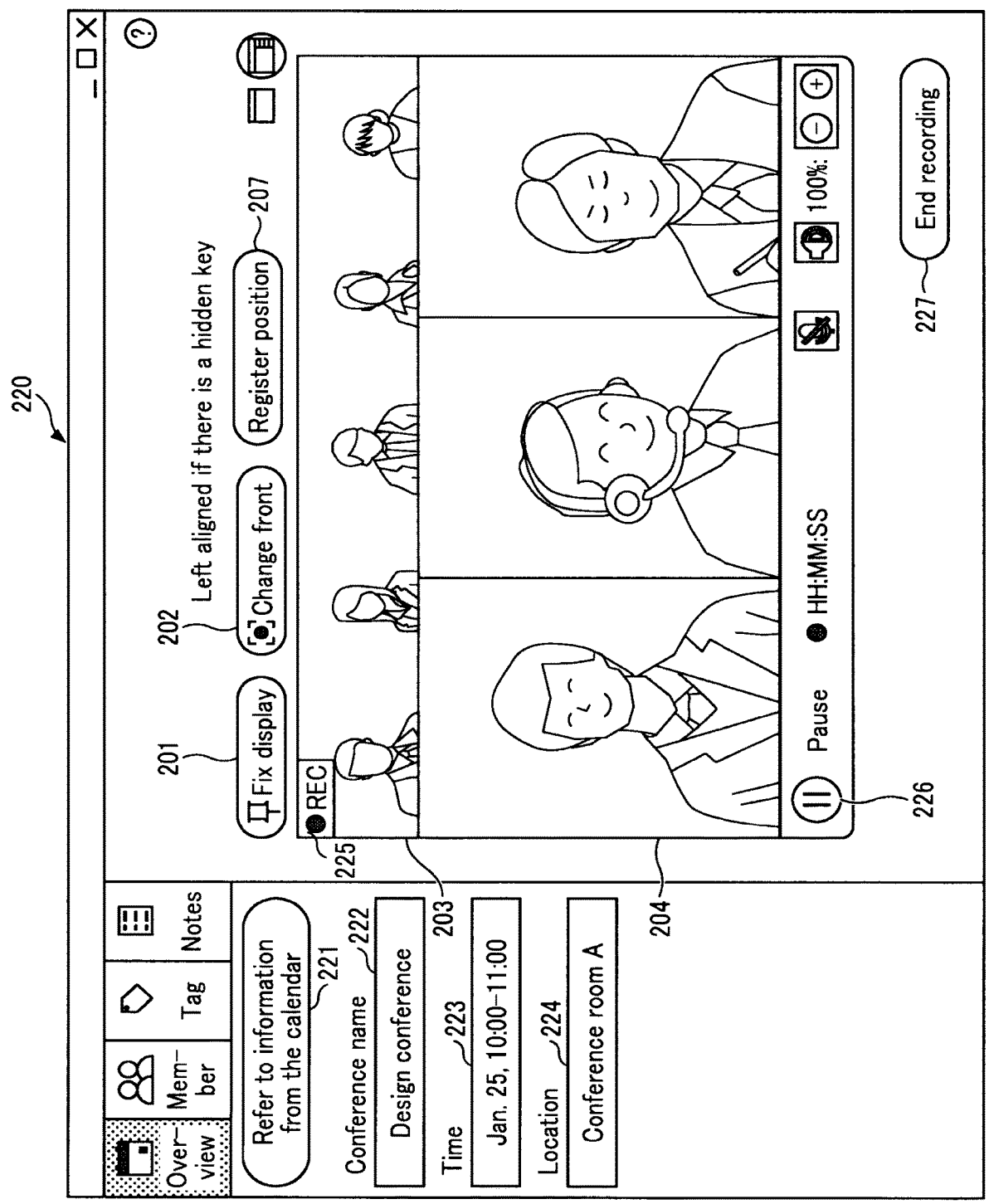
FIG. 19 is a diagram illustrating an example of a recording-in-progress screen displayed by the information recording app during recording in accordance with the embodiment of the present disclosure.

FIG. 19 is an example of the recording-in-progress screen 220 displayed by the information recording app 41 during recording. In FIG. 19, differences from FIG. 17 will be mainly described. The recording-in-progress screen 220 displays, in real time, the combined moving image being recorded according to the conditions set by the user in the recording setting screen 210. The recording-in-progress screen 220 in FIG. 19 corresponds to the case where the camera toggle button 211 is on and the PC screen toggle button 212 is off, and displays the panoramic image 203 and the speaker images 204 (both of which are moving images) created by the meeting device 60. The recording-in-progress screen 220 displays a recording icon 225, a pause button 226, and a recording end button 227.

The pause button 226 is a button for pausing the recording. The pause button 226 also receives an operation of resuming the recording after the recording is paused. The recording end button 227 is a button for ending the recording. The recorded video ID is not changed even when the pause button 226 is pressed, whereas the recorded video ID is changed when the recording end button 227 is pressed. After pausing or temporarily stopping the recording, the user is allowed to set the recording conditions set in the recording setting screen 210 again before resuming the recording or starting recording again. In this case, the information recording app 41 may create a plurality of recorded files each time the recording is stopped (for example, when the recording end button 227 is pressed), or may combine a plurality of files to create one continuous moving image (for example, when the pause button 226 is pressed). When the information recording app 41 plays the combined moving image, the information recording app 41 may play the plurality of recorded files continuously as one moving image.

The recording-in-progress screen 220 further includes an acquire-information-from-calendar button 221, a conference name field 222, a time field 223, and a location field 224. The acquire-information-from-calendar button 221 is a button which, when selected by the user, executes processing to acquire conference information from the conference management system 9. In response to pressing of the acquire-information-from-calendar button 221, the information recording app 41 acquires a list of conferences for which the user has a right to view from the information processing system 50 and displays the list of conferences. The user selects a teleconference to be held from the list of conferences. Consequently, the conference information is reflected in the conference name field 222, the time field 223, and the location field 224. The title, the start time and the end time, and the location included in the conference information are reflected in the conference name field 222, the time field 223, and the location field 224, respectively. The conference information and the recording information in the conference management system 9 are associated with each other by the conference ID.

In response the user ending the recording after the end of the teleconference, a combined moving image with sound is created.

Figure 20:
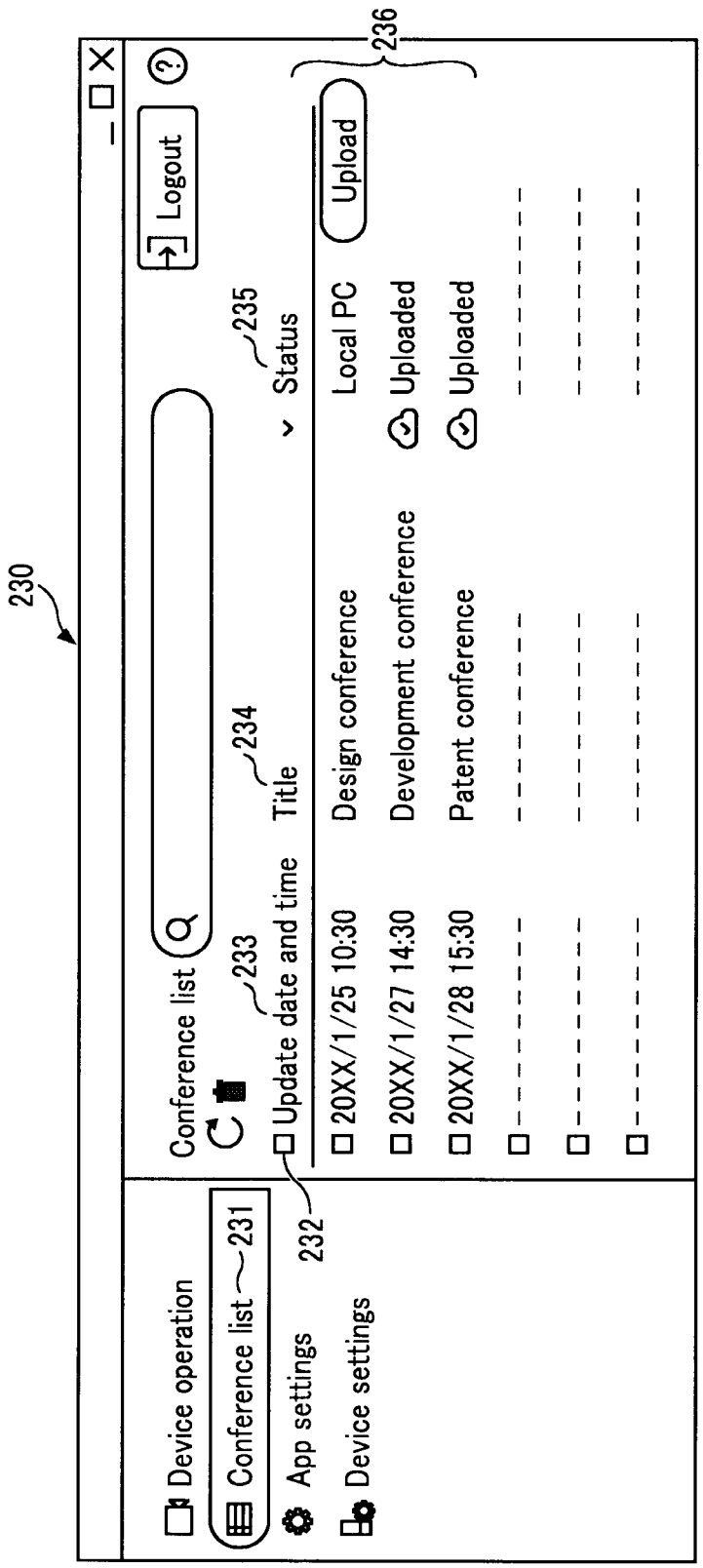
FIG. 20 is a diagram illustrating an example of a conference list screen displayed by the information recording app in accordance with the embodiment of the present disclosure.

FIG. 20 is an example of a conference list screen 230 displayed by the information recording app 41. The conference list screen 230 displays a list of conferences, specifically, a list of pieces of recording information recorded during teleconferences. The list of conferences includes conferences held in a certain conference room as well as teleconferences. The conference list screen 230 displays conference information for which the logged-in user has a right to view in the conference information storage unit 5001. The moving image recording information stored in the information storage unit 1001 may be further integrated.

The conference list screen 230 is displayed in response to the user selecting a conference list tab 231 in the initial screen 200 in FIG. 17. The conference list screen 230 displays a list 236 of pieces of recording information for which the user has a right to view. The conference creator (minutes creator) can set the right to view for a participant of the conference. The list of conferences may be a list of stored pieces of recording information, a list of scheduled conferences, a list of pieces of conference data.

The conference list screen 230 includes items such as a check box 232, an update date and time 233, a title 234, and a status 235.

The check box 232 receives selection of a recorded file. The check box 232 is used when the user desires to collectively delete the recorded files.

The update date and time 233 indicates a recording start time or a recording end time of the combined moving image. If the combined moving image is edited, the update date and time 233 indicates the edited date and time.

The title 234 indicates the title (such as a subject) of the conference. The title may be transcribed from the conference information or set by the user.

The status 235 indicates whether the combined moving image has been uploaded to the information processing system 50. If the combined moving image has not been uploaded, "Local PC" is displayed, whereas if the combined moving image has been uploaded, "Uploaded" is displayed. If the combined moving image has not been uploaded, an upload button is displayed. If there is a combined moving image yet to be uploaded, it is desirable that the information recording app 41 automatically upload the combined moving image when the user logs into the information processing system 50.

In response to the user selecting a title or the like from the list 236 of the combined moving images with a pointing device, the information recording app 41 displays a recording/playback screen. The recording/playback screen allows playback of the combined moving image.

It is desirable that the user be allowed to reduce a number of conferences being displayed based on the update date and time, the title, the keyword, or the like. If the user has a difficulty finding a conference of interest because many conferences are displayed, it is desirable that the user be allowed to input a word or phrase to selectively display the recording information based the word or phrase included in utterances made during the conference or the title of the conference with a search function. The search function allows the user to find desired recording information in a short time even if the number of pieces of recorded information increases. In the conference list screen 230, the user may be allowed to perform sorting by the update date and time or the title.

Operations or Processes

Figure 21:
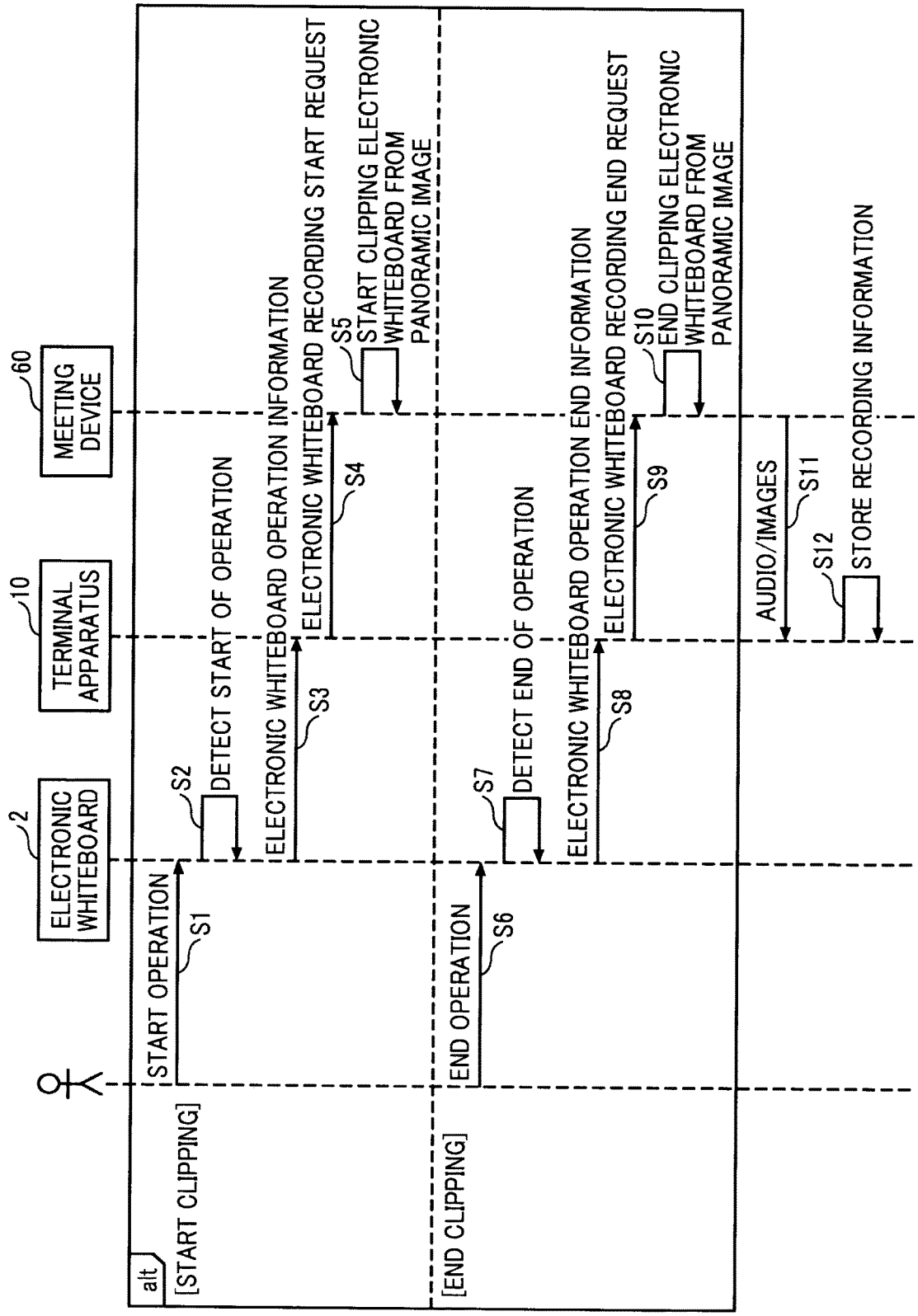
FIG. 21 is an example of a sequence diagram for describing a process in which the meeting device starts clipping of a display device image in response to the start of an operation on the electronic whiteboard and ends the clipping of the display device image in response to the end of the operation on the electronic whiteboard in accordance with the embodiment of the present disclosure.

An overall process in which the meeting device 60 starts and ends clipping of the display device image 215 will be described with reference to FIG. 21. FIG. 21 is a sequence diagram for describing a process in which the meeting device 60 starts clipping of the display device image 215 in response to the start of an operation on the electronic whiteboard 2 and ends the clipping of the display device image 215 in response to the end of the operation on the electronic whiteboard 2.

S1: A user participating in a conference performs an operation on the electronic whiteboard 2. For example, the user performs handwriting or selects a menu with the electronic pen 490.

S2: The touched position detection unit 31 of the electronic whiteboard 2 detects a position touched with the electronic pen 490, and the operation detection unit 38 detects the start of the operation. The user detection unit 39 may detect an approach of the user.

S3: The communication unit 36 of the electronic whiteboard 2 transmits an operation start notification to the terminal apparatus 10. The method of communication performed between the electronic whiteboard 2 and the terminal apparatus 10 will be described later (FIGS. 22 to 25).

S4: In response to the communication unit 11 of the information recording app 41 receiving the operation start notification, the clipping request unit 23 transmits an electronic whiteboard recording start request (a clipping request for the display device image 215) to the meeting device 60 via the device communication unit 16.

S5: The terminal communication unit 61 of the meeting device 60 receives the clipping request, and the display device image generation unit 66 generates the display device image 215 from the panoramic image. A method of detecting the direction of the electronic whiteboard 2 will be described later. Thereafter, the meeting device 60 transmits the display device image 215 to the terminal apparatus 10 until the meeting device 60 receives an electronic whiteboard recording end request. In this case, the meeting device 60 may reduce the number of speaker images to be transmitted to the terminal apparatus 10, or may keep the number of speaker images unchanged.

S6: The user participating in the conference ends the operation on the electronic whiteboard 2. Examples of ending the operation include positively ending the operation such as powering off or pressing an end button and passively ending the operation such as not performing any operation for a predetermined period or longer.

S7: The operation detection unit 38 of the electronic whiteboard 2 detects the end of the operation. For example, the user detection unit 39 may detect moving away of the user.

S8: The communication unit 36 of the electronic whiteboard 2 transmits an operation end notification to the terminal apparatus 10.

S9: In response to the communication unit 11 of the information recording app 41 receiving the operation end notification, the clipping request unit 23 transmits an electronic whiteboard recording end request (a clipping end request for the display device image 215) to the meeting device 60 via the device communication unit 16.

S10: The terminal communication unit 61 of the meeting device 60 receives the clipping end request, and the display device image generation unit 66 finishes generating the display device image 215 from the panoramic image.

As described above, the meeting device 60 switches between the start and the end of transmission of the display device image 215.

S11: The terminal communication unit 61 of the meeting device 60 transmits the panoramic image, the speaker images, and the display device image 215 (each of which may be omitted in some cases) and audio data (combined audio data) to the terminal apparatus 10.

S12: The device communication unit 16 of the information recording app 41 receives the panoramic image, the speaker images, and the display device image 215 (each of which may be omitted in some cases) and the audio data, and the recording control unit 17 records the panoramic image, the speaker images, the display device image 215, and the audio data as recording information. In response to the end of recording, the recording control unit 17 transmits the combined moving image (with the audio data) to the storage service system 70, and the audio data processing unit 18 transmits a request for converting the audio data into text data to the information processing system 50. The information processing system 50 transmits the resultant text data to the storage service system 70. The combined moving image and the text data are preferably associated with each other by the conference ID and stored in the same URL or the like.

Figure 22:
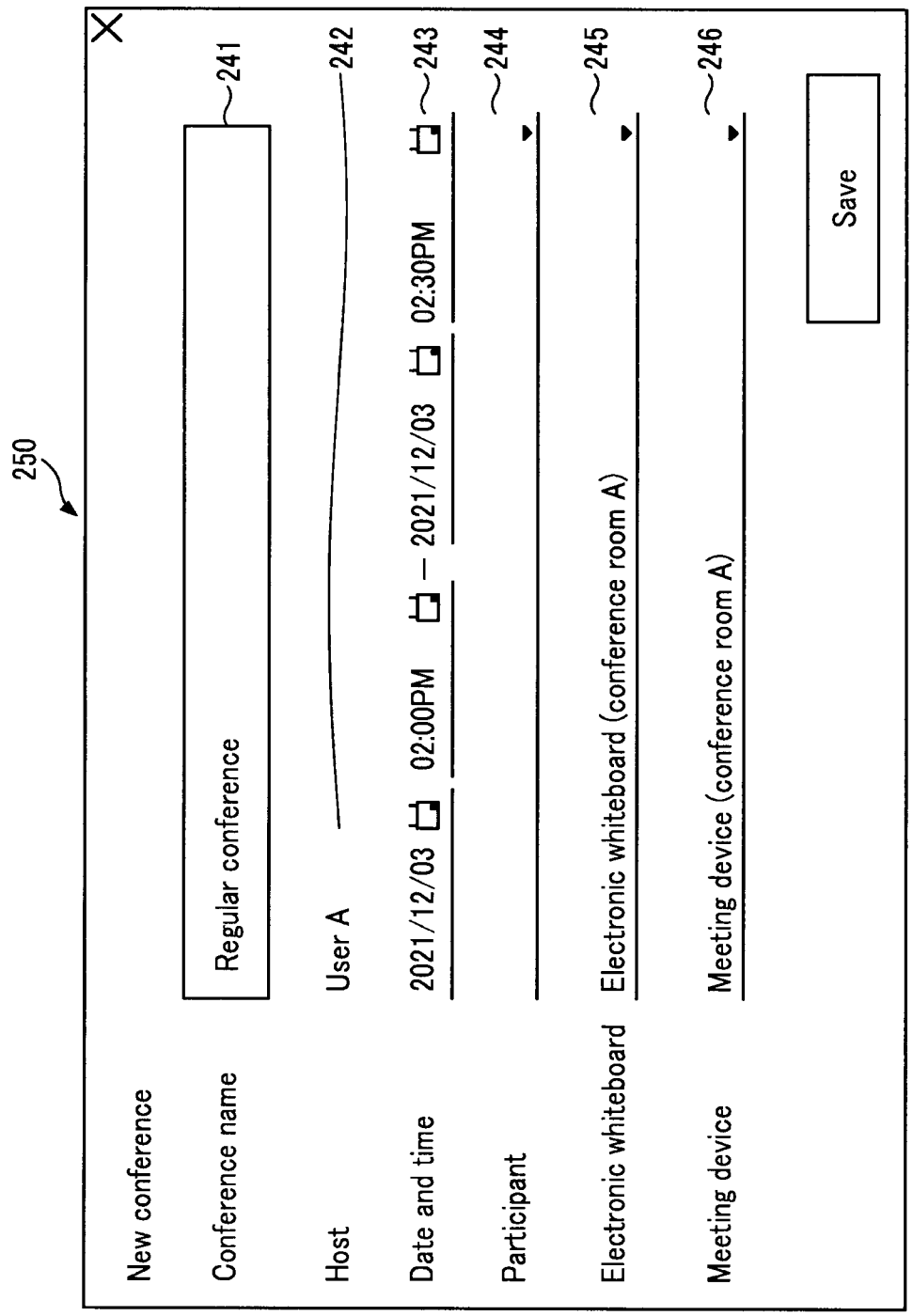
FIG. 22 is a diagram illustrating an example of a conference registration screen displayed by the terminal apparatus in accordance with the embodiment of the present disclosure.

Example of Process Performed Before Electronic Whiteboard and Terminal Apparatus Communicate with Each Other The user registers a new conference to the information processing system 50 through a conference registration screen 250 illustrated in FIG. 22. FIG. 22 illustrates an example of the conference registration screen 250 displayed by the terminal apparatus 10.

An item "conference name" 241 indicates a title of the conference.

An item "host" 242 presents information on the host of the conference. The host is usually a person who performs an operation in the conference registration screen 250.

An item "date and time" 243 is an input field for a start date and time and an end date and time of the conference. The item "date and time" 243 is selectable from a calendar.

An item "participant" 244 indicates participants of the conference. The participants are selectable from a list of users registered in the account information storage unit 5004.

An item "electronic whiteboard" 245 is a selection field for the electronic whiteboard 2 to be used in the conference. The electronic whiteboard 2 to be used is selectable from a list of accounts with the type "electronic whiteboard" in the account information storage unit 5004.

An item "meeting device" 246 is a selection field for the meeting device 60 to be used in the conference. The meeting device 60 to be used is selectable from a list of accounts with the type "meeting device" in the account information storage unit 5004.

As illustrated in FIG. 22, when creating a new conference, the user is allowed to select the electronic whiteboard 2 and the meeting device 60 to be used in the conference.

Figure 23:
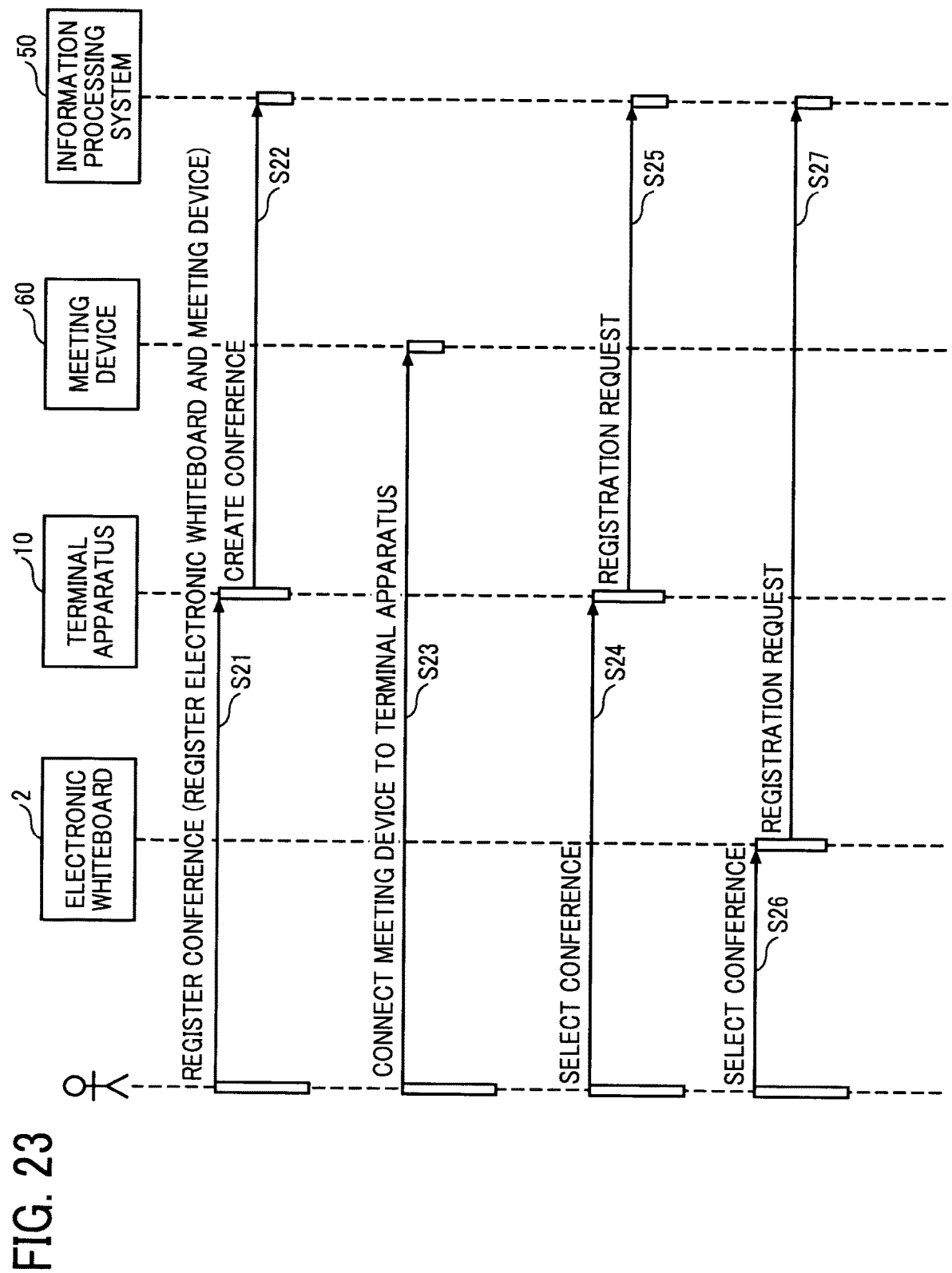
FIG. 23 is an example of a sequence diagram for describing a process in which a user registers a meeting device and an electronic whiteboard to the information processing system in accordance with the embodiment of the present disclosure.

As illustrated in FIG. 23, the user then registers the meeting device 60 and the electronic whiteboard 2 to the information processing system 50. Since the conference has already been created, the user simply selects the conference. FIG. 23 is an example of a sequence diagram for describing a process in which the user registers the meeting device 60 and the electronic whiteboard 2 to the information processing system 50.

S21: As illustrated in FIG. 22, the user creates conference information.

S22: The operation reception unit 12 of the terminal apparatus 10 receives the conference information, and the communication unit 11 transmits the conference information to the information processing system 50. The communication unit 51 of the information processing system 50 receives the conference information, and the communication management unit 54 registers the conference information to the conference information storage unit 5001.

S23: When starting the conference, the user may move to a conference room or the like, and connects the meeting device 60 to the terminal apparatus 10. The meeting device 60 starts in response to connection of a USB cable, and in response to the start of the information recording app 41, starts communicating with the meeting device 60 (transmitting various images).

S24: The user selects the conference to be held from the conference list screen 230 displayed by the information recording app 41.

S25: The operation reception unit 12 of the information recording app 41 receives the operation, and the communication unit 11 designates the device identification information of the meeting device 60 and the conference ID and transmits, to the information processing system 50, a request for registering the meeting device 60 to the conference. The communication unit 51 of the information processing system 50 receives the request for registering the meeting device 60 to the conference, and determines that the meeting device 60 indicated by the request is the meeting device 60 registered in the conference information. The device management unit 55 associates the device identification information of the meeting device 60 with the conference ID.

S26: The user selects a conference to be held from the conference list screen 230 displayed on the electronic whiteboard 2.

S27: The communication unit 36 of the electronic whiteboard 2 designates the device identification information of the electronic whiteboard 2 and the conference ID, and transmits, to the information processing system 50, a request to register the electronic whiteboard 2 to the conference. The communication unit 51 of the information processing system 50 receives the request for registering the electronic whiteboard 2 to the conference, and determines that the electronic whiteboard 2 indicated by the request is the electronic whiteboard 2 registered in the conference information. The device management unit 55 associates the device identification information of the electronic whiteboard 2 with the conference ID.

In this manner, the information processing system 50 associates the meeting device 60 (the terminal apparatus 10) with the electronic whiteboard 2 to allow the terminal apparatus 10 and the electronic whiteboard 2 to communicate with each other via the information processing system 50. If one of the meeting device 60 (the terminal apparatus 10) and the electronic whiteboard 2 transmits the identification information to the information processing system 50, the information processing system 50 successfully identifies the other device registered with the same conference ID based on the association information.

The user registers the conference information in advance in FIGS. 22 and 23. The conference information is not necessarily registered in advance, and the user is allowed to register the meeting device 60 and the electronic whiteboard 2 in association with each other in the information processing system 50 when starting the conference.

Figure 24:
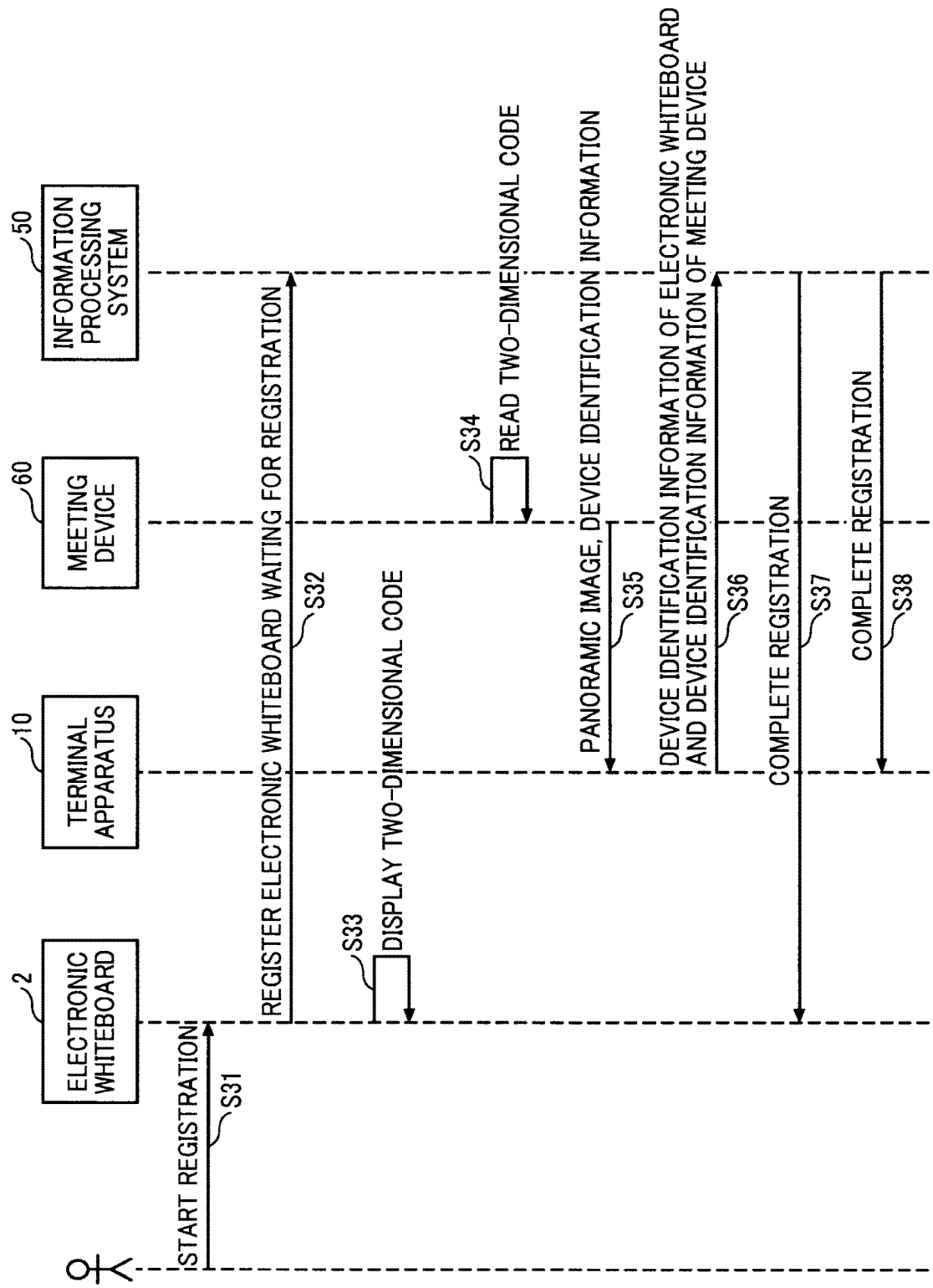
FIG. 24 is an example of a sequence diagram for describing a process in which the user registers a meeting device and an electronic whiteboard to the information processing system when the conference information is not created in accordance with the embodiment of the present disclosure.

FIG. 24 is an example of a sequence diagram for describing a process in which the user registers the meeting device 60 and the electronic whiteboard 2 to the information processing system 50 when the conference information is not created.

S31: The user performs an operation for starting registration of association with the meeting device 60 on the electronic whiteboard 2 in the conference room.

S32: In response to the operation, the electronic whiteboard 2 communicates with the information processing system 50 set in advance, and registers the device identification information and information indicating that the device identification information can be associated with the conference.

S33: The code generation unit 35 of the electronic whiteboard 2 disposed in the conference room and to be used in the conference encodes the device identification information of the electronic whiteboard 2 and information indicating that the electronic whiteboard 2 is a device usable in the conference to generate a two-dimensional code. The display unit 34 displays the two-dimensional code. The two-dimensional code may include a password used by the electronic whiteboard 2 to authenticate another device.

S34: The user enters the conference room where the electronic whiteboard 2 is installed while carrying the terminal apparatus 10 and the meeting device 60, and connects the terminal apparatus 10 and the meeting device 60 with a USB cable. The meeting device 60 starts up in response to power supply from the USB cable or power-on. In this way, the meeting device 60 enters a standby state.

The user starts the information recording app 41 on the terminal apparatus 10. The information recording app 41 starts communicating with the meeting device 60, so that the meeting device 60 starts capturing images and collecting sound. The panoramic image generation unit 62 of the meeting device 60 generates a captured panoramic image of the surroundings including the two-dimensional code.

S35: The terminal communication unit 61 of the meeting device 60 transmits the panoramic image and the device identification information of the meeting device 60 to the terminal apparatus 10.

S36: The device communication unit 16 of the terminal apparatus 10 receives the panoramic image and the device identification information of the meeting device 60, and the analysis unit 22 detects the two-dimensional code displayed on the electronic whiteboard 2 from the panoramic image. The analysis unit 22 decodes the two-dimensional code. If the analysis unit 22 determines that information indicating that the electronic whiteboard 2 is a device usable in the conference is embedded, the analysis unit 22 acquires the device identification information of the electronic whiteboard 2 from the two-dimensional code. The communication unit 11 of the information recording app 41 designates the device identification information of the electronic whiteboard 2 and the device identification information of the meeting device 60 in a registration request, and the transmits the registration request to the information processing system 50. The two-dimensional code may be decoded by the meeting device 60.

S37, S38: In response to the communication unit 51 of the information processing system 50 receiving the registration request (of the device identification information of the electronic whiteboard 2 and the device identification information of the meeting devices 60) to the conference, the communication management unit 54 issues a conference ID. The device management unit 55 then stores the device identification information of the electronic whiteboard 2, the device identification information of the meeting device 60, and the conference ID in association with one another in the association information storage unit 5003.

The communication unit 51 of the information processing system 50 notifies the terminal apparatus 10 and the electronic whiteboard 2 of the conference ID and the completion of registration to the conference. The communication unit 11 of the terminal apparatus 10 receives and stores the conference ID. Likewise, in response to receiving the conference ID and the password, the communication unit 36 of the electronic whiteboard 2 verifies the password and stores the conference ID if the received password matches the password used for authentication. The terminal apparatus 10 receives the conference ID as a response to the communication in step S36. The electronic whiteboard 2 receives the conference ID and the password as a response to polling (for requesting association of the device identification information with the conference) on the information processing system 50. The electronic whiteboard 2 and the information processing system 50 may communicate with each other by a two-way communication scheme such as WebSocket that enables push communication from the information processing system 50 to the electronic whiteboard 2.

Thereafter, the terminal apparatus 10 and the electronic whiteboard 2 adds the conference ID (or the corresponding device identification information) to data to be transmitted.

In this manner, the information processing system 50 associates the meeting device 60 (the terminal apparatus 10) with the electronic whiteboard 2 to allow the terminal apparatus 10 and the electronic whiteboard 2 to communicate with each other via the information processing system 50.

In FIGS. 21 to 24, the terminal apparatus 10 and the electronic whiteboard 2 are allowed to communicate with each other via the information processing system 50. However, if the terminal apparatus 10 and the electronic whiteboard 2 are connected to the same network, the terminal apparatus 10 and the electronic whiteboard 2 can use IP addresses to communicate with each other. The same network refers to a network having the same network address or a network having the connection destination Service Set Identifier (SSID).

Figure 25:
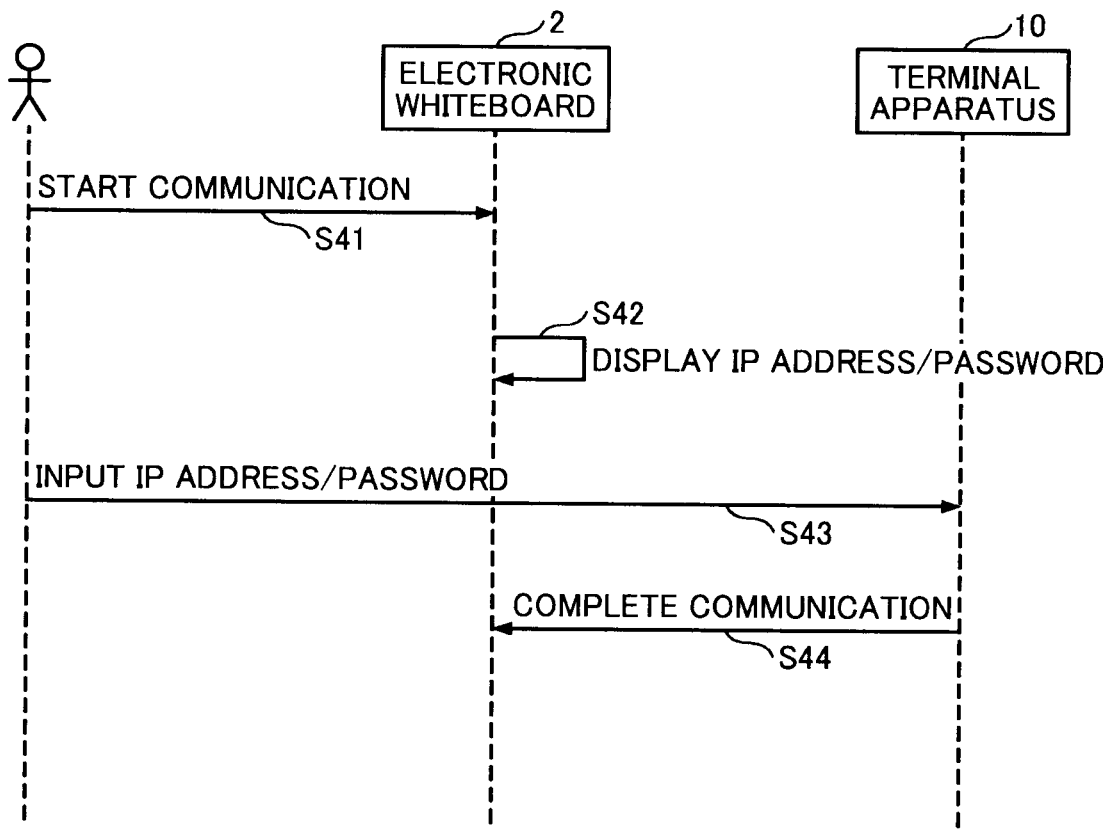
FIG. 25 is an example of a sequence diagram for describing a method of communication performed between the terminal apparatus and the electronic whiteboard when the terminal apparatus and the electronic whiteboard are connected to the same network in accordance with the embodiment of the present disclosure.

FIG. 25 is an example of a sequence diagram for describing a method of communication performed between the terminal apparatus 10 and the electronic whiteboard 2 when the terminal apparatus 10 and the electronic whiteboard 2 are connected to the same network.

S41: The user performs an operation for starting association with the meeting device 60, on the electronic whiteboard 2 in the conference room.

S42: The electronic whiteboard 2 receives the operation, and the display unit 34 displays the IP address and the password of the electronic whiteboard 2.

S43: The user views the displayed IP address and password, and inputs the IP address and password to the information recording app 41 of the terminal apparatus 10. The operation reception unit 12 of the terminal apparatus 10 receives the input.

S44: The communication unit 11 of the terminal apparatus 10 uses the IP address to establish a connection to the electronic whiteboard 2 and transmits the password to the electronic whiteboard 2. If verification of the password is successful, the terminal apparatus 10 is allowed to communicate with the electronic whiteboard 2.

Determination of Direction of Electronic Whiteboard in Panoramic Image

Methods of determining the direction of the electronic whiteboard 2 in the panoramic image will be described. Four major methods for determining the direction of the electronic whiteboard 2 are as follows:

1. A user designates the direction of the electronic whiteboard 2 from a panoramic image at the start of a conference;
2. The electronic whiteboard 2 displays a specific image (such as a two-dimensional code), and the terminal apparatus 10 or the meeting device 60 recognizes the specific image from a panoramic image captured by the image-capturer 601 of the meeting device 60;

3. The electronic whiteboard 2 outputs a specific sound, and the meeting device 60 recognizes the specific sound with the microphone 608; and
4. Any information processing apparatus learns the shape of the electronic whiteboard 2 through machine learning, and the terminal apparatus 10 or the meeting device 60 recognizes the electronic whiteboard 2 from a panoramic image captured by a camera (the image-capturer 601) of the meeting device 60.

Figure 26:
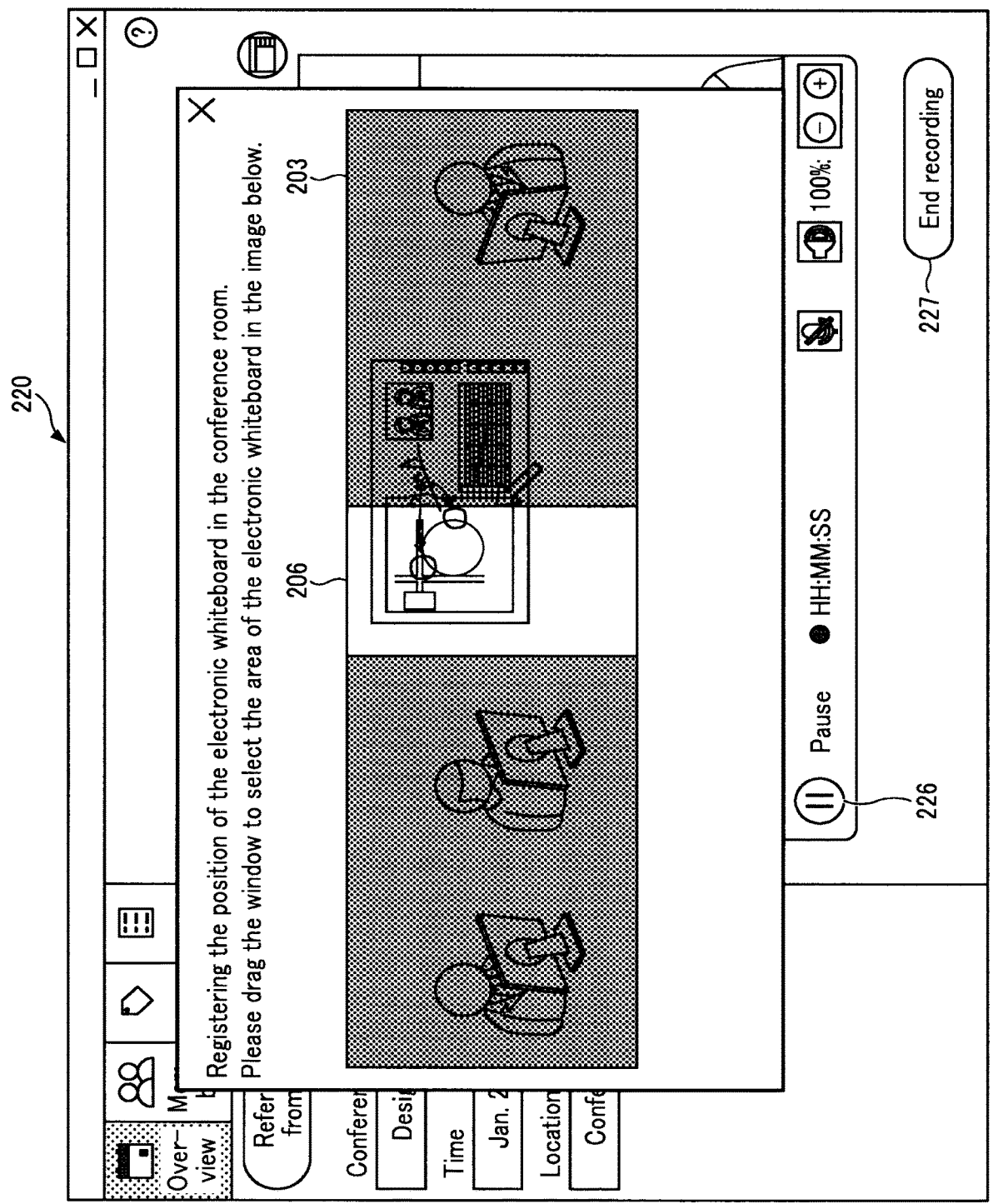
FIG. 26 is a diagram for describing a method of an operation of setting a direction of the electronic whiteboard through pressing of a position registration button in accordance with the embodiment of the present disclosure.

1. User Designating Direction of Electronic Whiteboard 2 from Panoramic Image at Start of Conference FIG. 26 is a diagram for describing a method of an operation of setting the direction of the electronic whiteboard 2 through pressing of the position registration button 207. In response to pressing of the position registration button 207, the panoramic image 203 pops up. For example, the user moves a rectangular window 206 over the panoramic image 203 with a pointing device such as a mouse or a touch panel. The user aligns the window 206 over the electronic whiteboard 2, a podium, or the like included in the panoramic image 203.

Figure 27:
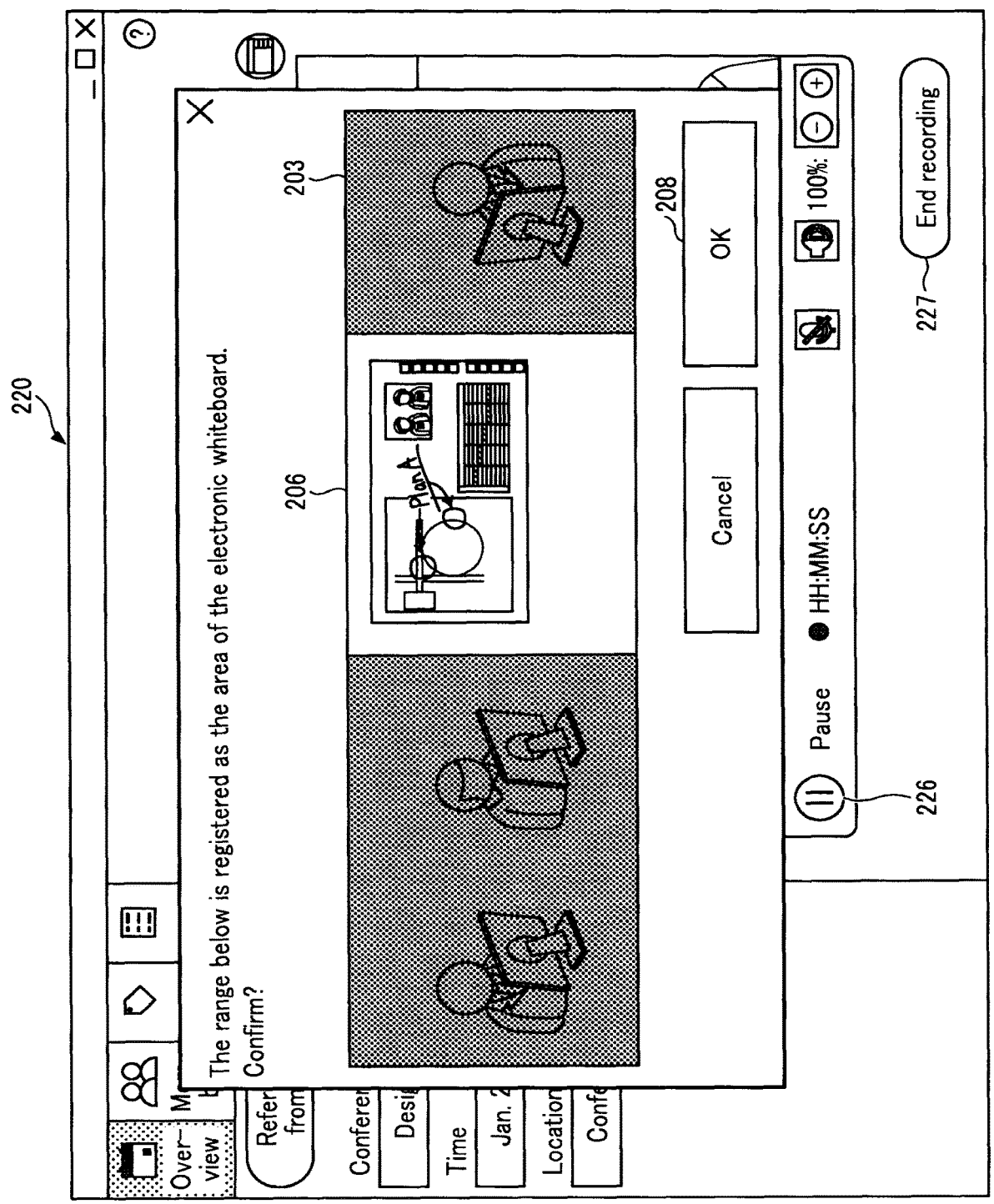
FIG. 27 is a diagram illustrating a screen for checking the direction set by the user in accordance with the embodiment of the present disclosure.

FIG. 27 illustrates a screen for checking the direction set by the user. In response to the user pressing an OK button 208, the direction of the electronic whiteboard 2 in the panoramic image 203 is set. The direction set by the user is transmitted to the meeting device 60, and stored by the display device specifying unit 67 of the meeting device 60.

Figure 28:
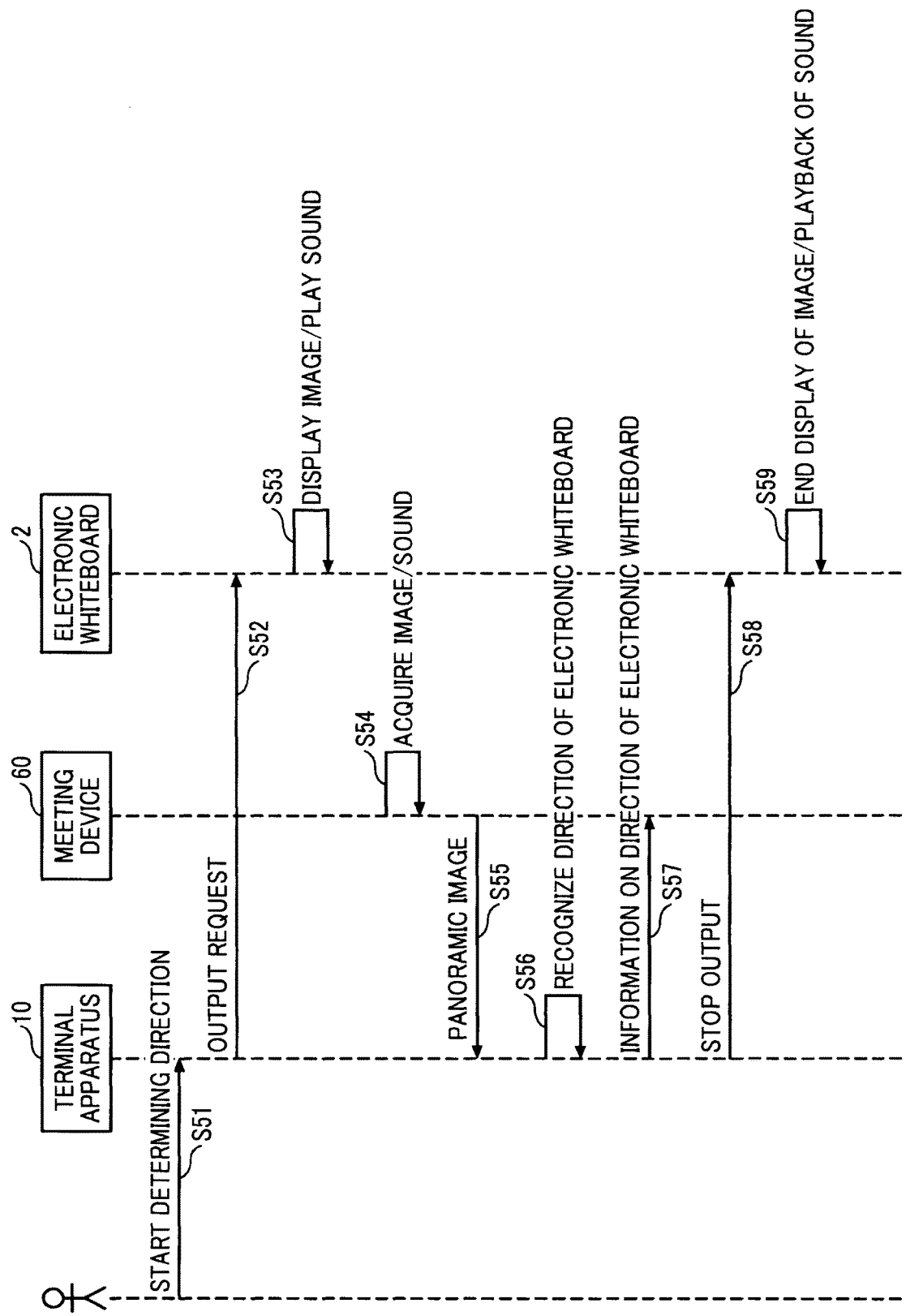
FIG. 28 is an example of a sequence diagram for describing a process in which the information recording app determines the direction of the electronic whiteboard based on a specific image or sound in accordance with the embodiment of the present disclosure.

2. Electronic Whiteboard Displaying Specific Image (Such as Two-Dimensional Code), and Terminal Apparatus or Meeting Device Recognizing Specific Image from Panoramic Image Captured by Image-Capturer of Meeting Device, and
3. Electronic Whiteboard Outputting Specific Sound, and Meeting Device Recognizing Sound with Microphone FIG. 28 is an example of a sequence diagram for describing a process in which the information recording app 41 determines the direction of the electronic whiteboard 2 based on a specific image or sound.

S51: The user performs an operation instructing to determine the direction of the electronic whiteboard 2 on the information recording app 41 of the terminal apparatus 10. The operation reception unit 12 receives the operation.

S52: The communication unit 11 of the information recording app 41 transmits a request to output a specific image or a specific sound to the electronic whiteboard 2. The communication unit 11 may communicate with the electronic whiteboard 2 via a LAN or via the information processing system 50.

S53: The communication unit 36 of the electronic whiteboard 2 receives the request, and the code generation unit 35 generates a two-dimensional code as the specific image. The display unit 34 displays the two-dimensional code on the display 480. As will be described later, this two-dimensional code includes information indicating the direction of the electronic whiteboard 2 and information indicating the right side or the left side. The information indicating the right side or the left side may be omitted.

The communication unit 36 of the electronic whiteboard 2 receives the request, and the audio data generation unit 27 outputs a sound of a specific frequency from the loudspeaker 450. In one example, one of the code generation unit 35 and the audio data generation unit 27 operates. In another example, both of the code generation unit 35 and the audio data generation unit 27 may operate.

S54: Since the panoramic image generation unit 62 of the meeting device 60 repeatedly generates a panoramic image, the panoramic image generation unit 62 automatically generates a panoramic image including the two-dimensional code if the two-dimensional code is in the angle of view. Since the sound collection unit 64 of the meeting device 60 repeatedly collects a sound, the sound collection unit 64 automatically collects the sound of the specific frequency. The display device specifying unit 67 performs Fourier transform on the audio data to a frequency spectrum, and specifies two directions from which a sound having the frequency determined in advance and has a volume equal to or higher than a threshold arrives. The display device specifying unit 67 of the electronic whiteboard 2 stores the direction of the electronic whiteboard 2 (A degrees to B degrees among 360 degrees in the horizontal direction). The specific sound is preferably in an ultrasonic frequency band because the sound in the ultrasonic frequency band is non-audible to the user.

S55: The terminal communication unit 61 of the meeting device 60 transmits the panoramic image to the terminal apparatus 10.

S56: The device communication unit 16 of the information recording app 41 receives the panoramic image. The analysis unit 22 detects the two-dimensional code displayed on the electronic whiteboard 2 from the panoramic image. The analysis unit 22 decodes the two-dimensional code. If the analysis unit 22 determines that the information indicating the direction of the electronic whiteboard 2 is embedded, the analysis unit 22 specifies positions of the left and right ends of the two-dimensional code in the panoramic image. The details will be described with reference to FIG. 29. The display device specifying unit 67 of the meeting device 60 may perform the processing of FIG. 29.

S57: The device communication unit 16 of the terminal apparatus 10 transmits information on the direction of the electronic whiteboard 2 (A degrees to B degrees among 360 degrees in the horizontal direction) to the meeting device 60. The terminal communication unit 61 of the meeting device 60 receives information on the direction of the electronic whiteboard 2, and the display device specifying unit 67 stores the direction.

S58: Since the direction of the electronic whiteboard 2 is determined, the communication unit 11 of the information recording app 41 transmits a request to stop outputting the specific image or the specific sound to the electronic whiteboard 2.

S59: The communication unit 36 of the electronic whiteboard 2 receives the request, and the display unit 34 ends the display of the two-dimensional code. The audio data generation unit 27 stops outputting the sound of the specific frequency.

Determination of Direction Based on Two-Dimensional Code

FIG. 29 illustrates an example of two-dimensional codes 301 displayed as the specific image by the electronic whiteboard 2. In FIG. 29, the panoramic image includes an image of the electronic whiteboard 2, and the electronic whiteboard 2 displays the two two-dimensional codes 301. The size (width) of the two-dimensional code 301 is equal to ⅓ of the width of the displayed image of the electronic whiteboard 2.

The two two-dimensional codes 301 are displayed. The two two-dimensional codes 301 are displayed on the display 480 such that one is right-aligned and the other is left-aligned. Each of the two-dimensional codes 301 includes information indicating whether it is displayed on the right side or the left side. In the present embodiment, right and left are determined with the user facing the electronic whiteboard 2.

FIG. 30 is a diagram for describing a method of determining the direction of the electronic whiteboard 2 based on the two-dimensional codes 301. The analysis unit 22 detects the two two-dimensional codes 301 to specify position information of each of the two-dimensional codes 301 in the horizontal direction. The analysis unit 22 determines a position 253 located to the left from a left end 251 of the left two-dimensional code 301 by an amount equal to the width of the two-dimensional code 301, as the position of the left end of the electronic whiteboard 2. The analysis unit 22 determines a position 254 located to the right from a right end 252 of the right two-dimensional code 301 by an amount equal to the width of the two-dimensional code 301, as the position of the right end of the electronic whiteboard 2. The analysis unit 22 determines a range from the position 253 of the left end to the position 254 of the right end, as the direction of the electronic whiteboard 2.

Determination of Direction Based on Sound

Figure 31A:
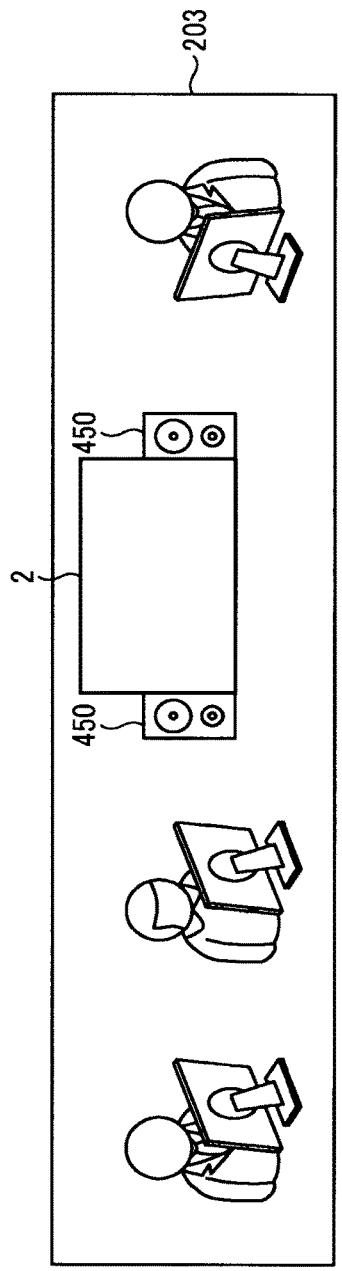
FIGS. 31A, 31B, and 31C are diagrams for describing a method of determining the direction of the electronic whiteboard based on the specific sound output by the electronic whiteboard in accordance with the embodiment of the present disclosure.
Figure 31B:
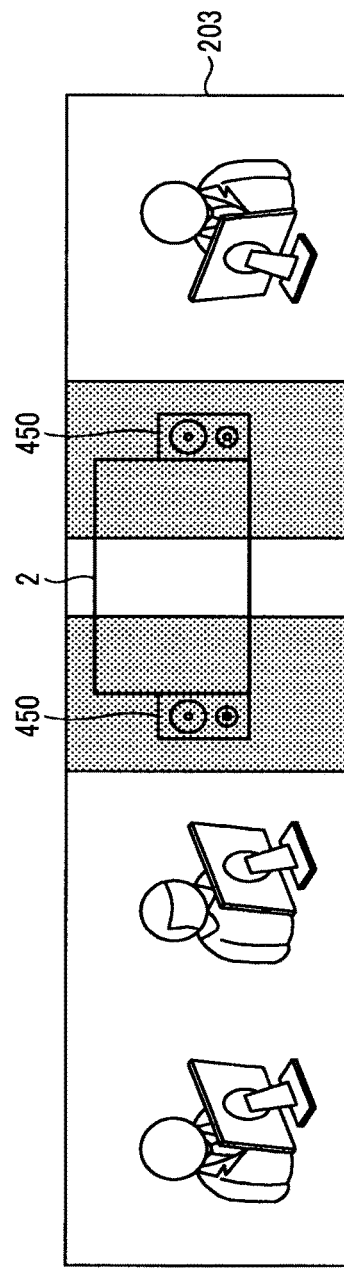
Figure 31C:
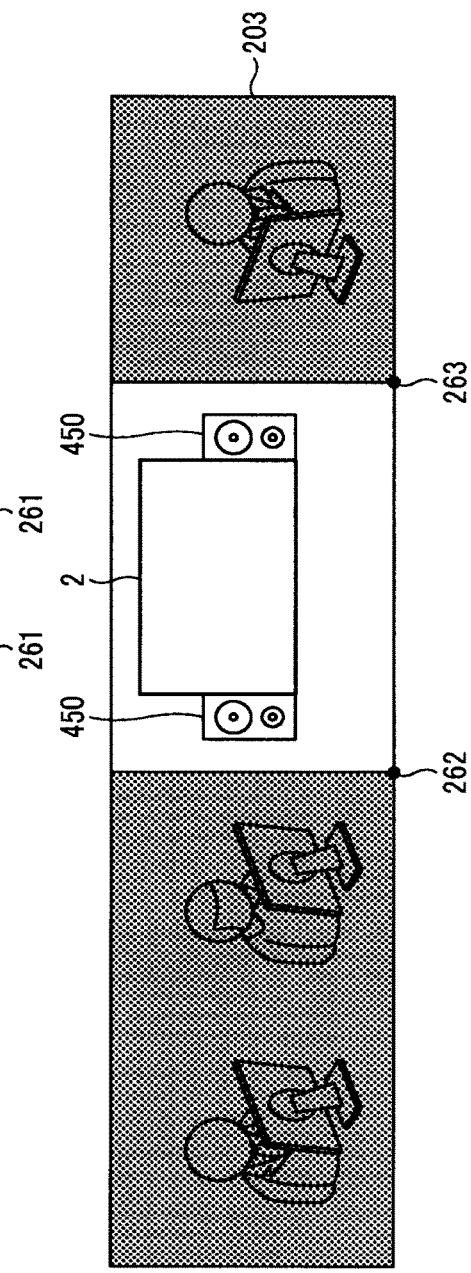

FIGS. 31A, 31B, and 31C are diagrams for describing a method of determining the direction of the electronic whiteboard 2 based on the specific sound output by the electronic whiteboard 2. As illustrated in FIG. 31A, the loudspeakers 450 are installed at the left and right ends of the electronic whiteboard 2. The loudspeakers 450 may be built in the right and left ends.

As illustrated in FIG. 31B, the audio data generation unit 27 outputs a sound from each of the loudspeakers 450. The microphone 608 of the meeting device 60 is directional and thus determines from which direction the sound emitted from each of the loudspeakers 450 comes to the meeting device 60. Once the direction of the sound relative to the meeting device 60 is identified, the direction of the electronic whiteboard 2 in the panoramic image 203 is also identified.

Even the directional display device specifying unit 67 has a difficulty in determining in the center between the loudspeakers 450. Thus, based on the intensity of the sound of the specific frequency, the display device specifying unit 67 determines a certain range 261 extending leftward and rightward around the direction with the highest intensity, as the positions of the loudspeakers 450.

As illustrated in FIG. 31C, the display device specifying unit 67 determines a range from a left end 262 of a left one of the two ranges 262 to a right end 263 of a right one of the two ranges 261, as the direction of the electronic whiteboard 2.

Figure 32:
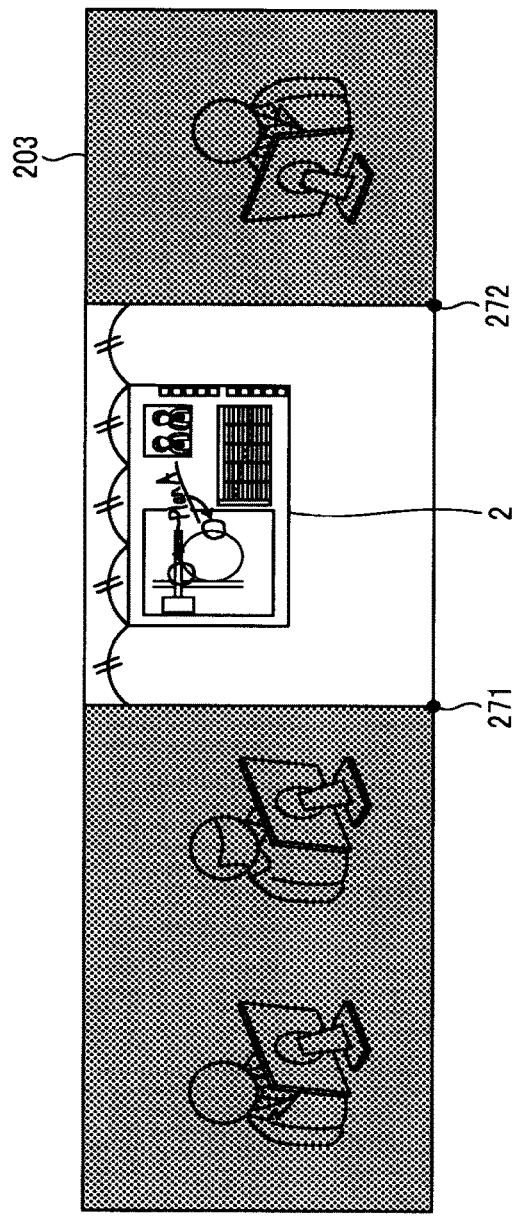
FIG. 32 is a diagram for describing a method of determining the direction of the electronic whiteboard based on the electronic whiteboard detected through image processing such as machine learning in accordance with the embodiment of the present disclosure.

4. Any Information Processing Apparatus Learning Shape of Electronic Whiteboard through Machine Learning, and Terminal Apparatus or Meeting Device Recognizing Electronic Whiteboard from Panoramic Image Captured by Image-Capturer of Meeting Device FIG. 32 is a diagram for describing a method of determining the direction of the electronic whiteboard 2, based on the electronic whiteboard 2 detected through image processing such as machine learning. The display device recognition unit 24 detects the shape (circumscribed rectangle) of the electronic whiteboard 2 from a panoramic image through machine learning. In response to detecting the electronic whiteboard 2 from the panoramic image, the display device recognition unit 24 determines a range from a position 271, which is away from the left end of the electronic whiteboard 2 by ⅓ of the width of the electronic whiteboard 2, to a position 272, which is away from the right end of the electronic whiteboard 2 by ⅓ of the width of the electronic whiteboard 2, as the direction of the electronic whiteboard 2. ⅓ is merely an example.

The terminal apparatus 10 transmits information on the direction of the electronic whiteboard 2 to the meeting device 60, and the display device specifying unit 67 stores the direction of the electronic whiteboard 2. The meeting device 60 may detect the position based on image processing.

State Transition Between Start and End of Operation of Electronic Whiteboard

State transition between the start and the end of an operation of the electronic whiteboard 2 will be described with reference to FIGS. 33 to 39.

Two methods for detecting the start and the end of a user operation are as follows:
1. Detecting a menu operation or writing on the electronic whiteboard 2; and
2. Detecting a user in close vicinity of the electronic whiteboard 2.

State Transition Based on Menu Operation or Writing

"1. Detecting a menu operation or writing on the electronic whiteboard 2" will be described with reference to FIGS. 33 and 34. For example, the menu operation is any user operation performed on a menu being displayed.

Figure 33:
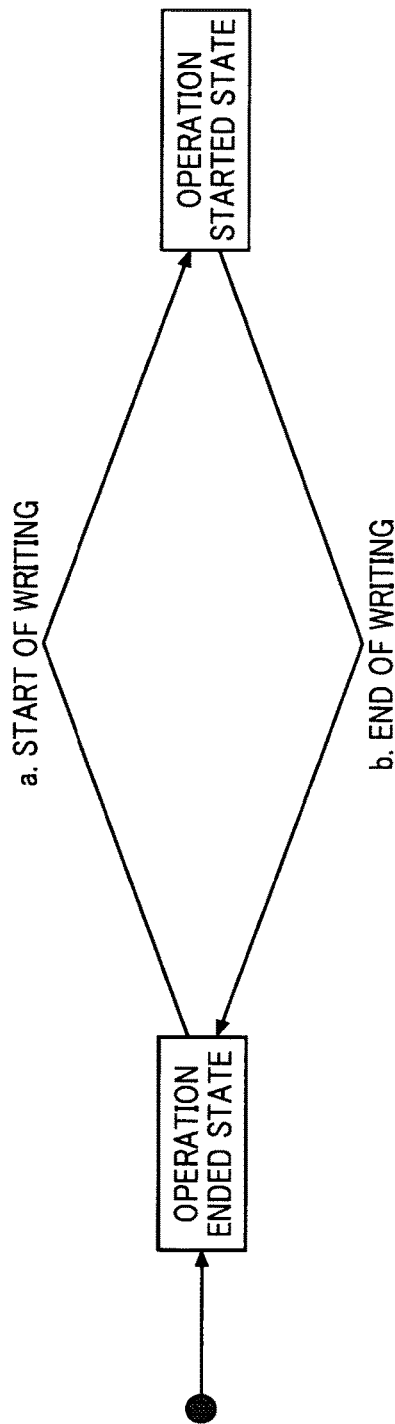
FIG. 33 is an example of a state transition diagram based on a menu operation and writing on the electronic whiteboard in accordance with the embodiment of the present disclosure.

FIG. 33 is a state transition diagram based on a menu operation or writing on the electronic whiteboard 2. An initial state after the start of a conference is an operation ended state.
  a. The operation ended state transitions to the operation started state upon detection of a menu operation or writing.
  b. The operation started state transitions to the operation ended state upon detection of the end of the menu operation or writing.

Figure 34:
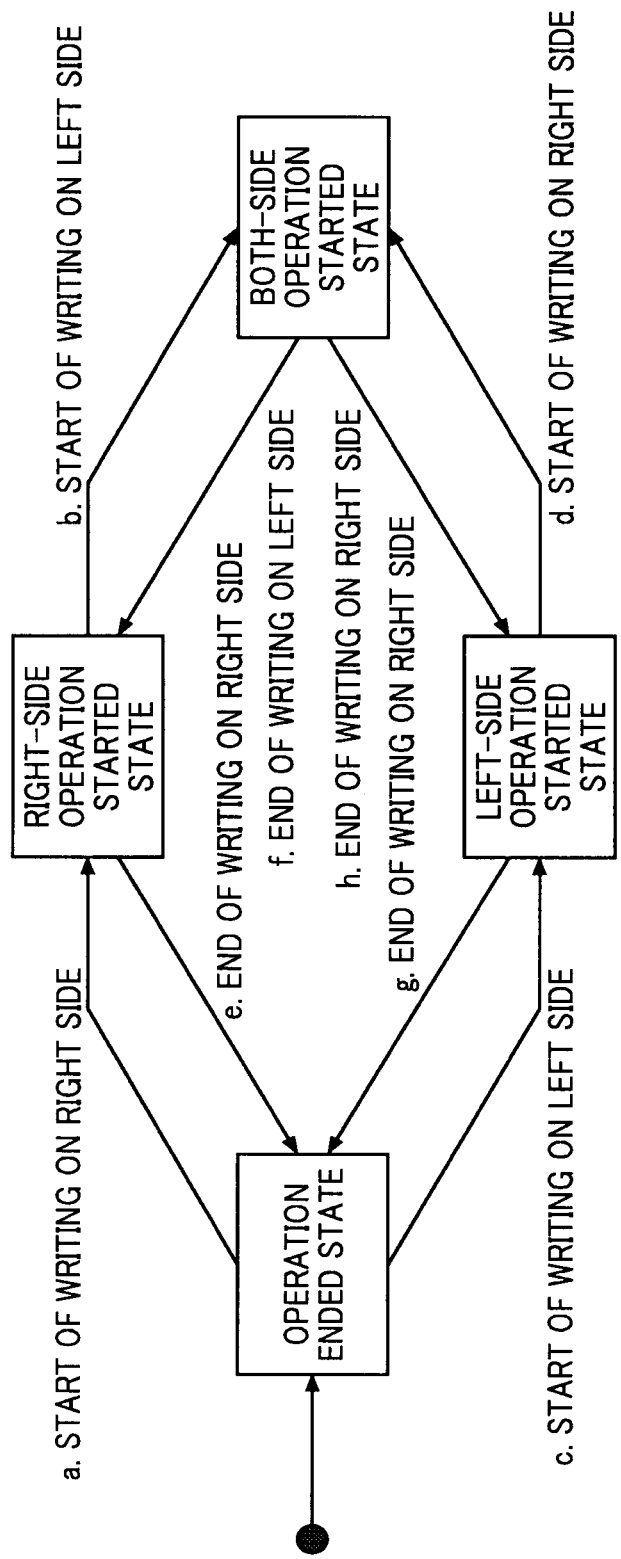
FIG. 34 is an example of a state transition diagram based on a menu operation and writing in a case of determining which of a right side or a left side of a display the menu operation or the writing is performed in accordance with the embodiment of the present disclosure.

FIG. 34 is a state transition diagram based on a menu operation or writing in a case of determining which of a right side or a left side of the display the menu operation or the writing is performed.
  a. The operation ended state transitions to a right-side operation started state upon a menu operation or writing on the right side.
  b. The right-side operation started state transitions to a both-side operation started state upon a menu operation or writing on the left side.
  c. The operation ended state transitions to a left-side operation started state upon a menu operation or writing on the left side.
  d. The left-side operation started state transitions to the both-side operation started state upon a menu operation or writing on the right side.
  e. The right-side operation started state transitions to the operation ended state upon the end of the menu operation or the writing on the right side.
  f. The both-side operation started state transitions to the right-side operation started state upon the end of the menu operation or the writing on the left side.

g. The left-side operation started state transitions to the operation ended state upon the end of the menu operation or the writing on the left side.

h. The both-side operation started state transitions to the left-side operation started state upon the end of the menu operation or the writing on the right side.

In this way, the electronic whiteboard 2 sections the display into a right portion and a left portion and determines whether writing is performed separately for the right portion and the left portion. This allows the meeting device 60 to clip the right portion or the left portion of the electronic whiteboard 2.

Figure 35:
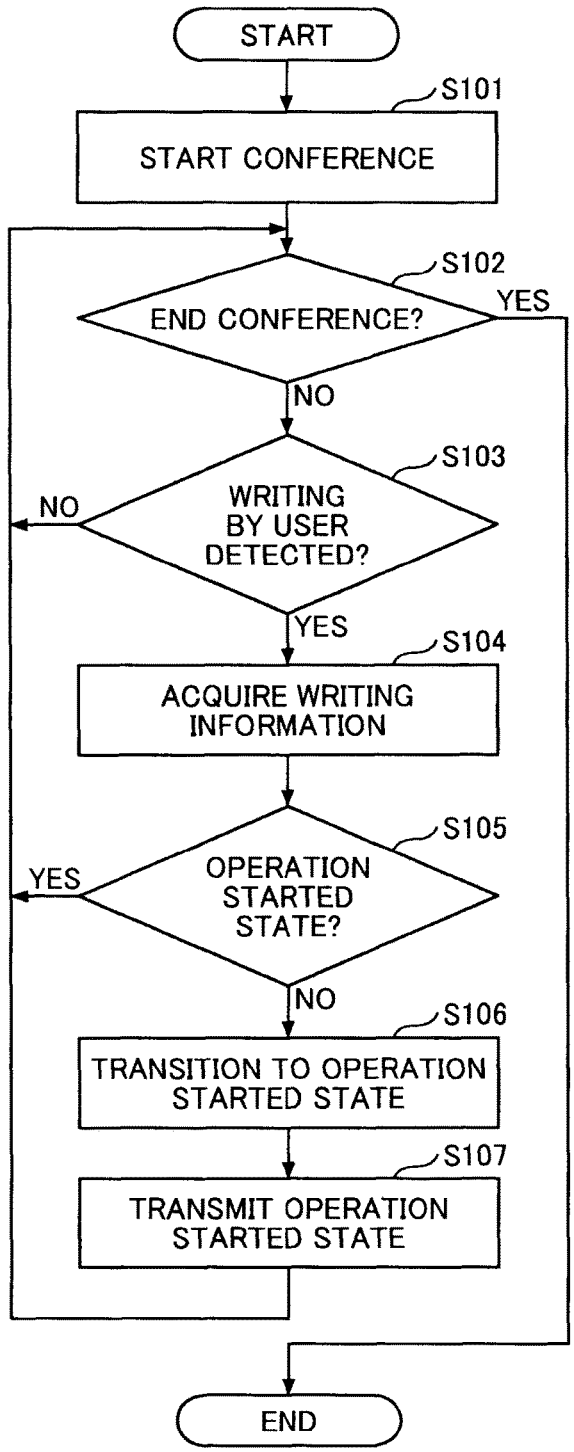
FIG. 35 is an example of a flowchart for describing a process in which the electronic whiteboard determines a transition to an operation started state in accordance with the embodiment of the present disclosure.

FIG. 35 is a flowchart for describing a process in which the electronic whiteboard 2 determines a transition to the operation started state. The electronic whiteboard 2 and the meeting devices 60 are registered in association with each other in the information processing system 50, and in response to pressing the recording start button 217, a conference is started (S101). Note that a so-called teleconference is started in response to the teleconference app 42 establishing a connection to the other site 101. Step S101 indicates the start of recording.

The operation reception unit 12 determines whether the recording end button 227 is pressed (S102). The information recording app 41 regards the end of recording as the end of the conference. If the conference ends (Yes in S102), the process in FIG. 35 also ends.

Until the conference ends (No in S102), the operation detection unit 38 of the electronic whiteboard 2 determines whether a menu operation or a writing operation is detected, based on a touch of the electronic pen 490 or a finger detected by the touched position detection unit 31 (S103). If neither the menu operation nor the writing operation is detected (No in S103), the process returns to S102.

If the menu operation or the writing operation is detected (Yes in S103), the operation detection unit 38 acquires writing information. Specifically, the operation detection unit 38 determines which of the left side or the right side of the display of the electronic whiteboard 2 the writing is performed on, based on the touched position (S104).

The operation detection unit 38 determines whether the current state is the operation started state (S105). If the current state is already the operation started state (Yes in S105), the process returns to step S102.

If the current state is not the operation started state (No in S105), the operation detection unit 38 causes the state to transition to the operation started state (S106).

The communication unit 36 transmits an operation start notification to the terminal apparatus 10 (S107). This allows the terminal apparatus 10 to transmit an electronic whiteboard recording start request to the meeting device 60.

Figure 36:
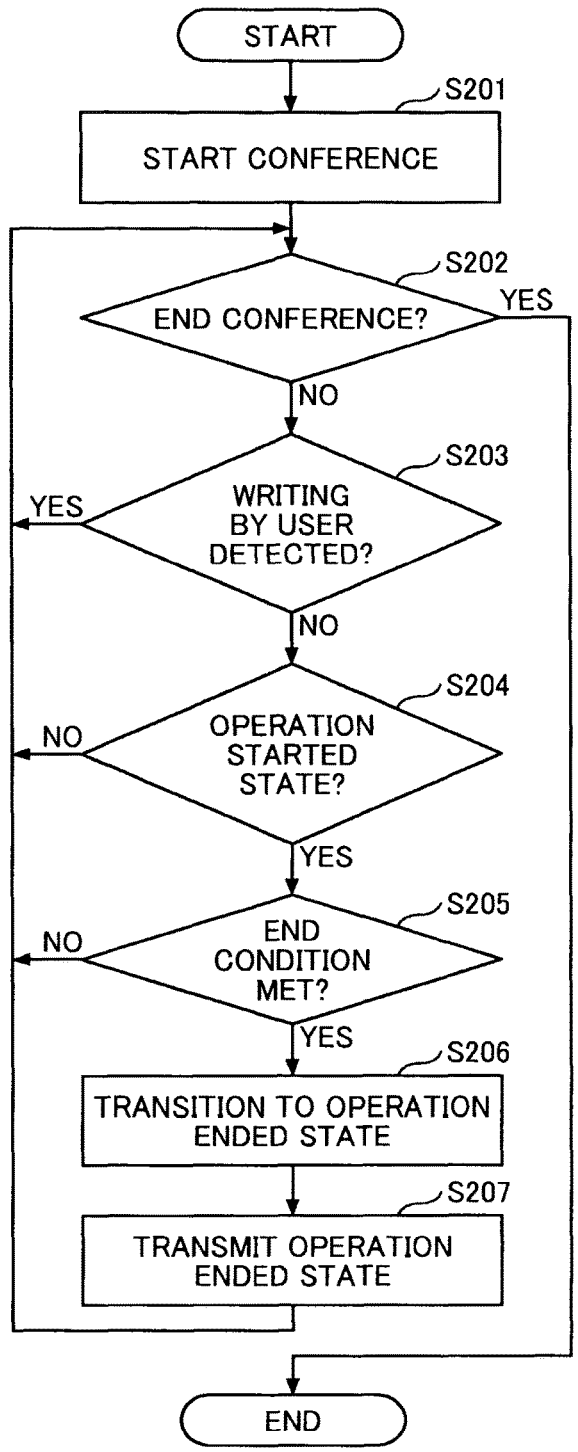
FIG. 36 is an example of a flowchart for describing a process in which the recording information creation system determines a transition to an operation ended state in accordance with the embodiment of the present disclosure.

FIG. 36 is a flowchart for describing a process in which the recording information creation system 100 determines a transition to the operation ended state.

The electronic whiteboard 2 and the meeting devices 60 are registered in association with each other in the information processing system 50, and in response to the start of recording, a conference is started (S201).

The operation reception unit 12 determines whether the recording end button 227 is pressed (S202). The information recording app 41 regards the end of recording as the end of the conference. If the conference ends (Yes in S202), the process in FIG. 36 also ends.

Until the conference ends (No in S202), the operation detection unit 38 of the electronic whiteboard 2 determines whether a menu operation or a writing operation is detected, based on a touch of the electronic pen 490 or a finger detected by the touched position detection unit 31 (S203).

If neither the menu operation nor the writing operation is detected (No in S203), the operation detection unit 38 determines whether the current state is the operation started state (S204). If a menu operation or a write operation is detected (Yes in S203), the process returns to S202.

If the current state is the operation started state (Yes in S204), the operation detection unit 38 determines whether an operation end condition is met (S205). The operation end condition may be power-off or no detection of a touch onto the touch panel for a certain time or longer. If the operation end condition is not met (No in S205), the process returns to step S202.

If the operation end condition is met (Yes in S205), the operation detection unit 38 causes the state to transition to the operation ended state (S206).

The communication unit 36 transmits an operation end notification to the terminal apparatus 10 (S207). This allows the terminal apparatus 10 to transmit an electronic whiteboard recording end request to the meeting device 60.

State Transition Based on Approach and Moving Away of User

"2. Detecting a user in close vicinity of the electronic whiteboard 2" will be described with reference to FIG. 37.

Figure 37:
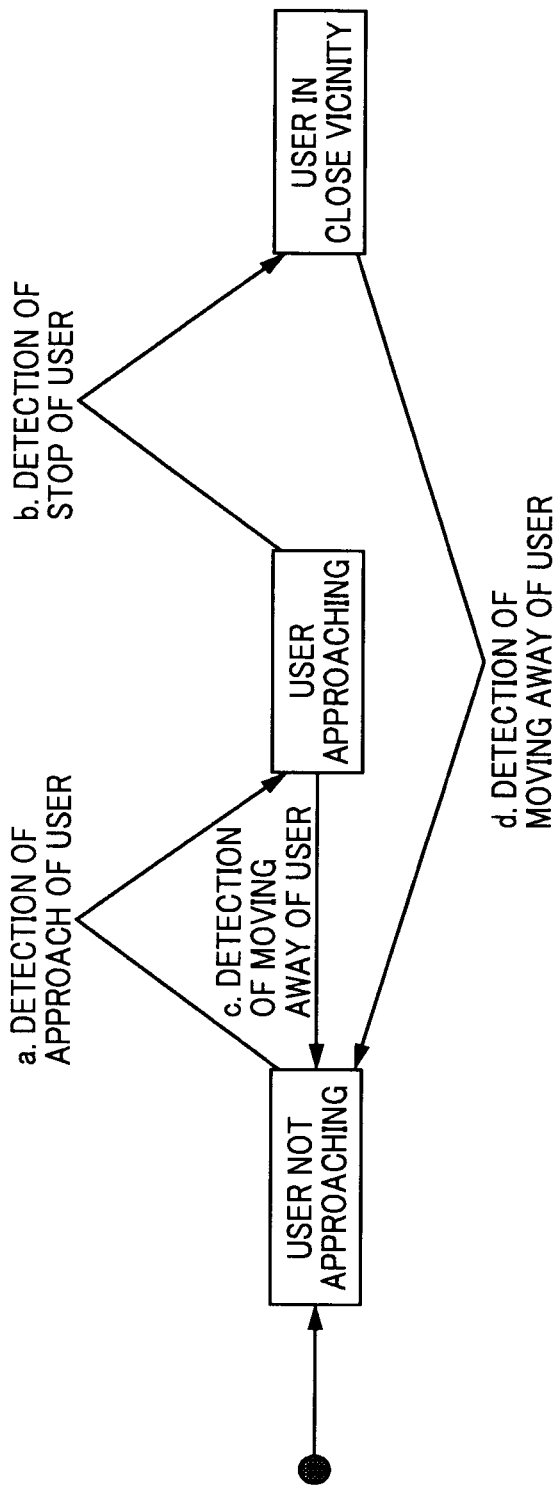
FIG. 37 is an example of a state transition diagram based on an approach of the user to the electronic whiteboard in accordance with the embodiment of the present disclosure.

FIG. 37 is a state transition diagram based on an approach of the user to the electronic whiteboard 2.

a. The initial state is the operation ended state. The operation ended state is equivalent to a state when the user is not approaching. The operation ended state transitions to a user approaching state upon the user detection unit 39 detecting a user approaching the electronic whiteboard 2.

b. The user approaching state transitions to an operation started state upon the user detection unit 39 detecting that the user has stopped in the user approaching state. The operation started state is equivalent to a state when the user is in close vicinity.

c. d. The user approaching state or the operation started state transitions to the operation ended state upon the user detection unit 39 detecting moving away of the user in the user approaching state or the operation started state.

In this manner, the user approaching state provides an advantage that the user just passing in front of the electronic whiteboard 2 is not determined as the start of an operation on the electronic whiteboard 2. Detection of an approaching user enables the start of an operation by the user to be detected earlier than detection of an operation on the electronic whiteboard 2.

Figure 38:
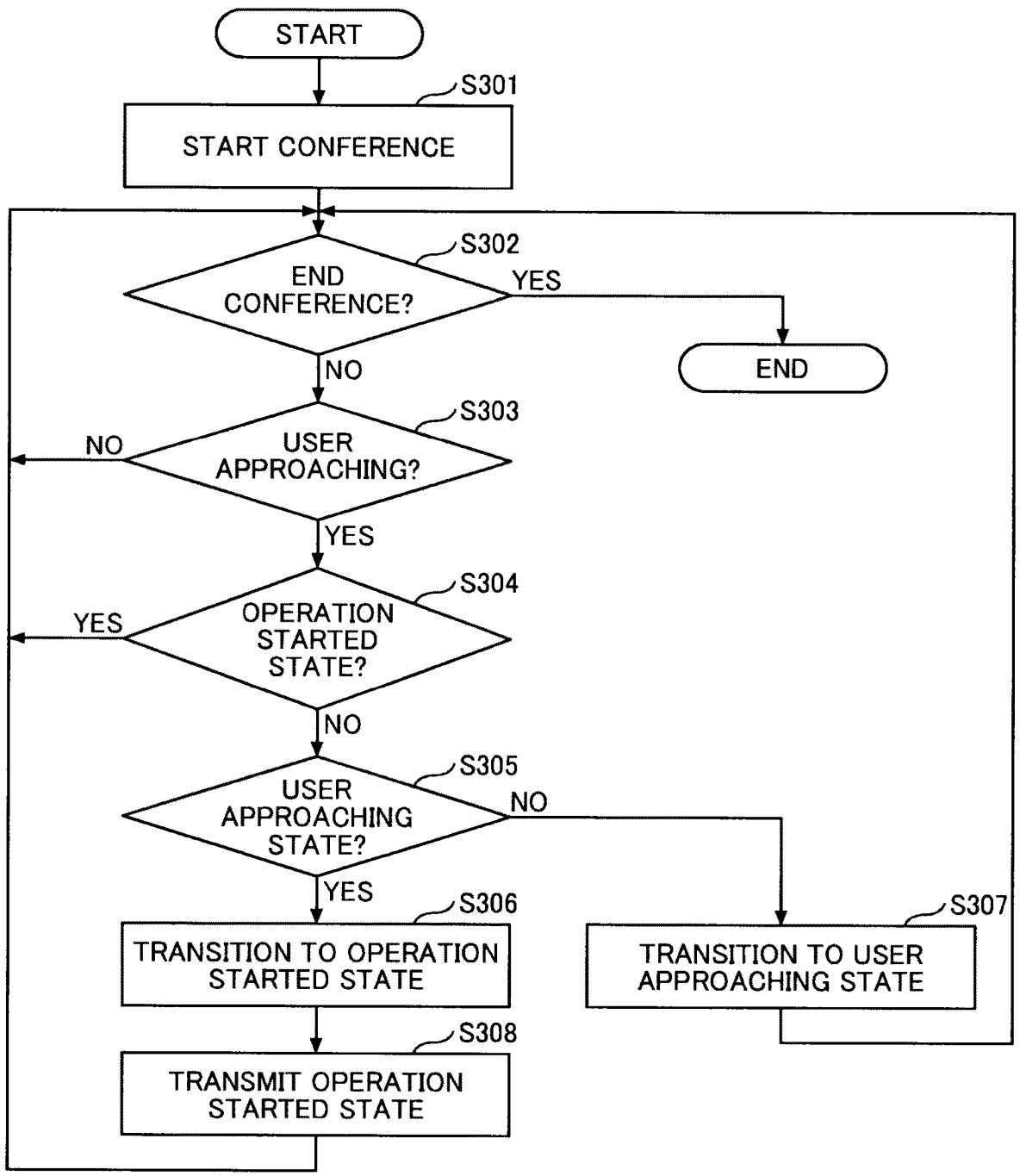
FIG. 38 is an example of a flowchart for describing a process in which the recording information creation system determines a transition to the operation started state in accordance with the embodiment of the present disclosure.

FIG. 38 is a flowchart for describing a process in which the recording information creation system 100 determines a transition to the operation started state. Steps S301 and S302 may be substantially the same as steps S101 and S102 in FIG. 35, respectively.

The user detection unit 39 of the electronic whiteboard 2 determines whether a user is approaching (S303). If the user is not approaching (No in S303), the process returns to step S302.

In response to detecting the approach of the user (Yes in S303), the user detection unit 39 determines whether the current state is the operation started state (S304). If the current state is already the operation started state (Yes in S304), the process returns to step S302.

If the current state is not the operation started state (No in S304), the user detection unit 39 determines whether the current state is the user approaching state (S305).

If the current state is the user approaching state (Yes in S305), the user detection unit 39 causes the state to transition to the operation started state (S306).

If the current state is not the user approaching state (No in S305), the user detection unit 39 causes the state to transition to the user approaching state (S307).

The communication unit 36 transmits an operation start notification to the terminal apparatus 10 (S308). This allows the terminal apparatus 10 to transmit an electronic whiteboard recording start request to the meeting device 60.

Figure 39:
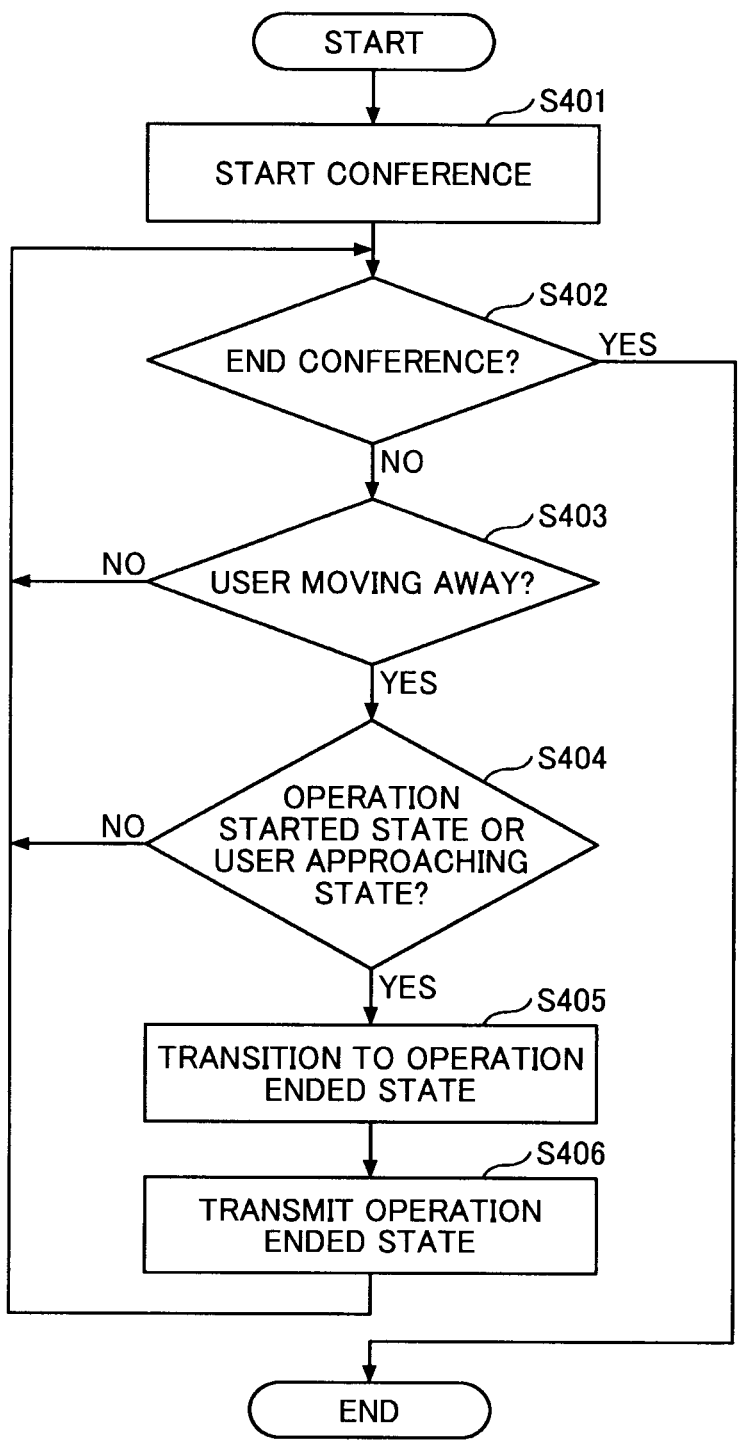
FIG. 39 is an example of a flowchart for describing a process in which the recording information creation system determines a transition to the operation ended state in accordance with the embodiment of the present disclosure.

FIG. 39 is a flowchart for describing a process in which the recording information creation system 100 determines a transition to the operation ended state. Steps S401 and S402 may be substantially the same as steps S201 and S202 in FIG. 36, respectively.

The user detection unit 39 of the electronic whiteboard 2 determines whether moving away of the user is detected (S403). If moving away of the user is not detected (No in S403), the process returns to step S402.

If moving away of the user is detected (Yes in S403), the user detection unit 39 determines whether the current state is the operation started state or the user approaching state (S404). If the current state is neither the operation started state nor the user approaching state (No in S404), the process returns to step S402.

If the current state is the operation started state or the user approaching state (Yes in S404), the user detection unit 39 causes the state to transition to the operation ended state (S405).

The communication unit 36 transmits an operation end notification to the terminal apparatus 10 (S406). This allows the terminal apparatus 10 to transmit an electronic whiteboard recording end request to the meeting device 60.

Example of Clipping Electronic Whiteboard from Panoramic Image

In response to receiving the electronic whiteboard recording start request from the terminal apparatus 10, the meeting device 60 starts a process of clipping, from the panoramic image, the display device image 215 of a specific area in the direction of the electronic whiteboard 2 determined in advance. The specific area is an area including at least part of the electronic whiteboard 2. In response to receiving the electronic whiteboard recording end request from the terminal apparatus 10, the meeting device 60 ends clipping of the display device image 215 from the panoramic image.

In response to additionally receiving information indicating which of the left side or the right side of the electronic whiteboard 2 the operation has been performed, the meeting device 60 performs a process of clipping the display device image 215 of the right half or the left half on which the operation has been performed. The display device image 215 of the right half or the left half is hereinafter referred to as a half display device image 216. In this case, the specific area is a half area of the electronic whiteboard 2. The half display device image 216 is a range obtained by equally sectioning the area determined in advance as the direction of the electronic whiteboard 2 into a left portion and a right portion. The area is not necessarily sectioned equally to the left portion and the right portion, and may be sectioned so that one of the resulting portions include all coordinates touched by the electronic pen 490 within a predetermined time. If operations are performed on both the left and right portions, a plurality of users may be using the electronic whiteboard 2. Thus, the meeting device 60 performs a process of clipping each of the left and right portions of the electronic whiteboard 2.

Figure 40:
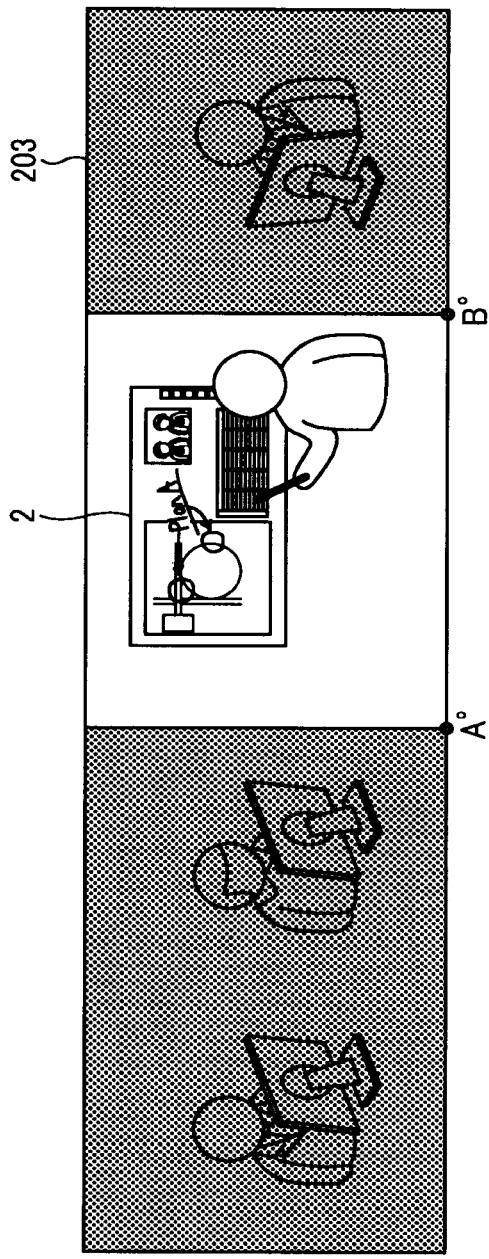
FIG. 40 is a diagram illustrating an example of the direction of the electronic whiteboard determined in advance in a panoramic image in accordance with the embodiment of the present disclosure.

FIG. 40 illustrates an example of the direction of the electronic whiteboard 2 determined in advance in a panoramic image. The meeting device 60 captures an image of a 360-degree space in the horizontal direction, where the reference direction is set as 0 degrees. Thus, the direction of the electronic whiteboard 2 is determined in advance as from A degrees to B degrees. In this case, the specific area is an area from A degrees to B degrees including the entire electronic whiteboard 2.

Figure 41:
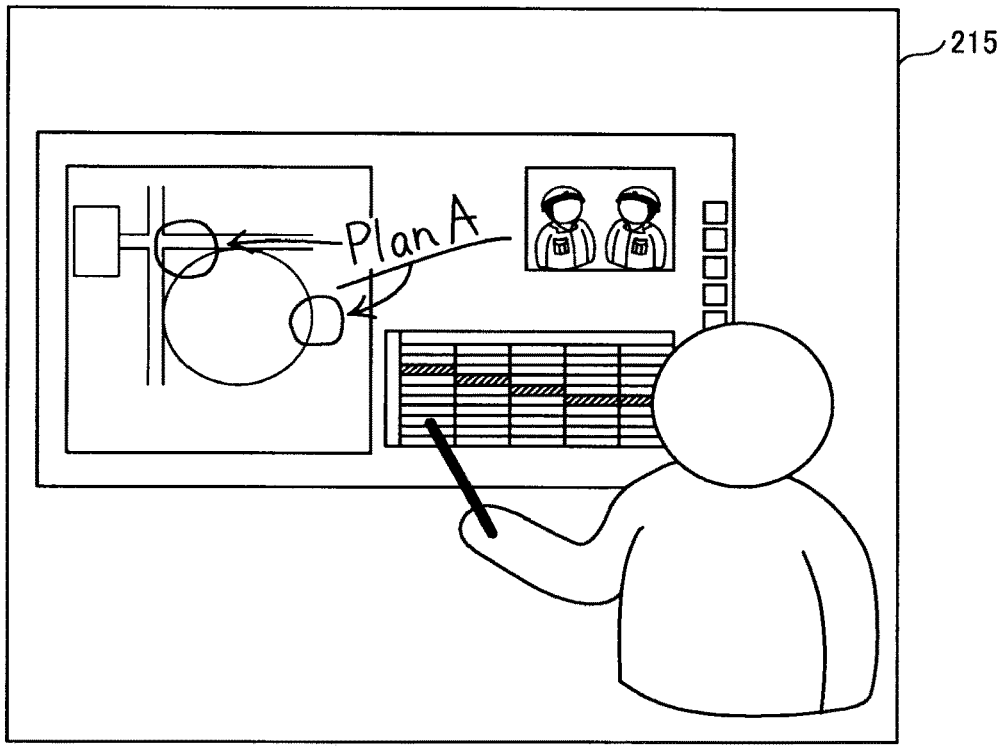
FIG. 41 is a diagram illustrating an example of the display device image clipped based on the direction of the electronic whiteboard in accordance with the embodiment of the present disclosure.

FIG. 41 illustrates the display device image 215 clipped based on the direction of the electronic whiteboard 2. FIG. 41 corresponds to the case where the electronic whiteboard recording start request is transmitted to the meeting device 60 without distinguishing the right and left portions of the electronic whiteboard 2 from each other. In this case, the display device image generation unit 66 clips the range of the direction of the electronic whiteboard 2.

Figure 42A:
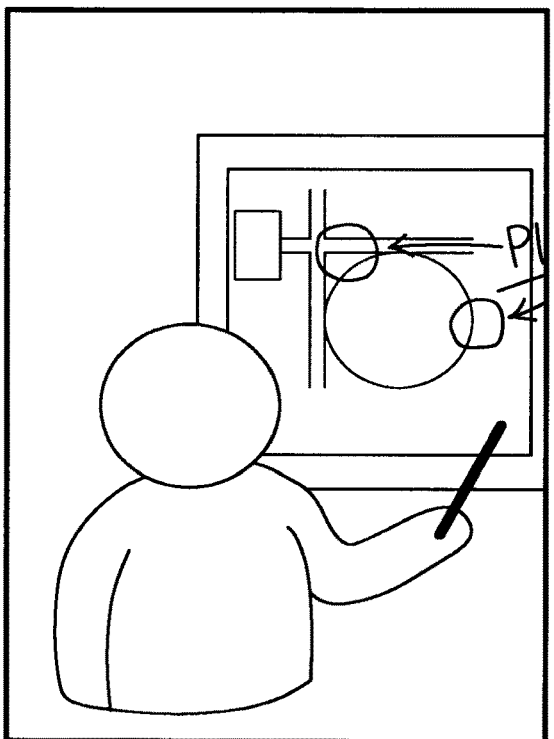
FIGS. 42A and 42B are diagrams each illustrating an example of a half display device image obtained when an electronic whiteboard recording start request designating a left portion or a right portion of the electronic whiteboard is transmitted to the meeting device in accordance with the embodiment of the present disclosure.
Figure 42B:
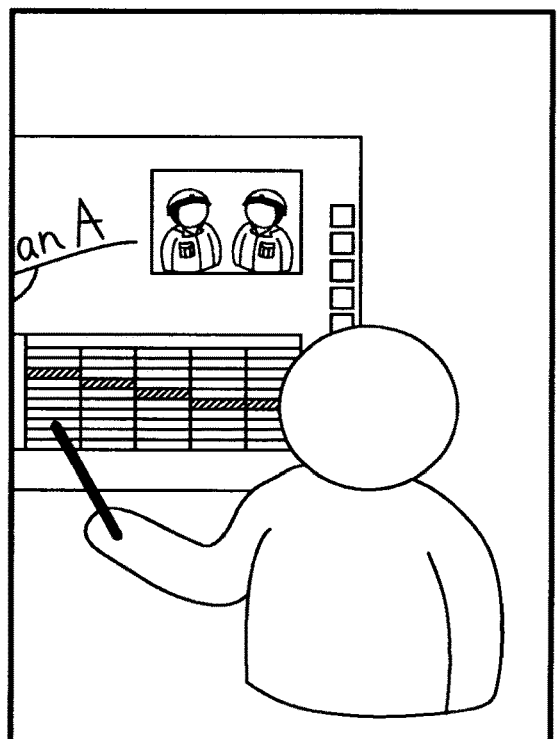

FIGS. 42A and 42B are diagrams each illustrating the half display device image 216 obtained when the electronic whiteboard recording start request designating a left portion or a right portion of the electronic whiteboard 2 is transmitted to the meeting device 60. FIG. 42A is the half display device image 216 obtained when the electronic whiteboard recording start request designating the right portion is transmitted to the meeting device 60. FIG. 42B illustrates the half display device image 216 obtained when the electronic whiteboard recording start request designating the left portion is transmitted to the meeting device 60.

FIG. 43 illustrates an example of the speaker images 204 displayed by the display control unit 13 of the information recording app 41. In FIG. 43, the two speaker images 204 of speakers who have made utterances are displayed regardless of the electronic whiteboard 2.

Figure 44:
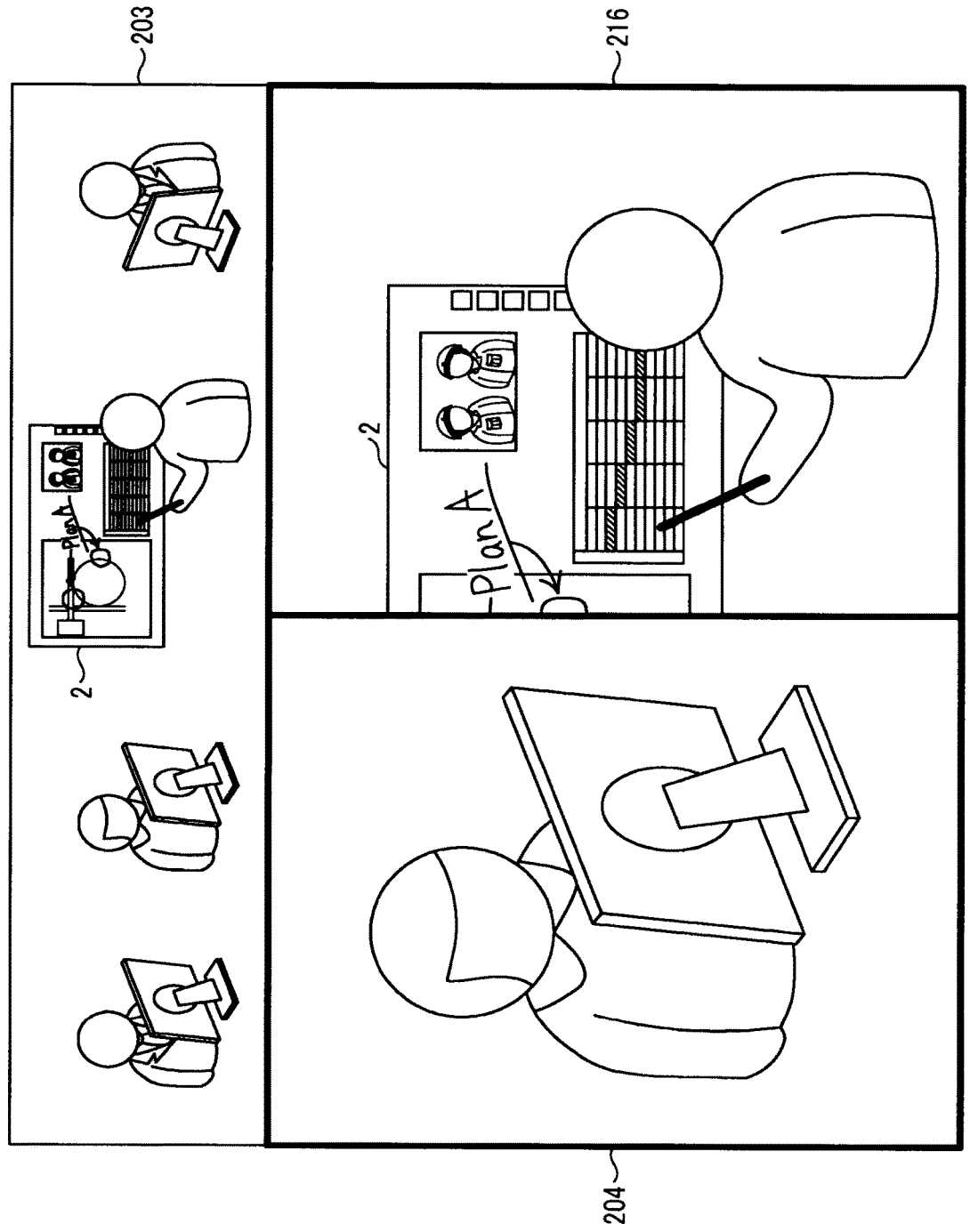
FIG. 44 is an example of a diagram of a half display device image displayed by the display control unit of the information recording app when an electronic whiteboard recording start request designating the right portion is transmitted to the meeting device in accordance with the embodiment of the present disclosure.

FIG. 44 is a diagram of the half display device image 216 displayed by the display control unit 13 of the information recording app 41 when the electronic whiteboard recording start request designating the right portion is transmitted to the meeting device 60. The half display device image 216 is displayed in the same size as the speaker image 204.

Figure 45:
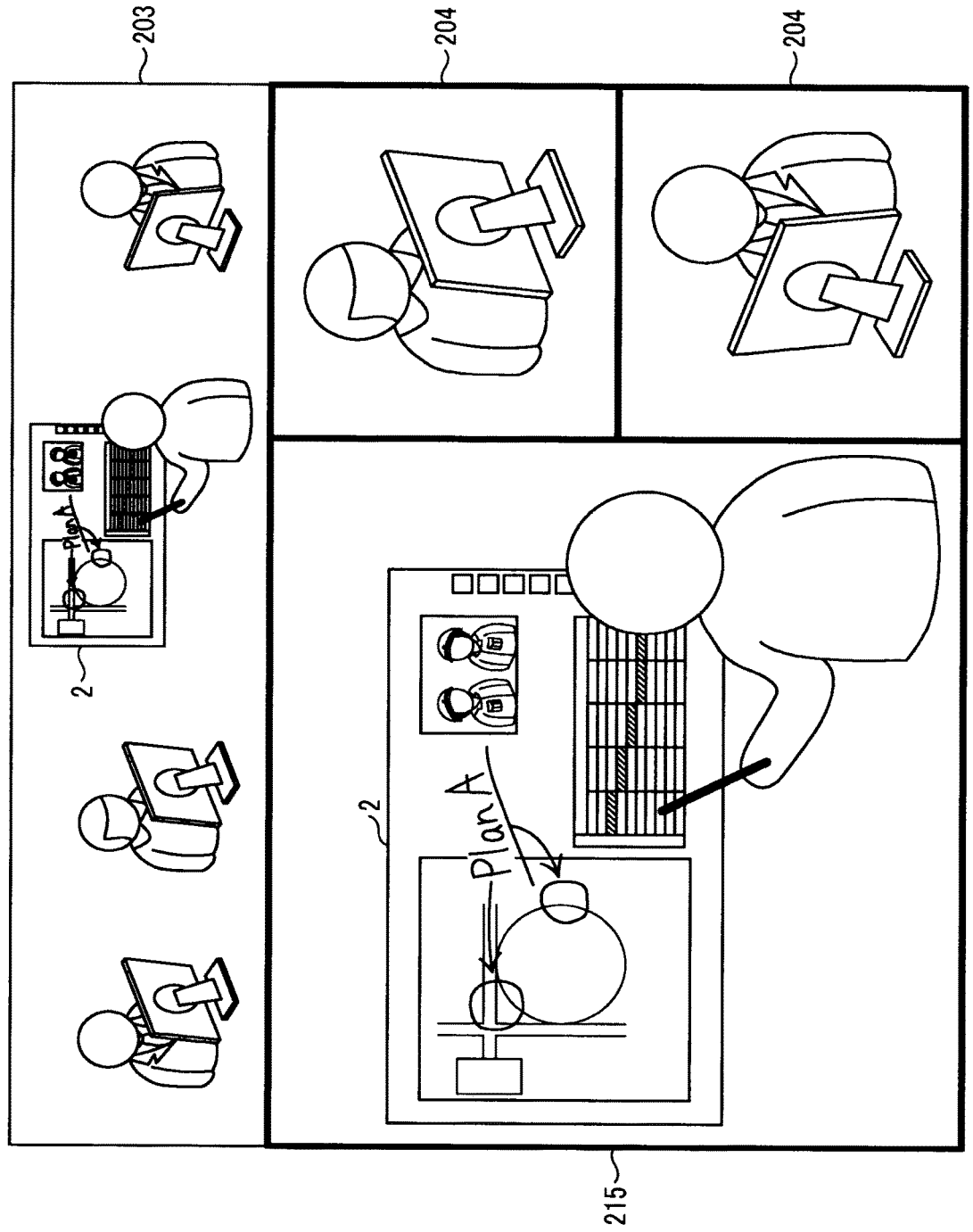
FIG. 45 is an example of a diagram of a display device image displayed by the display control unit of the information recording app when an electronic whiteboard recording start request designating neither the left portion nor the right portion is transmitted to the meeting device in accordance with the embodiment of the present disclosure.

As illustrated in FIG. 45, the display control unit 13 of the information recording app 41 may display an image of the user located in the direction of the electronic whiteboard 2 larger than the speaker images 204. FIG. 45 is a diagram of the display device image 215 displayed by the information recording app 41 when the electronic whiteboard recording start request designating neither the left portion nor the right portion is transmitted to the meeting device 60. The display device image 215 is displayed larger than the speaker images 204. This makes it easier to draw the viewer's attention to to-be-emphasized information handwritten on the electronic whiteboard 2.

The display device image 215 is displayed in FIG. 45. Alternatively, the display control unit 13 of the information recording app 41 may display the half display device image 216 larger than the speaker images 204 in the same manner.

The user operating the electronic whiteboard 2 may make an utterance. In this case, if both the speaker image 204 and the display device image 215 are clipped, the speaker and the operator are clipped in a duplicate manner. Thus, clipping of the speaker image 204 may be omitted. In this case, the speaker image generation unit 63 acquires the direction of the electronic whiteboard 2. In response to the electronic whiteboard recording start request, the speaker image generation unit 63 skips generation of a speaker image if the direction of the speaker and the direction of the electronic whiteboard 2 overlap by a predetermined amount or greater. If the user using the electronic whiteboard 2 is a speaker, the display device image generation unit 66 can generate the display device image 215 including the speaker and the electronic whiteboard 2.

Figure 46:
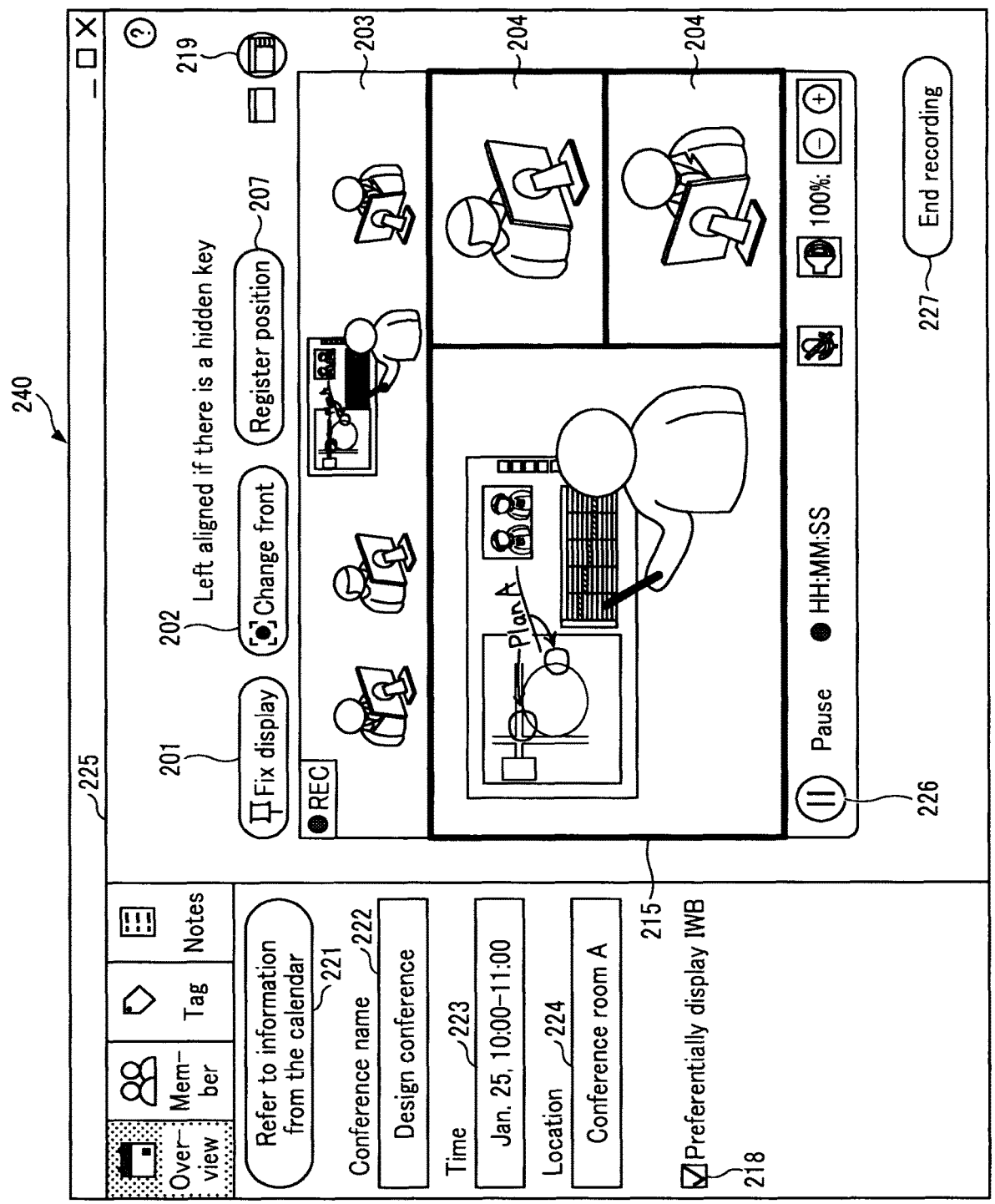
FIG. 46 is an example of a diagram illustrating a display device image preferentially displayed based on a user operation in accordance with the embodiment of the present disclosure.

As illustrated in FIG. 46, the user may configure the display control unit 13 of the information recording app 41 to preferentially display the display device image 215. The term "preferentially display" means that the display device image 215 is displayed in a way that attracts viewer's attention, such as in size larger than any other image. FIG. 46 illustrates the display device image 215 preferentially displayed based on a user operation. FIG. 46 illustrates a recording-in-progress screen 240 similarly to the recording-in-progress screen 220 illustrated in FIG. 19. The recording-in-progress screen 240 illustrated in FIG. 46 includes a check box 218 associated with text "Preferentially display IBW" and a priority switch button 219.

In response to the user checking the check box 218 or pressing the priority switch button 219, the display control unit 13 of the information recording app 41 enlarges the display device image 215. For example, the display control unit 13 displays the display device image 215 in a larger size than the speaker images 204. If the user desires to check the content displayed on the electronic whiteboard 2, the user is allowed to enlarge the display device image 215. The display control unit 13 may independently display the display device image 215 in a larger size. Likewise, the information recording app 41 can display the half display device image 216 in a large size.

As described above, the record information creation system 100 according to the present embodiment clips the display device image 215 in response to an operation on the electronic whiteboard 2. Thus, in response to a handwriting operation on the electronic whiteboard 2, the recording information creation system 100 can display the handwritten data. In response to the end of the handwriting operation, the recording information creation system 100 can end displaying the display device image 215. This enables an image of the electronic whiteboard 2 and the surroundings at the time of the user using the electronic whiteboard 2 to be transmitted to a remote place.

Variations

While the present invention has been described above using the above-described one or more embodiments, the embodiments do not limit the present invention in any way. Various modifications and replacements may be made within a scope not departing from the gist of the present invention.

For example, the terminal apparatus 10 and the meeting device 60 may be integrated into one apparatus. In one example, the meeting device 60 may be externally attached to the terminal apparatus 10. The meeting device 60 may be implemented by a spherical camera, a microphone, and a loudspeaker connected to one another by cables.

The meeting device 60 may be disposed at the other site 101. The meeting device 60 at the other site 101 separately creates a combined moving image and text data. A plurality of meeting devices 60 may be disposed at a single site. In this case, a plurality of pieces of recording information are created for the respective meeting devices 60.

The arrangement of the panoramic image 203, the speaker images 204, and the screen of the app in the combined moving image used in the present embodiment is merely an example. The panoramic image 203 may be displayed below the speaker images 204, the user may change the arrangement, or the user may switch between non-display and display individually for the panoramic image 203 and the speaker images 204 during playback.

In the configuration examples illustrated in FIG. 9, for example, the terminal apparatus 10, the meeting device 60, and the information processing system 50 are each divided in accordance with the major functions thereof to facilitate understanding of the processes performed by the terminal apparatus 10, the meeting device 60, and the information processing system 50. No limitation is intended by how the functions are divided by process or by the name of the functions. The processes performed by the terminal apparatus 10, the meeting device 60, and the information processing system 50 may be divided into more processing units in accordance with the content of the processes. In addition, the division may be performed so that one processing unit contains more processing.

The apparatuses or devices described in one or more embodiments are just one example of plural computing environments that implement the one or more embodiments disclosed herein. In some embodiments, the information processing system 50 includes multiple computing devices, such as a server cluster. The plural computing devices communicate with one another through any type of communication link including a network, shared memory, etc., and perform the processes disclosed herein.

The information processing system 50 may share the processing steps disclosed herein, for example, steps in FIG. 21 or the like in various combinations. For example, a process performed by a predetermined unit may be performed by a plurality of information processing apparatuses included in the information processing system 50. The information processing system 50 may be implemented by a single server apparatus in a collective manner or by a plurality of apparatuses in a distributed manner.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In a first aspect, a display system includes: a display device (2); and a display device specifying unit (67) configured to specify a display device (2), based on information related to the display device (2); a detection unit (38, 39) configured to detect that the display device (2) is in use by a user; and a display control unit (13) configured to display a display device image representing a specific area including an image of at least a part of the display device (2), based on image data captured by an image capturing device.

In a second aspect, the display system according to the first aspect further includes the display device (2) that includes the detection unit (38, 39), and a communication unit (36) configured to transmit information indicating that the display device (2) is in use by the display device (2), to a terminal apparatus that communicates with the image-capturing device.

In a third aspect, the display system according to the second aspect further includes an information processing system (50) configured to communicate with the display device (2) and the image-capturing device via a network. The information processing system (50) includes a storage unit (5000) configured to register the display device (2) and the image-capturing device as devices for use in communication of the user. The communication unit (36) transmits the information indicating the detection by the detection unit (38, 39) to the terminal apparatus via the information processing system (50).

In a fourth aspect, in the display system according to the second aspect, the display device includes a display unit (34) that displays device identification information of the display device (2). The display system further includes the image-capturing device, an information processing system (50) configured to communicate with the display device (2) and the image-capturing device via a network, and an analysis unit (22) configured to acquire the device identification information of the display device (2) from the image information of an image of the display unit (34). The image information includes the device identification information of the display device (2). The information processing system (50) includes a communication unit (51) that receives registration of the display device (2) and the image-capturing device as devices for use in communication of the user, based on the device identification information of the display device (2) and device identification information of the image-capturing device that are received from the terminal apparatus. The communication unit (36) of the display device (2) transmits the information indicating the detection by the detection unit (38, 39) to the terminal apparatus via the information processing system (50).

In a fifth aspect, in the display system according to any one of the first to fourth aspects, the detection unit (38, 39) includes an operation detection unit (38) that detects a start of use of the display device (2) by the user in response to a touch on a touch panel of the display device (2), or a user detection unit (39) that detects an approach of the user to the display device (2) to detect a start of use of the display device (2) by the user.

In a sixth aspect, in the display system according to any one of the second to fifth aspects, the detection unit (38, 39) detects an end of the use of the display device (2), and the display control unit (13) ends displaying the display device image in response to receipt of information indicating the end of the use of the display device (2) from the terminal apparatus.

In a seventh aspect, in the display system according to the sixth aspect, the detection unit (38, 39) detects absence of a touch on a touch panel of the display device (2) for a certain period or detects moving away of the user from the display device (2) to detect the end of the use of the display device (2).

In an eighth aspect, in the display system according to any one of the second to seventh aspects, the display control unit (13) displays the display device image of the specific area, based on an image range including the display device (2) received from the terminal apparatus.

In a ninth aspect, in the display system according to the eighth aspect, the display device specifying unit (67) detects a specific image displayed by the display device (2) from the image captured by the image-capturing device to specify the image range including the display device (2). The display control unit (13) displays the display device image of the specific area, based on the image range including the display device (2).

In a tenth aspect, the display system according to any one of the second to seventh aspects, the display device specifying unit (67) detects a direction of a specific sound output by the display device (2) to specify the display device (2), and the display control unit (13) displays the display device image of the specific area, based on the direction of the specific sound.

In an eleventh aspect, in the display system according to the eighth aspect, the display device specifying unit (67) detects the display device (2) through image processing to specify the image range including the display device (2). The display control unit (13) displays the display device image of the specific area, based on the image area including the display device (2).

In a twelfth aspect, in the display system according to any one of the second to eleventh aspects, the detection unit (38, 39) detects a touched position on a touch panel of the display device (2). The communication unit (36) transmits information indicating the detection of the touched position by the detection unit to the terminal apparatus. The display control unit (13) changes and displays the display device image of the specific area in accordance with the touched position indicated by the information received from the terminal apparatus.

In a thirteenth aspect, in the display system according to any one of the first to twelfth aspects, further includes: the image-capturing device including a speaker image generation unit (66) that generates a speaker image from the image information of an image captured by the image-capturing device based on a detected direction of a speaker. In response to the detection unit (38, 39) detecting the display device (2) being in use by the user who is a speaker, the display control unit (13) displays the display device image of the specific area including the speaker and at least part of the display device (2) based on the image information.

In a fourteenth aspect, in the display system according to the thirteenth aspect, in response to the detection unit (38, 39) detecting the display device (2) being in use by the user and a direction of the display device (2) and the direction of the speaker having an overlap of a certain amount or greater. The speaker image generation unit (66) does not generate the speaker image of the speaker located in the direction having the overlap with the direction of the display device (2).

In a fifteenth aspect, in the display system according to the thirteenth or fourteenth aspect, in response to an operation of preferentially displaying the display device image, the display control unit (13) displays the display device image to be larger than the speaker image.

In a sixteenth aspect, a display method includes: specifying (S5) a display device (2), based on information related to the display device (2); detecting (S2) that the display device (2) is in use by a user; and displaying (S11) a display device image representing a specific area including at least a part of the display device, based on image information of an image captured by an image-capturing device.

In a seventh aspect, an image-capturing device that communicates with a terminal apparatus, the image-capturing device including: a display device specifying unit (67) configured to specify a display device, based on information related to the display device; a display device image generation unit (66) configured to generate, in response to receipt of information indicating detection of the display device being in use by a user from the terminal apparatus, a display device image of a specific area including at least part of the display device, based on image information of an image captured by the image-capturing device; and a terminal communication unit (61) configured to transmit the display device image to the terminal apparatus.

In an eighteenth aspect, a recording medium storing a plurality of instructions which, when executed by one or more processors, causes the processors to perform a method includes: receiving (S2, S5) information indicating identification of a display device based on information related to the display device and information indicating detection of the display device being in use by a user; and displaying (S11) a display device image of a specific area including at least part of the display device, based on image information of an image captured by an image-capturing device.

The invention claimed is:

1. A system for displaying an image, comprising:
circuitry configured to:
receive a detection of use of a display by a user;
specify the display, based on information related to the display; and
display, on a display, an image representing a specific area in an image captured by an image-capturing device, the specific area including at least a part of the display that is specified;
the image-capturing device;
a terminal apparatus; and
the display including:
a sensor that detects use of the display by the user; and
display circuitry configured to, in response to detection of a start of the use of the display by the sensor, transmit information indicating the start of the use of the display to the terminal apparatus,
wherein:
the sensor detects a touched position on a touch panel of the display,
the display circuitry transmits information indicating the detection of the touched position to the terminal apparatus, and
the circuitry changes the specific area represented by the display image according to the touched position indicated by the information indicating the detection of the touched position.

2. The system of claim 1, wherein:
the sensor detects the start of use of the display based on at least one of a touch on a touch panel of the display, or detection of an approach of the user to the display.

3. The system of claim 1, wherein:
the sensor further detects an end of the use of the display,
the display circuitry is configured to transmit information indicating the end of the use of the display to the terminal apparatus, and
the circuitry is configured to end display of the display image, based on image data captured by the image-capturing device in response to receiving the information indicating the end of the use of the display.

4. The system of claim 3, wherein:
the sensor detects the end of the use of the display based on at least one of: a detection of absence of a touch on a touch panel of the display for a certain period, or a detection that the user is moving away from the display.

5. The system of claim 1, wherein:
the circuitry is configured to specify the specific area including at least the part of the display based on a designated area in the image captured by the image-capturing device, the designated area being designated at the terminal apparatus.

6. The system of claim 1, wherein:
the circuitry is configured to specify the specific area including at least the part of the display, based on a specific image displayed by the display device.

7. The system of claim 1, wherein:
the circuitry is configured to specify the specific area including at least the part of the display device, based on a specific sound output by the display.

8. The system of claim 1, wherein:
the circuitry is configured to specify the specific area including at least the part of the display, based on a result of applying image processing to the image captured by the image-capturing device.

9. The system of claim 1, wherein:
the circuitry is configured to generate a speaker image from the image captured by the image-capturing device based on a detected direction of a speaker, the speaker image including an image of the speaker, wherein:
in a case where the speaker is the user,
the circuitry is configured to display the display image representing the specific area in the image captured by the image-capturing device, the specific area including the speaker in addition to the at least part of the display.

10. The system of claim 9, wherein:
in a case where a direction of the display and the direction of the speaker overlap in a certain amount or greater,
the circuitry is configured to prevent from generating the speaker image.

11. The system of claim 9, wherein:
in response to a request for preferentially displaying the display image, the circuitry is configured to display the display image in a size larger than the speaker image.

12. The system of claim 1, further comprising:
an information processing server configured to communicate with the display and the image-capturing device via a network, the information processing server including
a memory that stores the display and the image-capturing device as devices for use in communication by the user, wherein
the display circuitry is configured to transmit the information indicating the detection by the sensor to the terminal apparatus via the information processing server.

13. The system of claim 12, wherein:
the display is further configured to display an image including device identification information of the display,
the circuitry configured to acquire the device identification information of the display from the image displayed by the display, and
the information processing server further includes
circuitry configured to receive a request for registration of the display and the image-capturing device as devices for use in communication by the user, based on the device identification information of the display and device identification information of the image-capturing device that are received from the terminal apparatus.

14. A method for displaying an image, comprising:
receiving a detection of use of a display by a user;
specifying the display based on information related to the display;
displaying a display image representing a specific area in an image captured by an image-capturing device, the specific area including at least a part of the display;
detecting use of the display by the user;
transmitting, in response to the detecting, information indicating a start of the use of the display to the terminal apparatus,
wherein:
the detecting detects a touched position on a touch panel of the display,
the transmitting transmits information indicating the detection of the touched position to the terminal apparatus, and
the method further comprises changing the specific area represented by the display image according to the touched position indicated by the information indicating the detection of the touched position.

15. A non-transitory recording medium storing a plurality of instructions which, when executed by one or more processors, causes the processors to perform a method comprising:

receiving information indicating identification of a display based on information related to the display and information indicating detection of the display being in use by a user;
displaying an image representing a specific area in an image captured by an image-capturing device, the specific area including at least a part of the display;
detecting use of the display by the user;
transmitting, in response to the detecting, information indicating a start of the use of the display to the terminal apparatus,
wherein:
the detecting detects a touched position on a touch panel of the display,
the transmitting transmits information indicating the detection of the touched position to the terminal apparatus, and
the method further comprises changing the specific area represented by the display image according to the touched position indicated by the information indicating the detection of the touched position.

* * * * *